US010117254B2

(12) United States Patent
Yang et al.

(10) Patent No.: US 10,117,254 B2
(45) Date of Patent: Oct. 30, 2018

(54) PILOT SEQUENCES IN DATA STREAMS

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 86 days.

(21) Appl. No.: 15/213,967

(22) Filed: Jul. 19, 2016

(65) Prior Publication Data

US 2017/0034829 A1 Feb. 2, 2017

Related U.S. Application Data

(60) Provisional application No. 62/276,737, filed on Jan. 8, 2016, provisional application No. 62/264,833, filed on Dec. 8, 2015, provisional application No. 62/199,877, filed on Jul. 31, 2015.

(51) Int. Cl.

| | |
|---|---|
| ***H04J 1/00*** | (2006.01) |
| ***H04W 72/04*** | (2009.01) |
| ***H04L 5/00*** | (2006.01) |
| ***H04L 12/26*** | (2006.01) |
| ***H04L 27/26*** | (2006.01) |

(52) U.S. Cl.

CPC ......... *H04W 72/0486* (2013.01); *H04L 5/005* (2013.01); *H04L 5/0048* (2013.01); *H04L 27/2613* (2013.01); *H04L 43/0894* (2013.01)

(58) Field of Classification Search

None

See application file for complete search history.

(56) References Cited

U.S. PATENT DOCUMENTS

2013/0202001 A1* 8/2013 Zhang ..................... H04L 29/10 370/476
2013/0315262 A1* 11/2013 Baik .................. H04L 27/2602 370/474
2014/0286455 A1* 9/2014 Choi ..................... H04L 5/0048 375/308
2016/0057754 A1* 2/2016 Azizi .................... H04W 28/20 370/329
2016/0226638 A1* 8/2016 Azizi .................... H04L 5/0048

OTHER PUBLICATIONS

International Search Report and Written Opinion—PCT/US2016/043184—ISA/EPO—dated Sep. 23, 2016.

(Continued)

*Primary Examiner* — Edan Orgad
*Assistant Examiner* — Sithu Ko
(74) *Attorney, Agent, or Firm* — Arent Fox, LLP

(57) ABSTRACT

A method, an apparatus, and a computer-readable medium for wireless communication are provided. In one aspect, an apparatus is configured to determine a plurality of resource units for communication. The apparatus is configured to generate a set of pilot signals in at least one resource unit of the plurality of resource units. The apparatus is configured to transmit the generated set of pilot signals in the at least one resource unit of the plurality of resource units.

41 Claims, 16 Drawing Sheets

(56) References Cited

OTHER PUBLICATIONS

Mujtaba S.A., "TGn Sync Proposal Technical Specifications", IEEE P802.11 Wireless LANs, Aug. 14, 2004, XP055009705, Retrieved from the Internet: URL:https://mentor.ieee.org/ 802.11/ [retrieved on Oct. 17, 2011].
Shiwen He(Seu): "Complete Proposal for IEEE802.11aj(45GHz), 11-15-0903-01-00aj-Complete-Proposal-for-IEEE802-11AJ-45GHZ", IEEE-SA Mentor, Piscataway, NJ USA, vol. 802.11AJ, No. 1, Jul. 15, 2015 (Jul. 15, 2015), pp. 1-198, XP068098084, [retrieved on Jul. 15, 2015].

* cited by examiner

HE40

PILOT SEQUENCES IN DATA STREAMS

CROSS-REFERENCE TO RELATED APPLICATION(S)

This application claims the benefit of U.S. Provisional Application Ser. No. 62/199,877, entitled "SINGLE STREAM PILOT SEQUENCES" and filed on Jul. 31, 2015, U.S. Provisional Application Ser. No. 62/264,833, entitled "SINGLE STREAM PILOT SEQUENCES" and filed on Dec. 8, 2015, and U.S. Provisional Application Ser. No. 62/276,737, entitled "SINGLE STREAM PILOT SEQUENCES" and filed on Jan. 8, 2016, which are expressly incorporated by reference herein in their entirety.

BACKGROUND

Field

The present disclosure relates generally to communication systems, and more particularly, to using pilot sequences in data streams within a wireless network (e.g., single stream pilot sequences).

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides a wireless device (e.g., an access point) for wireless communication. The wireless device is configured to determine a plurality of resource units for communication. The wireless device is configured to generate a set of pilot signals in at least one resource unit of the plurality of resource units. The wireless device is configured to transmit the generated set of pilot signals in the at least one resource unit of the plurality of resource units.

In an aspect, a method of wireless communication for an access point is provided. The method may include determining a plurality of resource units for communication, generating a set of pilot signals in at least one resource unit of the plurality of resource units, and transmitting the generated set of pilot signals in the at least one resource unit of the plurality of resource units. In one configuration, the determining the plurality of resource units for communication may include determining a communication bandwidth and determining a number of usable tones per resource unit based on the determined communication bandwidth. In another configuration, the generating the set of pilot signals in the at least one resource unit may include determining pilot tone locations associated with the at least one resource unit, determining a pilot sequence associated with the determined pilot tone locations, and determining pilot values for the determined pilot tone locations based on the determined pilot sequence and a pilot polarity sequence. In an aspect, the pilot sequence may be determined by shifting an initial pilot sequence based on a data symbol index. In another aspect, the at least one resource unit of the plurality of resource units may have 26 usable tones and 2 pilot tone locations, and the pilot sequence may be determined based on an initial pilot sequence {1, −1}. In another aspect, the at least one resource unit of the plurality of resource units may have 52 usable tones or 106 usable tones and may have 4 pilot tone locations, and the pilot sequence may be determined based on an initial pilot sequence {1, 1, 1, −1}. In another aspect, the at least one resource unit of the plurality of resource units may have 242 usable tones and may have 8 pilot tone locations, and the pilot sequence may be determined based on an initial pilot sequence {1, 1, 1, −1, −1, 1, 1, 1}. In another aspect, the at least one resource unit of the plurality of resource units may have 484 usable tones or 996 usable tones and may have 16 pilot tone locations, and the pilot sequence may be determined based on an initial pilot sequence {1, 1, 1, −1, −1, 1, 1, 1, 1, 1, 1, −1, −1, 1, 1, 1}. In another aspect, the at least one resource unit of the plurality of resource units may have 1992 usable tones and 32 pilot tone locations, and the pilot sequence may be determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another configuration, the generated the set of pilot signals may be based on a number of symbols in a signal (SIG) field of a preamble. In another configuration, the determining the pilot sequence may include determining a communication bandwidth, determining a base pilot sequence associated with the determined communication bandwidth, determining a number of usable tones in the at least one resource unit, and determining an initial pilot sequence based on the communication bandwidth, the determined base pilot sequence, and the determined number of usable tones. In another aspect, the generated set of pilot signals in the at least one resource unit may be based on the communication bandwidth, the determined pilot tone locations, and the determined pilot values. In another aspect, the communication bandwidth may be 20 megahertz (MHz), and the determined base pilot sequence may be a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth may be 40 MHz, and the determined base pilot sequence may be a first base pilot sequence {1, −1, 1, −1, −1, 1, −1, 1, −1, 1, –1, –1, –1, 1, –1, 1, 1, 1, 1, –1, –1, –1, –1, –1, –1, 1, –1, –1, –1, –1, 1, 1, –1, –1, 1, 1} or a second base pilot sequence {1, 1, –1, –1, 1, 1, –1, –1, –1, –1, 1, –1, –1, –1, –1, –1, –1, 1, 1, 1, 1, –1, 1, –1, –1, –1, 1, –1, 1, –1, 1, –1, –1, 1, –1, 1}. In another aspect, the communication bandwidth may be 80 MHz, and the determined base pilot sequence may be a first base pilot sequence {–1, 1, 1, 1, –1, –1, 1, 1, –1, –1, 1, –1, 1, –1, 1, 1, –1, 1, –1, 1, 1, 1, 1, 1, –1, –1, 1, 1, 1, 1, 1, –1, 1, –1, –1, –1, 1, –1, 1, –1, 1, –1, –1, –1, –1, –1, 1, –1, –1, 1, 1, –1, 1, 1, –1, –1, 1, –1, 1, 1, –1, 1, –1, 1, –1, –1, –1, –1, 1, 1, –1, –1, –1, 1} or a second base pilot sequence {–1, 1, 1, 1, 1, –1, –1, 1, 1, 1, –1, –1, –1, 1, 1, –1, 1, –1, 1, 1, –1, –1, 1, –1, –1, 1, 1, –1, 1, 1, 1, 1, 1, –1, 1, –1, 1, –1, 1, 1, 1, 1, –1, –1, –1, –1, –1, –1, 1, –1, –1, –1, –1, –1, 1, 1, –1, 1, –1, –1, –1, –1, 1, –1, 1, 1, –1, –1, 1, –1, 1, –1, –1, 1}. In another aspect, the communication bandwidth may be 160 MHz, and the determined base pilot sequence may be a first base pilot sequence {–1, 1, 1, 1, –1, –1, 1, 1, –1, –1, 1, –1, 1, –1, 1, 1, –1, 1, –1, 1, 1, 1, 1, 1, –1, –1, 1, 1, 1, 1, 1, –1, 1, –1, –1, –1, 1, –1, 1, –1, 1, –1, –1, –1, –1, –1, 1, –1, –1, 1, 1, –1, 1, 1, –1, –1, 1, –1, 1, 1, –1, 1, –1, 1, –1, –1, –1, –1, 1, 1, –1, –1, –1, 1, –1, 1, 1, 1, –1, –1, 1, 1, –1, –1, 1, –1, 1, –1, 1, 1, –1, 1, –1, 1, 1, 1, 1, 1, –1, –1, 1, 1, 1, 1, 1, –1, 1, –1, –1, –1, 1, –1, 1, –1, 1, –1, –1, –1, –1, –1, 1, –1, –1, 1, 1, –1, 1, 1, –1, –1, 1, –1, 1, 1, –1, 1, –1, 1, –1, –1, –1, –1, 1, 1, –1, –1, –1, 1} or a second base pilot sequence {–1, 1, 1, 1, 1, –1, –1, 1, 1, 1, –1, –1, –1, 1, 1, –1, 1, –1, 1, 1, –1, –1, 1, –1, –1, 1, 1, –1, 1, 1, 1, 1, 1, –1, 1, –1, 1, –1, 1, 1, 1, 1, –1, –1, –1, –1, –1, –1, 1, –1, –1, –1, –1, –1, 1, 1, –1, 1, –1, –1, –1, –1, 1, –1, 1, 1, –1, –1, 1, –1, 1, –1, –1, 1, –1, 1, 1, 1, 1, –1, –1, 1, 1, 1, –1, –1, –1, 1, 1, –1, 1, –1, 1, 1, –1, –1, 1, –1, –1, 1, 1, –1, 1, 1, 1, 1, 1, –1, 1, –1, 1, –1, 1, 1, 1, 1, –1, –1, –1, –1, –1, –1, 1, –1, –1, –1, –1, –1, 1, 1, –1, 1, –1, –1, –1, –1, 1, –1, 1, 1, –1, –1, 1, –1, 1, –1, –1, 1}. In another aspect, the initial pilot sequence may be determined based on a set of nominal tone indices associated with the at least one resource unit. In another aspect, the pilot sequence may be determined by shifting the determined initial pilot sequence based on a data symbol index. In another aspect, each resource unit of the plurality of resource units has 26 usable tones. In this aspect, a communication bandwidth associated with the plurality of resource units may be 20 MHz, and the plurality of resource units may be associated with a plurality of pilot tone location sets {(–116, –102), (–90, –76), (–62, –48), (–36, –22), (–10, 10), (22, 36), (48, 62), (76, 90), (102, 116)}. In another aspect, each resource unit of the plurality of resource units may have 26 usable tones, and a communication bandwidth associated with the plurality of resource units may be 40 MHz, and the plurality of resource units may be associated with a plurality of pilot tone location sets {(–238, –224), (–212, –198), (–184, –170), (–158, –144), (–130, –116), (–104, –90), (–78, –64), (–50, –36), (–24, –10), (10, 24), (36, 50), (64, 78), (90, 104), (116, 130), (144, 158), (170, 184), (198, 212), (224, 238)}. In another aspect, each resource unit of the plurality of resource units has 26 usable tones, a communication bandwidth associated with the plurality of resource units may be 80 MHz, and the plurality of resource units may be associated with a plurality of pilot tone location sets {–494, –480), (–468, –454), (–440, –426), (–414, –400), (–386, –372), (–360, –346), (–334, –320), (–306, –292), (–280, –266), (–252, –238), (–226, –212), (–198, –184), (–172, –158), (–144, –130), (–118, –104), (–92, –78), (–64, –50), (–38, –24), (–10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units may have 26 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of –512 and the second plurality of pilot tone sets may be based on the initial plurality of pilot tone location sets adjusted by a second offset of 512, and the initial plurality of pilot tone location sets may be {(–494, –480), (–468, –454), (–440, –426), (–414, –400), (–386, –372), (–360, –346), (–334, –320), (–306, –292), (–280, –266), (–252, –238), (–226, –212), (–198, –184), (–172, –158), (–144, –130), (–118, –104), (–92, –78), (–64, –50), (–38, –24), (–10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units may have 52 usable tones, a communication bandwidth associated with the plurality of resource units may be 20 MHz, and the plurality of resource units may be associated with a plurality of pilot tone location sets {(–116, –102, –90, –76), (–62, –48, –36, –22), (22, 36, 48, 62), (76, 90, 102, 116)}. In another aspect, each resource unit of the plurality of resource units may have 52 usable tones, a communication bandwidth associated with the plurality of resource units may be 40 MHz, and the plurality of resource units may be associated with a plurality of pilot tone location sets {(–238, –224, –212, –198), (–184, –170, –158, –144), (–104, –90, –78, –64), (–50, –36, –24, –10), (10, 24, 36, 50), (64, 78, 90, 104), (144, 158, 170, 184), (198, 212, 224, 238)}. In another aspect, each resource unit of the plurality of resource units may have 52 usable tones, a communication bandwidth associated with the plurality of resource units may be 80 MHz, and the plurality of resource units may be associated with a plurality of pilot tone location sets {(–494, –480, –468, –454), (–440, –426, –414, –400), (–360, –346, –334, –320), (–306, –292, –280, –266), (–252, –238, –226, –212), (–198, –184, –172, –158), (–118, –104, –92, –78), (–64, –50, –38, –24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units may have 52 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of –512 and the second plurality of pilot tone sets may be based on the initial plurality of pilot tone location sets adjusted by a second offset of 512, and the initial plurality of pilot tone location sets may be {(–494, –480, –468, –454), (–440, –426, –414, –400), (–360, –346, –334, –320), (–306, –292, –280, –266), (–252, –238, –226, –212), (–198, –184, –172, –158), (–118, –104, –92, –78), (–64, –50, –38, –24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units may have 106 usable tones, a communication bandwidth associated with the plurality of resource units may be 20 MHz, and the plurality of resource units may be associated with a plurality of pilot tone location sets {(−116, −90, −48, −22), (22, 48, 90, 116)}. In another aspect, each resource unit of the plurality of resource units may have 106 usable tones, a communication bandwidth associated with the plurality of resource units may be 40 MHz, and the plurality of resource units may be associated with a plurality of pilot tone location sets {(−238, −212, −170, −144), (−104, −78, −36, −10), (10, 36, 78, 104), (144, 170, 212, 238)}. In another aspect, each resource unit of the plurality of resource units may have 106 usable tones, a communication bandwidth associated with the plurality of resource units may be 80 MHz, and the plurality of resource units may be associated with a plurality of pilot tone location sets {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units may have 106 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units may have 242 usable tones, a communication bandwidth associated with the plurality of resource units may be 20 MHz, and the plurality of resource units may include a resource unit associated with a pilot tone location set {(−116, −90, −48, −22, 22, 48, 90, 116)}. In another aspect, each resource unit of the plurality of resource units may have 242 usable tones, a communication bandwidth associated with the plurality of resource units may be 40 MHz, and the plurality of resource units may be associated with a plurality of pilot tone location sets {(−238, −212, −170, −144, −104, −78, −36, −10), (10, 36, 78, 104, 144, 170, 212, 238)}. In another aspect, each resource unit of the plurality of resource units may have 242 usable tones, a communication bandwidth associated with the plurality of resource units may be 80 MHz, and the plurality of resource units may be associated with a plurality of pilot tone location sets {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units may have 242 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units may have 484 usable tones, a communication bandwidth associated with the plurality of resource units may be 40 MHz, and the plurality of resource units may include a resource unit associated with a pilot tone location set {(−238, −212, −170, −144, −104, −78, −36, −10, 10, 36, 78, 104, 144, 170, 212, 238)}. In another aspect, each resource unit of the plurality of resource units may have 484 usable tones, a communication bandwidth associated with the plurality of resource units may be 80 MHz, and the plurality of resource units may be associated with a plurality of pilot tone location sets {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units may have 484 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units may have 996 usable tones, a communication bandwidth associated with the plurality of resource units may be 80 MHz, and the plurality of resource units may include a resource unit associated with a pilot tone location set {(−468, −400, −334, −266, −226, −158, −92, −24, 24, 92, 158, 226, 266, 334, 400, 468)}. In another aspect, each resource unit of the plurality of resource units may have 996 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−468, −400, −334, −266, −226, −158, −92, −24, 24, 92, 158, 226, 266, 334, 400, 468)}. In another aspect, each resource unit of the plurality of resource units may have 1992 usable tones, a communication bandwidth associated with the plurality of resource units may be 160 MHz, and the plurality of resource units may include a resource unit associated with a pilot tone location set {(−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980)}. In another configuration, the method may include allocating one or more resource units of the plurality of resource units to at least one wireless device and transmitting allocation information associated with the allocated one or more resource units to the at least one wireless device. In one aspect, the allocation information may include at least one of a set of tone indices, an identifier, a resource unit size that indicates a number of usable tones per resource unit, a communication bandwidth, or data symbol information. In another aspect, each resource unit of the plurality of resource units may have usable tones, 52 usable tones, 106 usable tones, 242 usable tones, 484 usable tones, 996 usable tones, or 1992 usable tones.

In another aspect, an apparatus for wireless communication is provided. The apparatus may include a memory and at least one processor. The least one processor may be configured to determine a plurality of resource units for communication, to generate a set of pilot signals in at least one resource unit of the plurality of resource units, and to transmit the generated set of pilot signals in the at least one resource unit of the plurality of resource units. In one configuration, the at least one processor may be configured to determine the plurality of resource units for communication by determining a communication bandwidth and by determining a number of usable tones per resource unit based on the determined communication bandwidth. In another configuration, the at least one processor may be configured to generate the set of pilot signals in the at least one resource unit by determining pilot tone locations associated with the at least one resource unit, by determining a pilot sequence associated with the determined pilot tone locations, and by determining pilot values for the determined pilot tone locations based on the determined pilot sequence and a pilot polarity sequence. In an aspect, the pilot sequence may be determined by shifting an initial pilot sequence based on a data symbol index. In another aspect, the at least one resource unit of the plurality of resource units may have 26 usable tones and 2 pilot tone locations, and the pilot sequence may be determined based on an initial pilot sequence {1, −1}. In another aspect, the at least one resource unit of the plurality of resource units may have 52 usable tones or 106 usable tones and may have 4 pilot tone locations, and the pilot sequence may be determined based on an initial pilot sequence {1, 1, 1, −1}. In another aspect, the at least one resource unit of the plurality of resource units may have 242 usable tones and may have 8 pilot tone locations, and the pilot sequence may be determined based on an initial pilot sequence {1, 1, 1, −1, −1, 1, 1, 1}. In another aspect, the at least one resource unit of the plurality of resource units may have 484 usable tones or 996 usable tones and may have 16 pilot tone locations, and the pilot sequence may be determined based on an initial pilot sequence {1, 1, 1, −1, −1, 1, 1, 1, 1, 1, 1, −1, −1, 1, 1, 1}. In another aspect, the at least one resource unit of the plurality of resource units may have 1992 usable tones and 32 pilot tone locations, and the pilot sequence may be determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another configuration, the generated the set of pilot signals may be based on a number of symbols in a SIG field of a preamble. In another configuration, the at least one processor may be configured to determine the pilot sequence by determining a communication bandwidth, by determining a base pilot sequence associated with the determined communication bandwidth, by determining a number of usable tones in the at least one resource unit, and by determining an initial pilot sequence based on the communication bandwidth, the determined base pilot sequence, and the determined number of usable tones. In another aspect, the generated set of pilot signals in the at least one resource unit may be based on the communication bandwidth, the determined pilot tone locations, and the determined pilot values. In another aspect, the communication bandwidth may be 20 MHz, and the determined base pilot sequence may be a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth may be 40 MHz, and the determined base pilot sequence may be a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth may be 80 MHz, and the determined base pilot sequence may be a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth may be 160 MHz, and the determined base pilot sequence may be a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, −1, −1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, 1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence may be determined based on a set of nominal tone indices associated with the at least one resource unit. In another aspect, the pilot sequence may be determined by shifting the determined initial pilot sequence based on a data symbol index. In another aspect, each resource unit of the plurality of resource units has 26 usable tones. In this aspect, a communication bandwidth associated with the plurality of resource units may be 20 MHz, and the plurality of resource units may be associated with a plurality of pilot tone location sets {(−116, −102), (−90, −76), (−62, −48), (−36, −22), (−10, 10), (22, 36), (48, 62), (76, 90), (102, 116)}. In another aspect, each resource unit of the plurality of resource units may have 26 usable tones, and a communication bandwidth associated with the plurality of resource units may be 40 MHz, and the plurality of resource units may be associated with a plurality of pilot tone location sets {(−238, −224), (−212, −198), (−184, −170), (−158, −144), (−130, −116), (−104, −90), (−78, −64), (−50, −36), (−24, −10), (10, 24), (36, 50), (64, 78), (90, 104), (116, 130), (144, 158), (170, 184), (198, 212), (224, 238)}. In another aspect, each resource unit of the plurality of resource units has 26 usable tones, a communication bandwidth associated with the plurality of resource units may be 80 MHz, and the plurality of resource units may be associated with a plurality of pilot tone location sets {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units may have 26 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units may have 52 usable tones, a communication bandwidth associated with the plurality of resource units may be 20 MHz, and the plurality of resource units may be associated with a plurality of pilot tone location sets {(−116, −102, −90, −76), (−62, −48, −36, −22), (22, 36, 48, 62), (76, 90, 102, 116)}. In another aspect, each resource unit of the plurality of resource units may have 52 usable tones, a communication bandwidth associated with the plurality of resource units may be 40 MHz, and the plurality of resource units may be associated with a plurality of pilot tone location sets {(−238, −224, −212, −198), (−184, −170, −158, −144), (−104, −90, −78, −64), (−50, −36, −24, −10), (10, 24, 36, 50), (64, 78, 90, 104), (144, 158, 170, 184), (198, 212, 224, 238)}. In another aspect, each resource unit of the plurality of resource units may have 52 usable tones, a communication bandwidth associated with the plurality of resource units may be 80 MHz, and the plurality of resource units may be associated with a plurality of pilot tone location sets {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units may have 52 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units may have 106 usable tones, a communication bandwidth associated with the plurality of resource units may be 20 MHz, and the plurality of resource units may be associated with a plurality of pilot tone location sets {(−116, −90, −48, −22), (22, 48, 90, 116)}. In another aspect, each resource unit of the plurality of resource units may have 106 usable tones, a communication bandwidth associated with the plurality of resource units may be 40 MHz, and the plurality of resource units may be associated with a plurality of pilot tone location sets {(−238, −212, −170, −144), (−104, −78, −36, −10), (10, 36, 78, 104), (144, 170, 212, 238)}. In another aspect, each resource unit of the plurality of resource units may have 106 usable tones, a communication bandwidth associated with the plurality of resource units may be 80 MHz, and the plurality of resource units may be associated with a plurality of pilot tone location sets {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units may have 106 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units may have 242 usable tones, a communication bandwidth associated with the plurality of resource units may be 20 MHz, and the plurality of resource units may include a resource unit associated with a pilot tone location set {(−116, −90, −48, −22, 22, 48, 90, 116)}. In another aspect, each resource unit of the plurality of resource units may have 242 usable tones, a communication bandwidth associated with the plurality of resource units may be 40 MHz, and the plurality of resource units may be associated with a plurality of pilot tone location sets {(−238, −212, −170, −144, −104, −78, −36, −10), (10, 36, 78, 104, 144, 170, 212, 238)}. In another aspect, each resource unit of the plurality of resource units may have 242 usable tones, a communication bandwidth associated with the plurality of resource units may be 80 MHz, and the plurality of resource units may be associated with a plurality of pilot tone location sets {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units may have 242 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units may have 484 usable tones, a communication bandwidth associated with the plurality of resource units may be 40 MHz, and the plurality of resource units may include a resource unit associated with a pilot tone location set {(−238, −212, −170, −144, −104, −78, −36, −10, 10, 36, 78, 104, 144, 170, 212, 238)}. In another aspect, each resource unit of the plurality of resource units may have 484 usable tones, a communication bandwidth associated with the plurality of resource units may be 80 MHz, and the plurality of resource units may be associated with a plurality of pilot tone location sets {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units may have 484 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units may have 996 usable tones, a communication bandwidth associated with the plurality of resource units may be 80 MHz, and the plurality of resource units may include a resource unit associated with a pilot tone location set {(−468, −400, −334, −266, −226, −158, −92, −24, 24, 92, 158, 226, 266, 334, 400, 468)}. In another aspect, each resource unit of the plurality of resource units may have 996 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−468, −400, −334, −266, −226, −158, −92, −24, 24, 92, 158, 226, 266, 334, 400, 468)}. In another aspect, each resource unit of the plurality of resource units may have 1992 usable tones, a communication bandwidth associated with the plurality of resource units may be 160 MHz, and the plurality of resource units may include a resource unit associated with a pilot tone location set {(−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980)}. In another configuration, the at least one processor may be further configured to allocate one or more resource units of the plurality of resource units to at least one wireless device and to transmit allocation information associated with the allocated one or more resource units to the at least one wireless device. In one aspect, the allocation information may include at least one of a set of tone indices, an identifier, a resource unit size that indicates a number of usable tones per resource unit, a communication bandwidth, or data symbol information. In another aspect, each resource unit of the plurality of resource units may have usable tones, 52 usable tones, 106 usable tones, 242 usable tones, 484 usable tones, 996 usable tones, or 1992 usable tones.

In another aspect, an apparatus for wireless communication is provided. The apparatus may include means for determining a plurality of resource units for communication, means for generating a set of pilot signals in at least one resource unit of the plurality of resource units, and means for transmitting the generated set of pilot signals in the at least one resource unit of the plurality of resource units. In one configuration, the means for determining the plurality of resource units for communication may be configured to determine a communication bandwidth and to determine a number of usable tones per resource unit based on the determined communication bandwidth. In another configuration, the means for generating the set of pilot signals in the at least one resource unit may be configured to determine pilot tone locations associated with the at least one resource unit, to determine a pilot sequence associated with the determined pilot tone locations, and to determine pilot values for the determined pilot tone locations based on the determined pilot sequence and a pilot polarity sequence. In an aspect, the pilot sequence may be determined by shifting an initial pilot sequence based on a data symbol index. In another aspect, the at least one resource unit of the plurality of resource units may have 26 usable tones and 2 pilot tone locations, and the pilot sequence may be determined based on an initial pilot sequence {1, −1}. In another aspect, the at least one resource unit of the plurality of resource units may have 52 usable tones or 106 usable tones and may have 4 pilot tone locations, and the pilot sequence may be determined based on an initial pilot sequence {1, 1, 1, −1}. In another aspect, the at least one resource unit of the plurality of resource units may have 242 usable tones and may have 8 pilot tone locations, and the pilot sequence may be determined based on an initial pilot sequence {1, 1, 1, −1, −1, 1, 1, 1}. In another aspect, the at least one resource unit of the plurality of resource units may have 484 usable tones or 996 usable tones and may have 16 pilot tone locations, and the pilot sequence may be determined based on an initial pilot sequence {1, 1, 1, −1, −1, 1, 1, 1, 1, 1, 1, −1, −1, 1, 1, 1}. In another aspect, the at least one resource unit of the plurality of resource units may have 1992 usable tones and 32 pilot tone locations, and the pilot sequence may be determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another configuration, the generated the set of pilot signals may be based on a number of symbols in a SIG field of a preamble. In another configuration, the means for determining the pilot sequence may be configured to determine a communication bandwidth, to determine a base pilot sequence associated with the determined communication bandwidth, to determine a number of usable tones in the at least one resource unit, and to determine an initial pilot sequence based on the communication bandwidth, the determined base pilot sequence, and the determined number of usable tones. In another aspect, the generated set of pilot signals in the at least one resource unit may be based on the communication bandwidth, the determined pilot tone locations, and the determined pilot values. In another aspect, the communication bandwidth may be 20 MHz, and the determined base pilot sequence may be a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth may be 40 MHz, and the determined base pilot sequence may be a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth may be 80 MHz, and the determined base pilot sequence may be a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth may be 160 MHz, and the determined base pilot sequence may be a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence may be determined based on a set of nominal tone indices associated with the at least one resource unit. In another aspect, the pilot sequence may be determined by shifting the determined initial pilot sequence based on a data symbol index. In another aspect, each resource unit of the plurality of resource units has 26 usable tones. In this aspect, a communication bandwidth associated with the plurality of resource units may be 20 MHz, and the plurality of resource units may be associated with a plurality of pilot tone location sets {(−116, −102), (−90, −76), (−62, −48), (−36, −22), (−10, 10), (22, 36), (48, 62), (76, 90), (102, 116)}. In another aspect, each resource unit of the plurality of resource units may have 26 usable tones, and a communication bandwidth associated with the plurality of resource units may be 40 MHz, and the plurality of resource units may be associated with a plurality of pilot tone location sets {(−238, −224), (−212, −198), (−184, −170), (−158, −144), (−130, −116), (−104, −90), (−78, −64), (−50, −36), (−24, −10), (10, 24), (36, 50), (64, 78), (90, 104), (116, 130), (144, 158), (170, 184), (198, 212), (224, 238)}. In another aspect, each resource unit of the plurality of resource units has 26 usable tones, a communication bandwidth associated with the plurality of resource units may be 80 MHz, and the plurality of resource units may be associated with a plurality of pilot tone location sets {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units may have 26 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units may have 52 usable tones, a communication bandwidth associated with the plurality of resource units may be 20 MHz, and the plurality of resource units may be associated with a plurality of pilot tone location sets {(−116, −102, −90, −76), (−62, −48, −36, −22), (22, 36, 48, 62), (76, 90, 102, 116)}. In another aspect, each resource unit of the plurality of resource units may have 52 usable tones, a communication bandwidth associated with the plurality of resource units may be 40 MHz, and the plurality of resource units may be associated with a plurality of pilot tone location sets {(−238, −224, −212, −198), (−184, −170, −158, −144), (−104, −90, −78, −64), (−50, −36, −24, −10), (10, 24, 36, 50), (64, 78, 90, 104), (144, 158, 170, 184), (198, 212, 224, 238)}. In another aspect, each resource unit of the plurality of resource units may have 52 usable tones, a communication bandwidth associated with the plurality of resource units may be 80 MHz, and the plurality of resource units may be associated with a plurality of pilot tone location sets {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units may have 52 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units may have 106 usable tones, a communication bandwidth associated with the plurality of resource units may be 20 MHz, and the plurality of resource units may be associated with a plurality of pilot tone location sets {(−116, −90, −48, −22), (22, 48, 90, 116)}. In another aspect, each resource unit of the plurality of resource units may have 106 usable tones, a communication bandwidth associated with the plurality of resource units may be 40 MHz, and the plurality of resource units may be associated with a plurality of pilot tone location sets {(−238, −212, −170, −144), (−104, −78, −36, −10), (10, 36, 78, 104), (144, 170, 212, 238)}. In another aspect, each resource unit of the plurality of resource units may have 106 usable tones, a communication bandwidth associated with the plurality of resource units may be 80 MHz, and the plurality of resource units may be associated with a plurality of pilot tone location sets {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units may have 106 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units may have 242 usable tones, a communication bandwidth associated with the plurality of resource units may be 20 MHz, and the plurality of resource units may include a resource unit associated with a pilot tone location set {(−116, −90, −48, −22, 22, 48, 90, 116)}. In another aspect, each resource unit of the plurality of resource units may have 242 usable tones, a communication bandwidth associated with the plurality of resource units may be 40 MHz, and the plurality of resource units may be associated with a plurality of pilot tone location sets {(−238, −212, −170, −144, −104, −78, −36, −10), (10, 36, 78, 104, 144, 170, 212, 238)}. In another aspect, each resource unit of the plurality of resource units may have 242 usable tones, a communication bandwidth associated with the plurality of resource units may be 80 MHz, and the plurality of resource units may be associated with a plurality of pilot tone location sets {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units may have 242 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units may have 484 usable tones, a communication bandwidth associated with the plurality of resource units may be 40 MHz, and the plurality of resource units may include a resource unit associated with a pilot tone location set {(−238, −212, −170, −144, −104, −78, −36, −10, 10, 36, 78, 104, 144, 170, 212, 238)}. In another aspect, each resource unit of the plurality of resource units may have 484 usable tones, a communication bandwidth associated with the plurality of resource units may be 80 MHz, and the plurality of resource units may be associated with a plurality of pilot tone location sets {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units may have 484 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units may have 996 usable tones, a communication bandwidth associated with the plurality of resource units may be 80 MHz, and the plurality of resource units may include a resource unit associated with a pilot tone location set {(−468, −400, −334, −266, −226, −158, −92, −24, 24, 92, 158, 226, 266, 334, 400, 468)}. In another aspect, each resource unit of the plurality of resource units may have 996 usable tones, a communication bandwidth associated with the plurality of resource units may be 160 MHz, the plurality resource units may be associated with a first plurality of pilot tone location sets and a second plurality of pilot tone location sets, the first plurality of pilot tone location sets may be based on an initial plurality of pilot tone location sets adjusted by a first offset of −512 and the second plurality of pilot tone sets may be based on the initial plurality of pilot tone location sets adjusted by a second offset of 512, and the initial plurality of pilot tone location sets may be {(−468, −400, −334, −266, −226, −158, −92, −24, 24, 92, 158, 226, 266, 334, 400, 468)}. In another aspect, each resource unit of the plurality of resource units may have 1992 usable tones, a communication bandwidth associated with the plurality of resource units may be 160 MHz, and the plurality of resource units may include a resource unit associated with a pilot tone location set {(−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980)}. In another configuration, the apparatus may include means for allocating one or more resource units of the plurality of resource units to at least one wireless device and means for transmitting allocation information associated with the allocated one or more resource units to the at least one wireless device. In one aspect, the allocation information may include at least one of a set of tone indices, an identifier, a resource unit size that indicates a number of usable tones per resource unit, a communication bandwidth, or data symbol information. In another aspect, each resource unit of the plurality of resource units may have usable tones, 52 usable tones, 106 usable tones, 242 usable tones, 484 usable tones, 996 usable tones, or 1992 usable tones.

In another aspect, a computer-readable medium storing computer executable code for wireless communication is provided. The computer-readable medium may include code to determine a plurality of resource units for communication, to generate a set of pilot signals in at least one resource unit of the plurality of resource units, and to transmit the generated set of pilot signals in the at least one resource unit of the plurality of resource units Another aspect of this disclosure provides a wireless device (e.g., a station) for wireless communication. The wireless device is configured to receive a message indicating one or more resource units allocated to the wireless device for communication. The wireless device is configured to generate a set of pilot signals for the one or more resource units. The wireless device is configured to transmit data and the generated set of pilot signals in the one or more resource units.

In an aspect, a method of wireless communication is provided. The method may include receiving a message indicating one or more resource units allocated to the station for communication, generating a set of pilot signals for the one or more resource units based on the received message, and transmitting data and the generated set of pilot signals in the one or more resource units. In an aspect, the message may include allocation information that includes at least one of a set of tone indices, an identifier, a resource unit size that indicates a number of usable tones per resource unit, a communication bandwidth, or data symbol information. In one configuration, the generating the set of pilot signals may include determining pilot tone locations associated with the one or more resource units, determining a pilot sequence associated with the determined pilot tone locations, and determining pilot values for the determined pilot tone locations based on the determined pilot sequence and a pilot polarity sequence. In an aspect, the pilot sequence is determined by shifting an initial pilot sequence based on a data symbol index. In another aspect, each resource unit of the one or more resource units may have 26 usable tones and 2 pilot tone locations, and the pilot sequence may be determined based on an initial pilot sequence {1, −1}. In another aspect, each resource unit of the one or more resource units may have 52 usable tones or 106 usable tones and may have 4 pilot tone locations, and the pilot sequence may be determined based on an initial pilot sequence {1, 1, 1, −1}. In another aspect, each resource unit of the one or more resource units may have 242 usable tones and may have 8 pilot tone locations, and the pilot sequence may be determined based on an initial pilot sequence {1, 1, 1, −1, −1, 1, 1, 1}. In another aspect, each resource unit of the one or more resource units may have 484 usable tones or 996 usable tones and may have 16 pilot tone locations, and the pilot sequence may be determined based on an initial pilot sequence {1, 1, 1, −1, −1, 1, 1, 1, 1, 1, 1, −1, −1, 1, 1, 1}. In another aspect, each resource unit of the one or more resource units may have 1992 usable tones and 32 pilot tone locations, and the pilot sequence may be determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another aspect, the generated set of pilot signals may be based on a number of symbols in a SIG field of a preamble. In another configuration, the determining the pilot sequence may include determining a communication bandwidth, determining a base pilot sequence associated with the determined communication bandwidth, determining a number of usable tones in the at least one resource unit, and determining an initial pilot sequence based on the communication bandwidth, the determined base pilot sequence, and the determined number of usable tones. In another aspect, the generated set of pilot signals in the at least one resource unit may be based on the communication bandwidth, the determined pilot tone locations, and the determined pilot values. In another aspect, the communication bandwidth may be 20 MHz, and the determined base pilot sequence may be a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth may be 40 MHz, and the determined base pilot sequence may be a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth may be 80 MHz, and the determined base pilot sequence may be a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth may be 160 MHz, and the determined base pilot sequence may be a first base pilot sequence {1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, 1, 1, −1, −1, 1, 1, 1, −1, −1, −1, 1, 1, −1, 1, −1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence may be determined based on a set of nominal tone indices associated with the at least one resource unit. In another aspect, the pilot sequence may be determined by shifting the determined initial pilot sequence based on a data symbol index.

In another aspect, an apparatus for wireless communication is provided. The apparatus may include a memory and at least one processor. The at least one processor may be configured to receive a message indicating one or more resource units allocated to the station for communication, to generate a set of pilot signals for the one or more resource units based on the received message, and to transmit data and the generated set of pilot signals in the one or more resource units. In an aspect, the message may include allocation information that includes at least one of a set of tone indices, an identifier, a resource unit size that indicates a number of usable tones per resource unit, a communication bandwidth, or data symbol information. In one configuration, the at least one processor may be configured to generate the set of pilot signals by determining pilot tone locations associated with the one or more resource units, by determining a pilot sequence associated with the determined pilot tone locations, and by determining pilot values for the determined pilot tone locations based on the determined pilot sequence and a pilot polarity sequence. In an aspect, the pilot sequence is determined by shifting an initial pilot sequence based on a data symbol index. In another aspect, each resource unit of the one or more resource units may have 26 usable tones and 2 pilot tone locations, and the pilot sequence may be determined based on an initial pilot sequence {1, −1}. In another aspect, each resource unit of the one or more resource units may have 52 usable tones or 106 usable tones and may have 4 pilot tone locations, and the pilot sequence may be determined based on an initial pilot sequence {1, 1, 1, −1}. In another aspect, each resource unit of the one or more resource units may have 242 usable tones and may have 8 pilot tone locations, and the pilot sequence may be determined based on an initial pilot sequence {1, 1, 1, −1, −1, 1, 1, 1}. In another aspect, each resource unit of the one or more resource units may have 484 usable tones or 996 usable tones and may have 16 pilot tone locations, and the pilot sequence may be determined based on an initial pilot sequence {1, 1, 1, −1, −1, 1, 1, 1, 1, 1, 1, −1, −1, 1, 1, 1}. In another aspect, each resource unit of the one or more resource units may have 1992 usable tones and 32 pilot tone locations, and the pilot sequence may be determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another aspect, the generated set of pilot signals may be based on a number of symbols in a SIG field of a preamble. In another configuration, the at least one processor may be configured to determine the pilot sequence by determining a communication bandwidth, by determining a base pilot sequence associated with the determined communication bandwidth, by determining a number of usable tones in the at least one resource unit, and by determining an initial pilot sequence based on the communication bandwidth, the determined base pilot sequence, and the determined number of usable tones. In another aspect, the generated set of pilot signals in the at least one resource unit may be based on the communication bandwidth, the determined pilot tone locations, and the determined pilot values. In another aspect, the communication bandwidth may be 20 MHz, and the determined base pilot sequence may be a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth may be 40 MHz, and the determined base pilot sequence may be a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth may be 80 MHz, and the determined base pilot sequence may be a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth may be 160 MHz, and the determined base pilot sequence may be a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, −1, 1, 1, −1, −1, −1, 1, −1, 1, −1, 1, 1, 1, −1, −1, 1, 1, −1, −1, 1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, −1, −1, −1, −1, −1, 1, 1, −1, 1, −1, −1, −1, −1, 1, −1, 1, 1, −1, −1, 1, −1, 1, −1, 1, −1, −1, 1}. In another aspect, the initial pilot sequence may be determined based on a set of nominal tone indices associated with the at least one resource unit. In another aspect, the pilot sequence may be determined by shifting the determined initial pilot sequence based on a data symbol index.

In another aspect, an apparatus for wireless communication is provided. The apparatus may include means for receiving a message indicating one or more resource units allocated to the station for communication, means for generating a set of pilot signals for the one or more resource units based on the received message, and means for transmitting data and the generated set of pilot signals in the one or more resource units. In an aspect, the message may include allocation information that includes at least one of a set of tone indices, an identifier, a resource unit size that indicates a number of usable tones per resource unit, a communication bandwidth, or data symbol information. In one configuration, the means for generating the set of pilot signals may be configured to determine pilot tone locations associated with the one or more resource units, to determine a pilot sequence associated with the determined pilot tone locations, and to determine pilot values for the determined pilot tone locations based on the determined pilot sequence and a pilot polarity sequence. In an aspect, the pilot sequence is determined by shifting an initial pilot sequence based on a data symbol index. In another aspect, each resource unit of the one or more resource units may have 26 usable tones and 2 pilot tone locations, and the pilot sequence may be determined based on an initial pilot sequence {1, −1}. In another aspect, each resource unit of the one or more resource units may have 52 usable tones or 106 usable tones and may have 4 pilot tone locations, and the pilot sequence may be determined based on an initial pilot sequence {1, 1, 1, −1}. In another aspect, each resource unit of the one or more resource units may have 242 usable tones and may have 8 pilot tone locations, and the pilot sequence may be determined based on an initial pilot sequence {1, 1, 1, −1, −1, 1, 1, 1}. In another aspect, each resource unit of the one or more resource units may have 484 usable tones or 996 usable tones and may have 16 pilot tone locations, and the pilot sequence may be determined based on an initial pilot sequence {1, 1, 1, −1, −1, 1, 1, 1, 1, 1, 1, −1, −1, 1, 1, 1}. In another aspect, each resource unit of the one or more resource units may have 1992 usable tones and 32 pilot tone locations, and the pilot sequence may be determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another aspect, the generated set of pilot signals may be based on a number of symbols in a SIG field of a preamble. In another configuration, the means for determining the pilot sequence may be configured to determine a communication bandwidth, to determine a base pilot sequence associated with the determined communication bandwidth, to determine a number of usable tones in the at least one resource unit, and to determine an initial pilot sequence based on the communication bandwidth, the determined base pilot sequence, and the determined number of usable tones. In another aspect, the generated set of pilot signals in the at least one resource unit may be based on the communication bandwidth, the determined pilot tone locations, and the determined pilot values. In another aspect, the communication bandwidth may be 20 MHz, and the determined base pilot sequence may be a first base pilot sequence {1, 1, 1, –1, 1, 1, –1, –1, 1, 1, –1, 1, –1, 1, 1, 1, 1, –1} or a second base pilot sequence {1, –1, –1, –1, –1, 1, –1, 1, –1, –1, 1, 1, –1, –1, 1, –1, –1, –1}. In another aspect, the communication bandwidth may be 40 MHz, and the determined base pilot sequence may be a first base pilot sequence {1, –1, 1, –1, –1, 1, –1, 1, –1, 1, –1, –1, –1, 1, –1, 1, 1, 1, 1, –1, –1, –1, –1, –1, –1, 1, –1, –1, –1, –1, 1, 1, –1, –1, 1, 1} or a second base pilot sequence {1, 1, –1, –1, 1, 1, –1, –1, –1, –1, 1, –1, –1, –1, –1, –1, –1, 1, 1, 1, 1, –1, 1, –1, –1, –1, 1, –1, 1, –1, 1, –1, –1, 1, –1, 1}. In another aspect, the communication bandwidth may be 80 MHz, and the determined base pilot sequence may be a first base pilot sequence {–1, 1, 1, 1, –1, –1, 1, 1, –1, –1, 1, –1, 1, –1, 1, 1, –1, 1, –1, 1, 1, 1, 1, 1, –1, –1, 1, 1, 1, 1, 1, –1, 1, –1, –1, –1, 1, –1, 1, –1, 1, –1, –1, –1, –1, –1, 1, –1, –1, 1, 1, –1, 1, 1, –1, –1, 1, –1, 1, 1, –1, 1, –1, 1, –1, –1, –1, –1, 1, 1, –1, –1, –1, 1} or a second base pilot sequence {–1, 1, 1, 1, 1, –1, –1, 1, 1, 1, –1, –1, –1, 1, 1, –1, 1, –1, 1, 1, –1, –1, 1, –1, –1, 1, 1, –1, 1, 1, 1, 1, 1, –1, 1, –1, 1, –1, 1, 1, 1, 1, –1, –1, –1, –1, –1, –1, 1, –1, –1, –1, –1, –1, 1, 1, –1, 1, –1, –1, –1, –1, 1, –1, 1, 1, –1, –1, 1, –1, 1, –1, –1, 1}. In another aspect, the communication bandwidth may be 160 MHz, and the determined base pilot sequence may be a first base pilot sequence {–1, 1, 1, 1, –1, –1, 1, 1, –1, –1, 1, –1, 1, –1, 1, 1, –1, 1, –1, 1, 1, 1, 1, 1, –1, –1, 1, 1, 1, 1, 1, –1, 1, –1, –1, –1, 1, –1, 1, –1, 1, –1, –1, –1, –1, –1, 1, –1, –1, 1, 1, –1, 1, 1, –1, –1, 1, –1, 1, 1, –1, 1, –1, 1, –1, –1, –1, –1, 1, 1, –1, –1, –1, 1, –1, 1, 1, 1, –1, –1, 1, 1, –1, –1, 1, –1, 1, –1, 1, 1, –1, 1, –1, 1, 1, 1, 1, 1, –1, –1, 1, 1, 1, 1, 1, –1, 1, –1, –1, –1, 1, –1, 1, –1, 1, –1, –1, –1, –1, –1, 1, –1, –1, 1, 1, –1, 1, 1, –1, –1, 1, –1, 1, 1, –1, 1, –1, 1, –1, –1, –1, –1, 1, 1, –1, –1, –1, 1} or a second base pilot sequence {–1, 1, 1, 1, 1, –1, –1, 1, 1, 1, –1, –1, –1, 1, 1, –1, 1, –1, 1, 1, –1, –1, 1, –1, –1, 1, 1, –1, 1, 1, 1, 1, 1, –1, 1, –1, 1, –1, 1, 1, 1, 1, –1, –1, –1, –1, –1, –1, 1, –1, –1, –1, –1, –1, 1, 1, –1, 1, –1, –1, –1, –1, 1, –1, 1, 1, –1, –1, 1, –1, 1, –1, –1, 1, –1, 1, 1, 1, 1, –1, –1, 1, 1, 1, –1, –1, –1, 1, 1, –1, 1, –1, 1, 1, –1, –1, 1, –1, –1, 1, 1, –1, 1, 1, 1, 1, 1, –1, 1, –1, 1, –1, 1, 1, 1, 1, –1, –1, –1, –1, –1, –1, 1, –1, –1, –1, –1, –1, 1, 1, –1, 1, –1, –1, –1, –1, 1, –1, 1, 1, –1, –1, 1, –1, 1, –1, –1, 1}. In another aspect, the initial pilot sequence may be determined based on a set of nominal tone indices associated with the at least one resource unit. In another aspect, the pilot sequence may be determined by shifting the determined initial pilot sequence based on a data symbol index.

In another aspect, a computer-readable medium storing computer executable code for wireless communication is provided. The computer-readable medium may include code to receive a message indicating one or more resource units allocated to the station for communication, to generate a set of pilot signals for the one or more resource units based on the received message, and to transmit data and the generated set of pilot signals in the one or more resource units.

DETAILED DESCRIPTION

Figure 1:
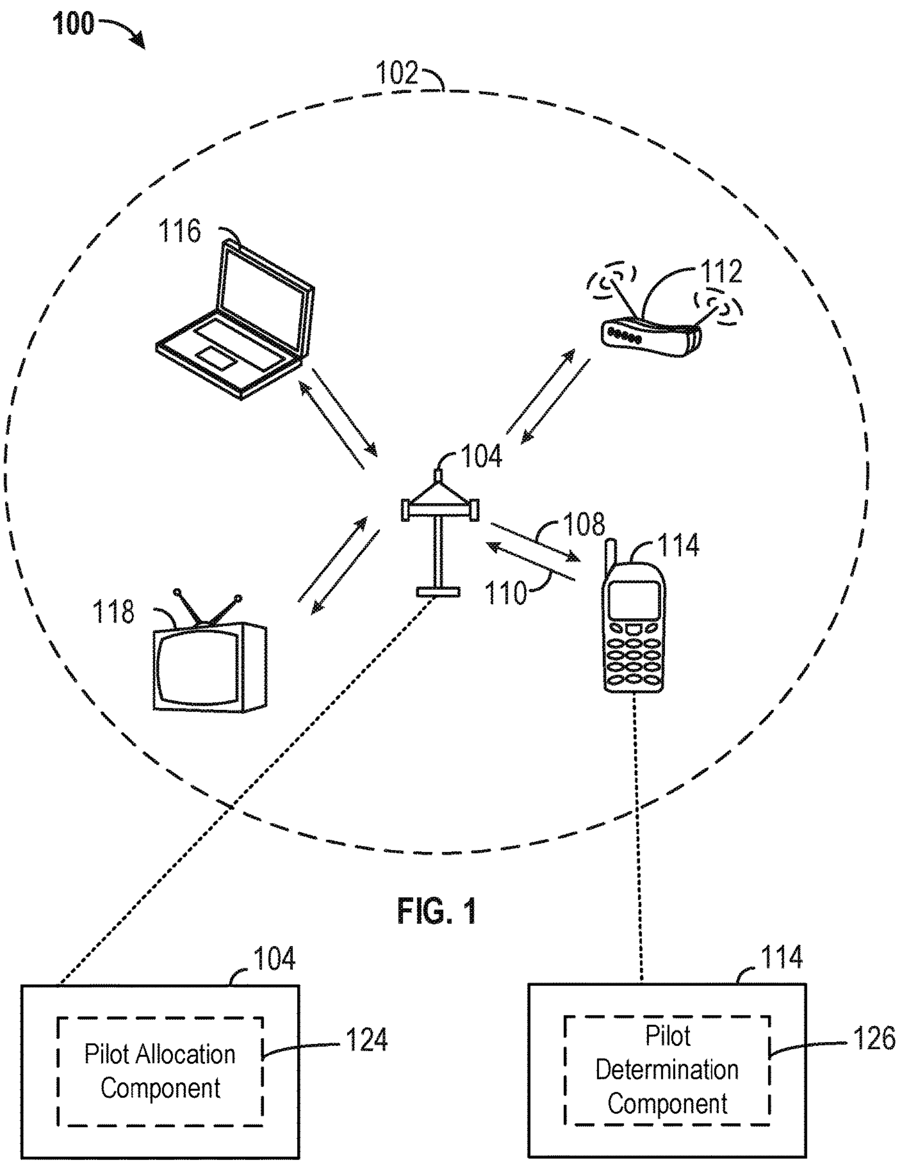
FIG. 1 shows an example wireless communication system in which aspects of the present disclosure may be employed.

Various aspects of the novel systems, apparatuses, computer-readable medium, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer-readable media, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A STA may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a STA may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams, and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components (or circuits) for performing various functions. For example, the AP 104 may include a pilot allocation component 124 (e.g., a pilot allocation circuit) configured to perform procedures related to allocating resource units and generating pilot signals for data transmission. In this example, the pilot allocation component 124 may be configured to determine a plurality of resource units for communication, to generate a set of pilot signals in at least one resource unit of the plurality of resource units, and to transmit the generated set of pilot signals in the at least one resource unit of the plurality of resource units.

In another aspect, the STA 114 may include one or more components (or circuits) for performing various functions. For example, the STA 114 may include a pilot determination component 126 configured to perform procedures related to generating pilot signals for data transmission. In this example, the pilot determination component 126 may be configured to receive a message from the AP 104 indicating one or more resource units allocated to the STA 114 for communication, to generate a set of pilot signals for the one or more resource units, and to transmit data and the generated set of pilot signals in the one or more resource units.

In Wi-Fi networks, data may be communicated in a packet (also referred to as a frame) over a wireless medium using a waveform that may be modulated over a fixed frequency band during a fixed period of time. The frequency band may be divided into groups of one or more tones, and the period of time may be divided into one or more symbols. As an example, a 20 MHz frequency band may be divided in four 5 MHz tones (or another number of tones) and an 80 microsecond period may be divided into twenty 4 microsecond symbols (or another number of symbols with different symbol durations). Accordingly, a "tone" may represent a frequency sub-band. A tone may alternatively be referred to as a subcarrier. A tone may thus be a unit of frequency. A symbol may be a unit of time representing a duration of time. Thus, the waveform for the packet may be visualized as a two-dimensional structure that includes one or more tones (often on a vertical axis in units of frequency) and one or more symbols (often on a horizontal axis in units of time).

Each symbol may include a number of tones (or frequencies or subcarriers) on which information may be transmitted. A symbol also has symbol duration (e.g. 1× symbol duration (or 4 μs), 2× symbol duration (or 8 μs), or 4× symbol duration (or 16 μs)). Symbols with longer symbol duration (e.g., 4× symbol duration) may have more tones and longer time duration, and symbols with shorter symbol duration (e.g. 1× symbol duration) may have less tones and shorter time duration. For example, in a first symbol with a 4× symbol duration, the first symbol may be four times longer in time than a second symbol with a 1× symbol duration. The first symbol may have four times as many tones as the second symbol with a 1× symbol duration. The first symbol may have one-fourth of the tone spacing compared to a second symbol with 1× symbol duration.

In wireless networks, data transmitted on symbols either in the uplink or the downlink may include data and pilot signals. The pilot signals may be used to track a phase drift in the received data symbols. The phase drift may be a result of a wireless device's timing error and/or a frequency offset. In an aspect, the phase drift value for a symbol may linearly increase with time, so the longer the symbol duration, the larger the phase offset, and the more significant the impact on performance. One method of performing phase tracking is using single stream pilots. For example, in future IEEE standards (e.g., the IEEE 802.11ax standard), a physical layer convergence protocol (PLCP) protocol data unit (PPDU) may use single stream pilots. In an aspect, all streams may use the same pilot sequence (e.g., even in uplink multi-user MIMO). Single stream pilots may be used in a long training field (LTF), such as a high-efficiency (RE) LTF or RE-LTF. Single stream pilots may also be used in single user, downlink and uplink OFDMA, and multi-user MIMO transmissions. As such, a need exists for determining the pilot signals to be used (e.g., the pilot signals in data symbols) in single stream pilots.

Figure 2:
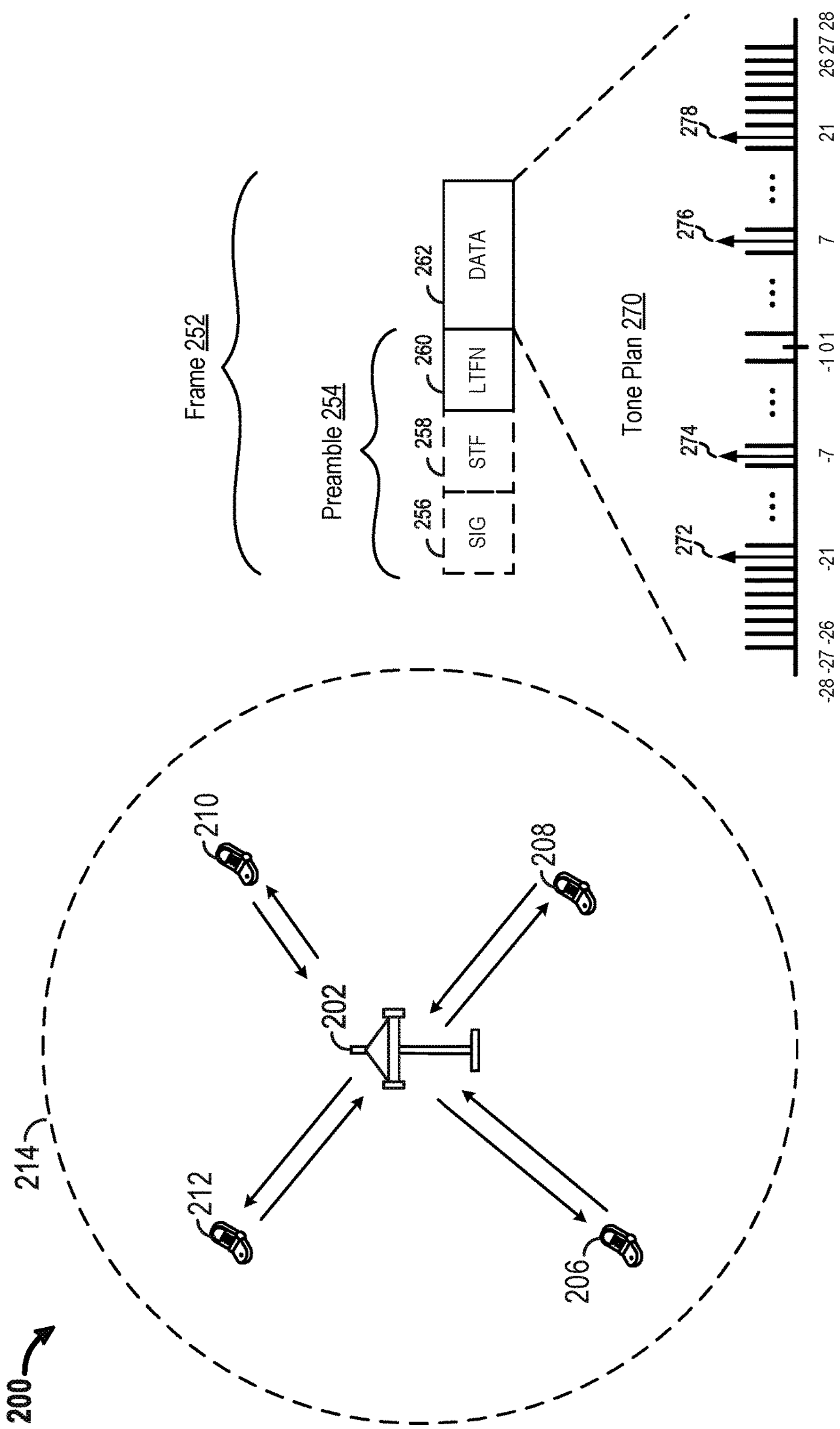
FIG. 2 is an exemplary diagram of a wireless network.

FIG. 2 is an exemplary diagram 200 of a wireless network. The diagram 200 illustrates an AP 202 broadcasting/transmitting within a service area 214. STAs 206, 208, 210, 212 are within the service area 214 of the AP 202 (although only four STAs are shown in FIG. 2, more or less STAs may be within the service area 214 of the AP 202).

Referring to FIG. 2, the STA 206, for example, may transmit packets to the AP 202 in the form of a frame 252 and vice versa. The frame 252 may include a preamble 254 and data symbols 262. The preamble 254 may be considered a header of the frame 252 with information identifying a modulation scheme, a transmission rate, and a length of time to transmit the frame 252. The preamble 254 may include a SIG field 256, a short training field (STF) 258, and one or more LTF symbols 260 (e.g., LTF1, LTF2, . . . , LTFN). The SIG field 256 may be used to transfer rate and length information associated with the frame 252. The STF 258 may be used to improve automatic gain control (AGC) in a multi-transmit and multi-receive system. The LTF symbols 260 may provide the information needed for a receiver (e.g., the AP 202) to perform channel estimation.

In one aspect, due to phase drift, the data symbols 262 transmitted by the STAs 206, 208, 210, 212 to the AP 202 (or vice versa) may not be orthogonal. To estimate phase drift in the data symbols 262 for each of the STAs 206, 208, 210, 212, pilot signals may be allocated for transmission in the data symbols 262 for uplink transmission. Similarly, pilot signals may be allocated for transmission in the data symbols 262 for downlink transmission.

In one aspect, the data symbols 262 may be associated with a tone plan 270. The tone plan 270 may indicate, in a data symbol, which tones are guard (or edge) tones, data tones, pilot tones, and DC tones. In an aspect, the tone plan 270 may have 64 tones located within a tone indices range of −32 to 31 or [−32:31]. As shown in FIG. 2, however, not all tones indices are pictured. The tone indices [−32:−29] and [29:31] may be guard tones, which may be tones that have zero amplitude and used to provide isolation or system separation from neighboring transmissions/symbols in order to reduce the likelihood of tones from different symbols bleeding together. A DC tone, which may be located at tone index 0 in the tone plan 270, has no power and may be used for AGC setup. Although this example illustrates one DC tone at tone index 0, additional DC tones may be used (e.g., 3 DC tones may be located at tone indices −1, 0, 1). In this example, the remaining tone indices [−28:−1] and [1:28] contain "usable" tones for transmitting data and pilot signals. The remaining tones—guard tones, DC tones—may be considered "unusable." As such, usable tones may be all tones within a symbol excluding guard tones and DC tones. Referring to the tone plan 270, pilot signals 272, 274, 276, 278 may be transmitted on tone indices −21, −7, 7, 21. Because the number of pilot signals and the tone location in which a pilot signal is transmitted within a symbol may affect the accuracy of any corrections, a tone plan may indicate the tone index in which a pilot may be transmitted (e.g., where in the symbol a pilot is to be transmitted) and the number of pilots to be transmitted.

As an example, a wireless device (e.g., the STA 206) may receive a frame via a 20 MHz wireless channel (e.g., a channel having a 20 MHz bandwidth). The wireless device may perform a 64-point Fast Fourier Transform (FFT) to determine 64 tones in a waveform of the frame. A subset of the tones may be considered "usable" and the remaining tones may be considered "unusable." To illustrate, 56 of the 64 tones may be usable, including 52 data tones and 4 pilot tones. It should be noted that the aforementioned channel bandwidths, transforms, and tone plans are just exemplary. In other embodiments, different channel bandwidths (e.g., 40 MHz, 80 MHz, 160 MHz, etc.), different transforms (e.g., 256-point FFT, 1024-point FFT, etc.), and/or different tone plans, including those as shown below, may be used.

In an aspect, wireless devices compliant with future IEEE standards, such as high efficiency wireless (HEW) stations compliant with the future IEEE 802.11ax standard, may compete or coordinate with each other to access the wireless medium. For example, referring to FIG. 2, the STAs 206, 208, 210, 212 may be HEW STAs. In an aspect, HEW STAs may be able to communicate using a 4× symbol duration. When using a 4× symbol duration (e.g., 12.8 μs when guard tones are excluded), each of the individual tones may utilize one-quarter as much bandwidth to be transmitted compared to tones associated with symbols of 1× symbol duration (e.g., 3.2 μs when guard tones are excluded).

Figure 3:
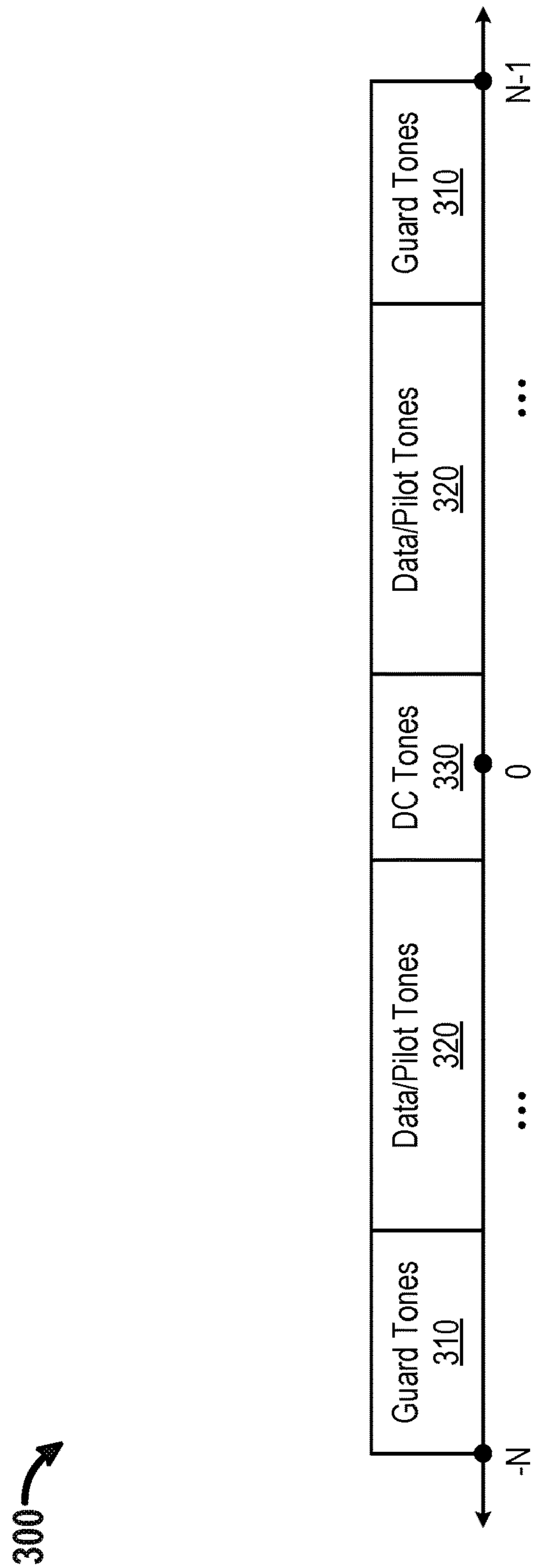
FIG. 3 illustrates a tone plan for multicarrier allocation.

FIG. 3 illustrates a tone plan 300 for multicarrier allocation. The tone plan 300 may include 2N OFDM tones indexed from −N to N−1 where N is an integer. In an aspect, the tone plan 300 may correspond to OFDM tones, in the frequency domain, generated using a 2N-point FFT. The tone plan 300 may include two sets of guard tones 310, two sets of data/pilot tones 320, and a set of direct current (DC) tones 330. In an aspect, the guard tones 310 and DC tones 330 may be null. In another aspect, the tone plan 300 may include any suitable number of pilot tones and/or may include pilot tones at any suitable tone locations.

In some aspects, OFDMA tone plans may be provided for transmission using a 4× symbol duration, as compared to various IEEE 802.11 protocols. For example, 4× symbol duration may use a number of symbols which are each 12.8 μs in duration (whereas symbols in certain other IEEE 802.11 protocols may be 3.2 μs in duration).

In some aspects, the data/pilot tones 320 of the tone plan 300 may be divided among any number of different users or STAs. For example, the data/pilot tones 320 may be divided among one to eight users. In order to divide the data/pilot tones 320, an AP or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. In one aspect, it may be beneficial to have a simple tone plan, which may be consistent across most or all bandwidths. For example, an OFDMA transmission may be transmitted over 20, 40, or 80 MHz, and it may be desirable to use a tone plan that can be used for any of these bandwidths. Further, a tone plan may be simple in that the tone plan uses a smaller number of building block sizes. For example, a tone plan may contain a unit which may be referred to as a resource unit (RU) that includes a set of wireless resources. A resource unit may be used to assign a particular amount of bandwidth to a particular user. For example, one user may be assigned bandwidth as a number of RUs, and the data/pilot tones 320 of a transmission may be broken up into a number of RUs. In some aspects, it may be beneficial to have a single RU size. For example, if there were two or more RU sizes, more signaling may be required to inform a device of the tones that are allocated to that device. If all tones are broken up into RUs of consistent size, signaling to a device may simply require informing a device of a number of RUs assigned to that device. However, enabling different RU sizes may also provide greater flexibility in wireless transmission. As such, depending on circumstances, it may be beneficial to have either RUs of consistent size or of different sizes.

In another aspect, a tone plan may also be chosen based on efficiency. For example, transmissions of different bandwidths (e.g., 20, 40, or 80 MHz) may have a different numbers of tones. Thus, it may be beneficial to choose an RU size that leaves fewer tones leftover after the creation of the RUs. For example, if an RU has 200 tones, and if a certain transmission includes 101 tones, this may leave 99 tones leftover after creating one RU. Thus, 99 tones may be considered "leftover" tones, which may lead to inefficiencies. Accordingly, reducing the number of leftover tones may be beneficial. It may also be beneficial if a tone plan is used which allows for the same tone plan to be used in both UL and DL OFDMA transmissions.

Figure 4:
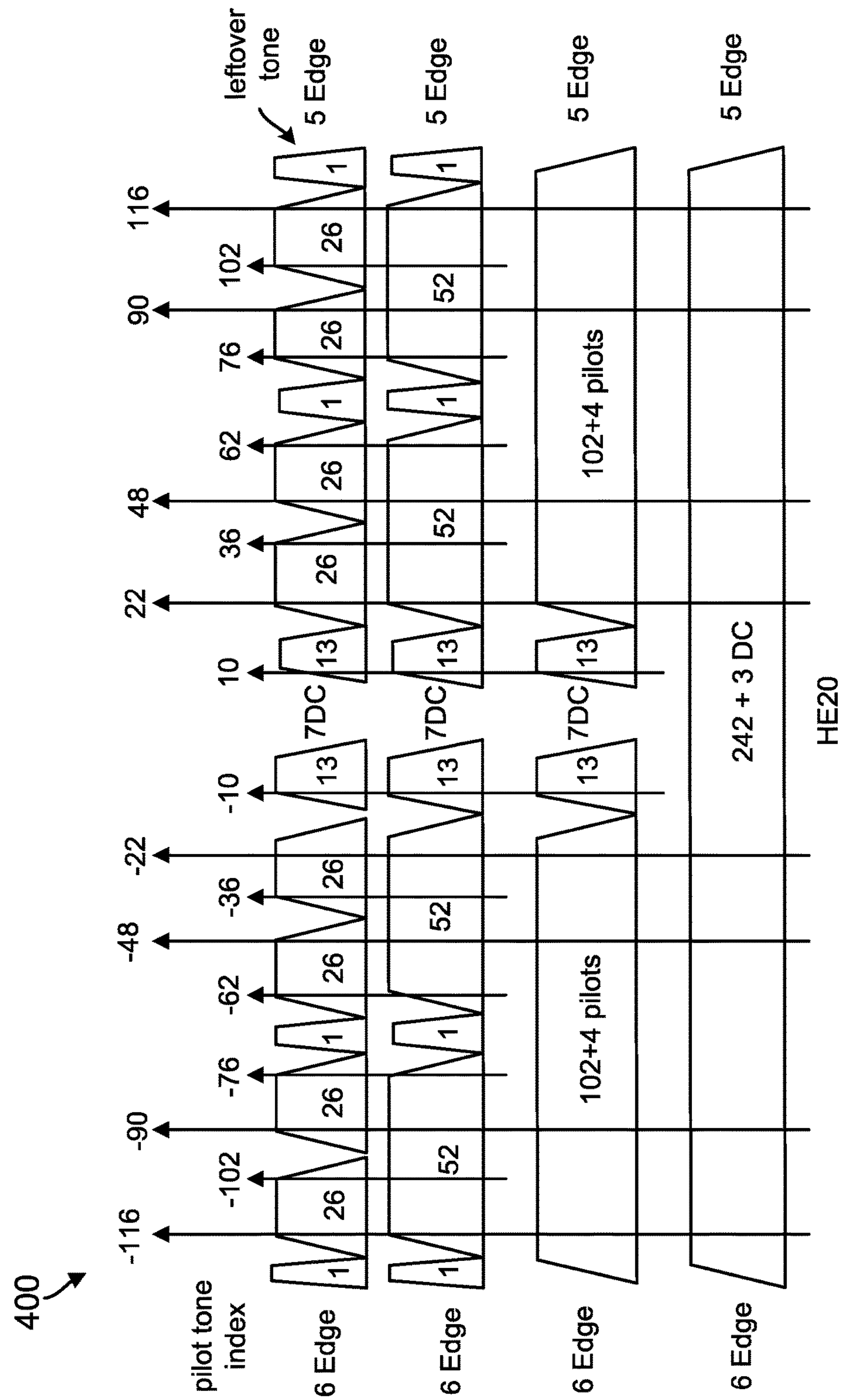
FIG. 4 illustrates resource unit configurations and pilot tone locations for a 20 MHz symbol.

FIG. 4 illustrates resource unit configurations and pilot tone locations for a 20 MHz symbol 400. In an aspect, the 20 MHz symbol 400 may be a data or LTF symbol with a 4× symbol duration. Referring to FIG. 4, four different RU configurations (e.g., 26-tone, 52-tone 106-tone, 242-tone) for the 20 MHz symbol 400 are provided. Other RU configurations may also be used. In the first (or top) row, a number (or plurality) of 26-tone RUs, specifically 9 26-tone RUs, are provided. In the middle of the row, one of the RUs may be split into two half-RUs located around the 7 DC tones, and each half-RU may have 13 tones. At the ends of the row may be 6 edge or guard tones (on the left) and 5 edge tones (on the right). Dispersed in between some of the RUs may be "leftover" tones, which may consist of 1 tone. In the first row, four leftover tones are provided. In an aspect, leftover tones may not have any energy. In this row, each RU of the 9 RUs may have 26 usable tones of which 24 may be data tones and 2 may be pilot tones. That is, the upward arrows within the RU represent pilot tones. For example, the first RU may have pilot tone locations at tone indices −116, −102. The second RU may have pilot tone locations at tone indices −90, −76, and so on. The 9 26-tone RUs may be associated with the following 9 sets of pilot tone locations {(−116, −102), (−90, −76), (−62, −48), (−36, −22), (−10, 10), (22, 36), (48, 62), (76, 90), (102, 116)}. In an aspect, one or more wireless devices (e.g., the AP 202 or the STAs 206, 208, 210, 212) may be allocated one or more RUs.

In the second row, a number of RUs, specifically 5 RUs, are provided. In the middle of the row, a 26-tone RU may be split into two half-RUs located around the 7 DC tones, and each half-RU may have 13 tones. At the ends of the row may be 6 edge or guard tones (on the left) and 5 edge tones (on the right). Dispersed in between some of the RUs may be leftover tones, which may consist of 1 tone. In the second row, four leftover tones are provided. In this row, 4 RUs may have 52 usable tones and the middle RU may have 26 usable tones. The 4 RUs with 52 usable tones may have 48 data tones and 4 pilot tones. The RU with 26 usable tones may have 24 data tones and 2 pilot tones. For example, the first RU with 52 tones may have pilot tone locations at tone indices −116, −102, −90, −76. The second 52-tone RU may have pilot tone locations at tone indices −62, −48, −36, −22, and so on. The 4 52-tone RUs may be associated with the following 4 sets of pilot tone locations {(−116, −102, −90, −76), (−62, −48, −36, −22), (22, 36, 48, 62), (76, 90, 102, 116)}, and the 26-tone RU in the middle of the row may be associated with the following set of pilot tone locations {(−10, 10)}. In an aspect, one or more wireless devices (e.g., the AP 202 or the STAs 206, 208, 210, 212) may be allocated one or more RUs.

In the third row, a number of RUs, specifically 3 RUs, are provided. In the middle of the row, a 26-tone RU may be split into two half-RUs located around the 7 DC tones, and each half-RU may have 13 tones. At the ends of the row may be 6 edge or guard tones (on the left) and 5 edge tones (on the right). In this row, no leftover tones are provided. In this row, 2 RUs may have 106 usable tones and the middle RU may have 26 usable tones. The 2 RUs with 106 usable tones may have 102 data tones and 4 pilot tones. The RU with 26 usable tones may have 24 data tones and 2 pilot tones. For example, the first RU with 106 tones may have pilot tone locations at tone indices −116, −90, −48, −22. The second 106-tone RU may have pilot tone locations at tone indices 22, 48, 90, 116. The 2 106-tone RUs may be associated with the following 2 sets of pilot tone locations {(−116, −90, −48, −22), (22, 48, 90, 116)}, and the 26-tone RU in the middle of the row may be associated with the following set of pilot tone locations {(−10, 10)}. In an aspect, one or more wireless devices (e.g., the AP 202 or the STAs 206, 208, 210, 212) may be allocated one or more RUs.

In the fourth row, a single user RU is provided. In this row, 3 DC tones may be located in the middle of the RU (e.g., at tone indices −1, 0, 1). In this row, the RU may have 242 usable tones of which 234 may be data tones and 8 may be pilot tones. The 242-tone RU may be associated with the following set of pilot tone locations {(−116, −90, −48, −22, 22, 48, 90, 116)}. In an aspect, the 242-tone RU may be allocated to one wireless device.

In an aspect, RUs within a symbol may be allocated with an identical number of tones. For example, all RUs may be allocated 26-tones, and any wireless device allocated an RU may be given 26-tones. In this example, a wireless device may be allocated multiple RUs with 26-tones. In another aspect, RUs within a symbol may be allocated with a different number of tones, such as a combination of the RUs provided in FIG. 4. For example, the AP 202 may be allocated the first 26-tone RU in the first row, the STA 206 may be allocated the second 26-tone RU in the first row, the STA 208 may be allocated the second 52-tone RU in the second row, the STA 210 may be allocated the middle 26-tone RU, and the STA 212 may be allocated the second 106-tone RU in the third row. In another aspect, the entire 20 MHz bandwidth need not be allocated. Gaps in RU allocation may be acceptable.

Figure 5A:
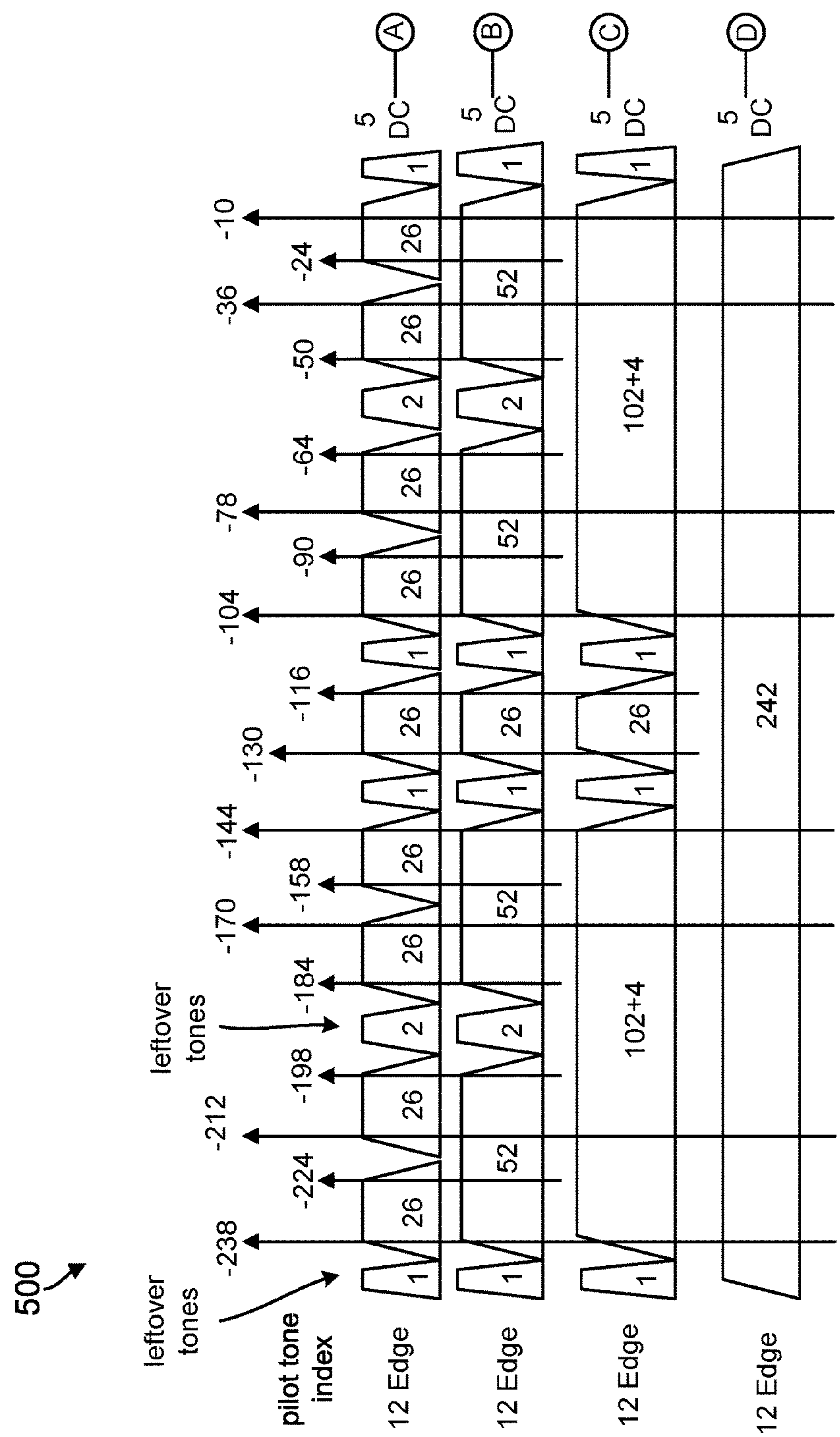
FIGS. 5A and 5B illustrate resource unit configurations and pilot tone locations for a 40 MHz symbol.
Figure 5B:
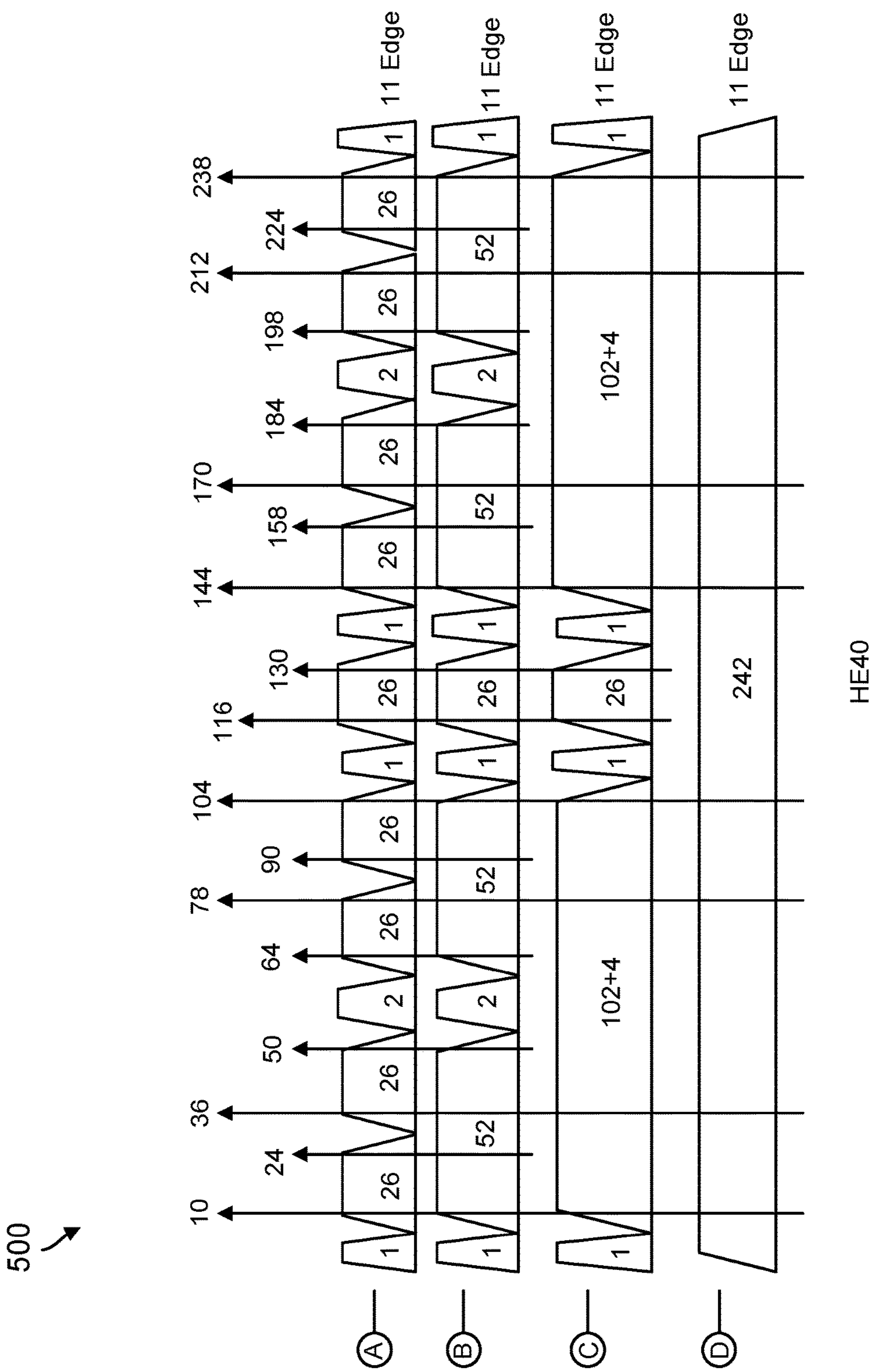

FIGS. 5A and 5B illustrate resource unit configurations and pilot tone locations for a 40 MHz symbol 500. In an aspect, the 40 MHz symbol 500 may be a data or LTF symbol with a 4× symbol duration. Referring to FIGS. 5A and 5B, four different RU configurations (e.g., 26-tone, 52-tone, 106-tone, 242-tone) for the 40 MHz symbol 500 are provided. Other RU configurations may also be used. In the first (or top) row, a number (or plurality) of 26-tone RUs, specifically 18 26-tone RUs, are provided. At the ends of the row may be 12 edge or guard tones (on the left) and 11 edge tones (on the right). Dispersed in between some of the RUs may be "leftover" tones, which may consist of 1 or 2 tones. In an aspect, leftover tones may not have any energy. In this row, each RU of the 18 RUs may have 26 usable tones of which 24 may be data tones and 2 may be pilot tones. That is, the upward arrows within the RU represent pilot tones. For example, the first RU may have pilot tone locations at tone indices −238, −224. The second RU may have pilot tone locations at tone indices −212, −198, and so on. The 18 26-tone RUs may be associated with the following 18 sets of pilot tone locations {(−238, −224), (−212, −198), (−184, −170), (−158, −144), (−130, −116), (−104, −90), (−78, −64), (−50, −36), (−24, −10), (10, 24), (36, 50), (64, 78), (90, 104), (116, 130), (144, 158), (170, 184), (198, 212), (224, 238)}. In an aspect, one or more wireless devices (e.g., the AP 202 or the STAs 206, 208, 210, 212) may be allocated one or more RUs.

In the second row, a number of RUs, specifically 10 RUs, are provided. At the ends of the row may be 12 edge or guard tones (on the left) and 11 edge tones (on the right). Dispersed in between some of the RUs may be leftover tones, which may consist of 1 or 2 tones. In this row, 8 RUs may have 52 usable tones and 2 RUs may have 26 usable tones. The 8 RUs with 52 usable tones may have 48 data tones and 4 pilot tones. The 2 RUs with 26 usable tones may have 24 data tones and 2 pilot tones. For example, the first RU with 52 tones may have pilot tone locations at tone indices −238, −224, −212, −198. The second 52-tone RU may have pilot tone locations at tone indices −184, −170, −158, −144, and so on. The 8 52-tone RUs may be associated with the following 8 sets of pilot tone locations {(−238, −224, −212, −198), (−184, −170, −158, −144), (−104, −90, −78, −64), (−50, −36, −24, −10), (10, 24, 36, 50), (64, 78, 90, 104), (144, 158, 170, 184), (198, 212, 224, 238)}, and the 2 26-tone RUs may be associated with the following 2 sets of pilot tone locations {(−130, −116), (116, 130)}. In an aspect, one or more wireless devices (e.g., the AP 202 or the STAs 206, 208, 210, 212) may be allocated one or more RUs.

In the third row, a number of RUs, specifically 6 RUs, are provided. At the ends of the row may be 12 edge or guard tones (on the left) and 11 edge tones (on the right). Dispersed in between some of the RUs may be leftover tones, which may consist of 1 tone. In this row, 4 RUs may have 106 usable tones and 2 RUs may have 26 usable tones. The 4 RUs with 106 usable tones may have 102 data tones and 4 pilot tones. The 2 RUs with 26 usable tones may have 24 data tones and 2 pilot tones. For example, the first RU with 106 tones may have pilot tone locations at tone indices −238, −212, −170, −144. The second RU with 106 tones may have pilot tone locations at tone indices −104, −78, −36, −10. The 4 106-tone RUs may be associated with the following 4 sets of pilot tone locations {(−238, −212, −170, −144), (−104, −78, −36, −10), (10, 36, 78, 104), (144, 170, 212, 238)}, and the 2 26-tone RUs may be associated with the following 2 sets of pilot tone locations {(−130, −116), (116, 130)}. In an aspect, one or more wireless devices (e.g., the AP 202 or the STAs 206, 208, 210, 212) may be allocated one or more RUs.

In the fourth row, a number of RUs, specifically 2 RUs, are provided. At the ends of the row may be 12 edge or guard tones (on the left) and 11 edge tones (on the right). In this row, there may be no leftover tones. In this row, 2 RUs may have 242 usable tones. The 2 RUs with 242 usable tones may have 234 data tones and 8 pilot tones each. The 2 242-tone RUs may be associated with the following 2 sets of pilot tone locations {(−238, −212, −170, −144, −104, −78, −36, −10), (10, 36, 78, 104, 144, 170, 212, 238)}. In an aspect, one or more wireless devices (e.g., the AP 202 or the STAs 206, 208, 210, 212) may be allocated one or more RUs.

The 40 MHz symbol 500 may also support a single RU with 484 tones (e.g., a 2×242-tone RU). In an aspect, a 484-tone RU may have 5 DC tones. The 484-tone RU may have 484 usable tones of which 468 may be data tones and 16 may be pilot tones. The 484-tone RU may be associated with the following set of pilot tone locations {(−238, −212, −170, −144, −104, −78, −36, −10, 10, 36, 78, 104, 144, 170, 212, 238)}. In an aspect, the 484-tone RU may be allocated to one or more wireless devices.

As previously discussed, in an aspect, RUs may be allocated with an identical number of tones. For example, all RUs within a symbol may be allocated 26-tones, and any wireless device allocated an RU may be given 26-tones. In this example, a wireless device may be allocated multiple RUs with 26-tones. In another example, RUs within a symbol may be allocated with a different number of tones, such as a combination of the RUs provided in FIGS. 5A and 5B.

Figure 6A:
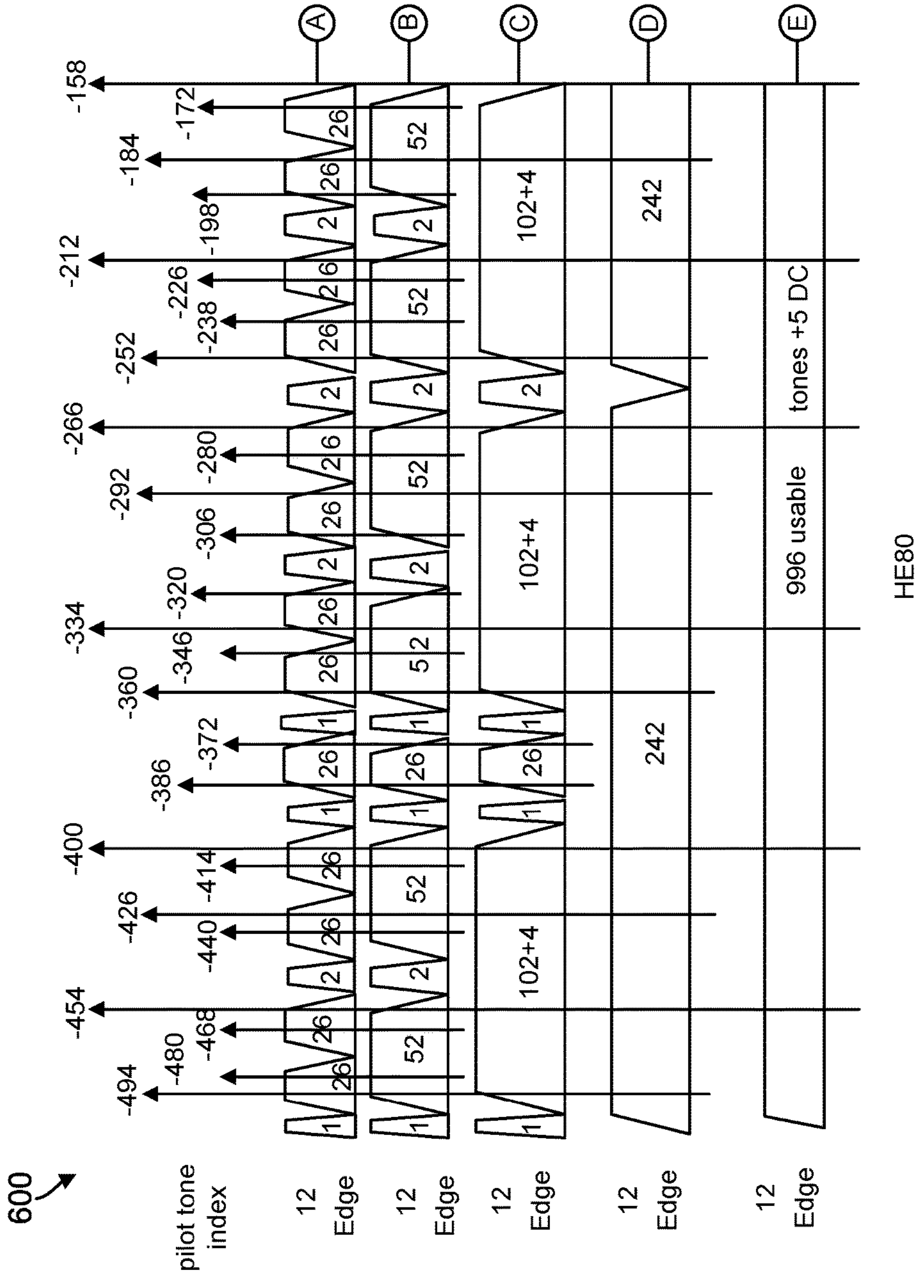
FIGS. 6A-C illustrate resource unit configurations and pilot tone locations for an 80 MHz symbol.
Figure 6B:
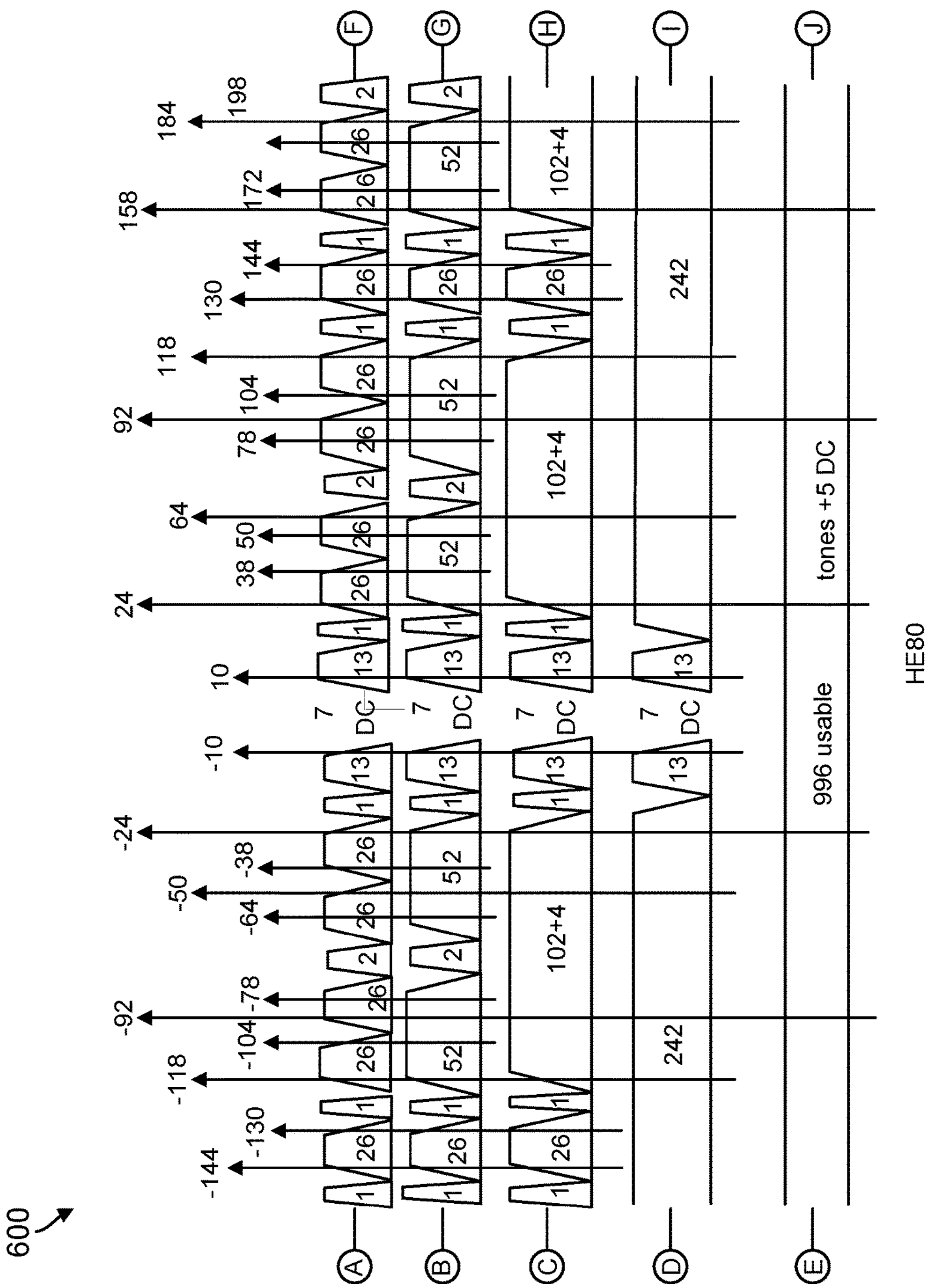
Figure 6C:
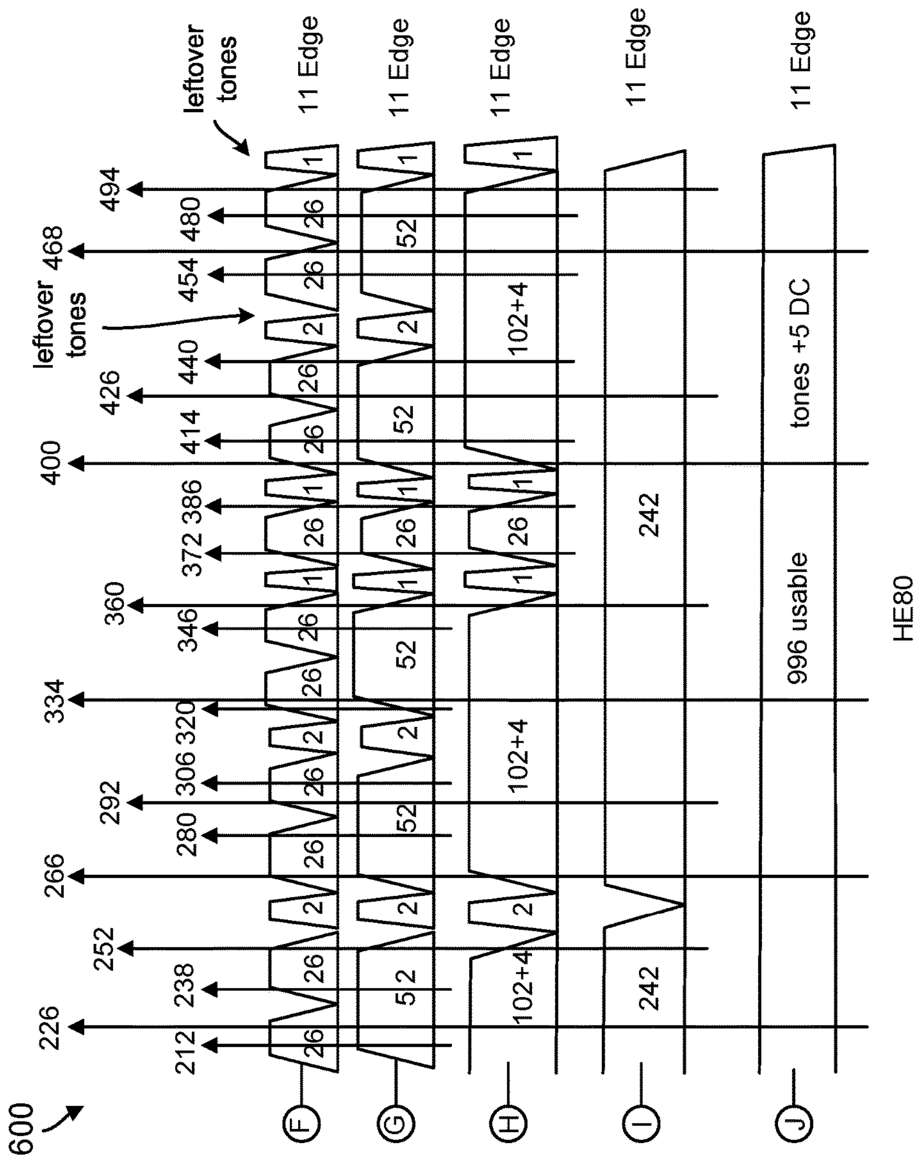

FIGS. 6A-C illustrate resource unit configurations and pilot tone locations for an 80 MHz symbol 600. In an aspect, the 80 MHz symbol 600 may be a data or LTF symbol with a 4× symbol duration. Referring to FIGS. 6A-C, five different RU configurations (e.g., 26-tone, 52-tone 106-tone, 242-tone, 996-tone) for the 80 MHz symbol 600 are provided. Other RU configurations may also be used. In the first (or top) row, a number (or plurality) of 26-tone RUs, specifically 37 26-tone RUs, are provided. In the middle of the row, one of the 26-tone RUs may be split into two half-RUs located around the 7 DC tones, and each half-RU may have 13 tones. At the ends of the row may be 12 edge or guard tones (on the left) and 11 edge tones (on the right). Dispersed in between some of the RUs may be "leftover" tones, which may consist of 1 or 2 tones. In an aspect, leftover tones may not have any energy. In this row, each RU of the 37 RUs may have 26 usable tones of which 24 may be data tones and 2 may be pilot tones. That is, the upward arrows within the RU represent pilot tones. For example, the first RU may have pilot tone locations at tone indices −494, −480. The second RU may have pilot tone locations at tone indices −468, −454, and so on. The 37 26-tone RUs may be associated with the following 37 sets of pilot tone locations {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In an aspect, one or more wireless devices (e.g., the AP 202 or the STAs 206, 208, 210, 212) may be allocated one or more RUs.

In the second row, a number of RUs, specifically 21 RUs, are provided. The RUs may include 26-tone and 52-tone RUs. In the middle of the row, one of the 26-tone RUs may be split into two half-RUs located around the 7 DC tones, and each half-RU may have 13 tones. At the ends of the row may be 12 edge or guard tones (on the left) and 11 edge tones (on the right). Dispersed in between some of the RUs may be leftover tones, which may consist of 1 or 2 tone. In this row, 16 RUs may have 52 usable tones and 5 RUs may have 26 usable tones. The 16 RUs with 52 usable tones may have 48 data tones and 4 pilot tones. The 5 RUs with 26 usable tones may have 24 data tones and 2 pilot tones. For example, the first RU with 52 tones may have pilot tone locations at tone indices −494, −480, −468, −454. The second 52-tone RU may have pilot tone locations at tone indices −440, −426, −414, −400, and so on. The 16 52-tone RUs may be associated with the following 16 sets of pilot tone locations {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}, and the 5 26-tone RUs may be associated with the following 4 sets of pilot tone locations {(−386, −372), (−144, −130), (−10, 10), (130, 144), (372, 386)}. In an aspect, one or more wireless devices (e.g., the AP 202 or the STAs 206, 208, 210, 212) may be allocated one or more RUs.

In the third row, a number of RUs, specifically 13 RUs, are provided. The RUs may include 26-tone and 106-tone RUs. In the middle of the row, one of the 26-tone RUs may be split into two half-RUs located around the 7 DC tones, and each half-RU may have 13 tones. At the ends of the row may be 12 edge or guard tones (on the left) and 11 edge tones (on the right). Dispersed in between some of the RUs may be leftover tones, which may consist of 1 tone. In this row, 8 RUs may have 106 usable tones and 5 RUs may have 26 usable tones. The 8 RUs with 106 usable tones may have 102 data tones and 4 pilot tones. The 5 RUs with 26 usable tones may have 24 data tones and 2 pilot tones. For example, the first RU with 106 tones may have pilot tone locations at tone indices −494, −468, −426, −400. The second RU with 106 tones may have pilot tone locations at tone indices −360, −334, −292, −266. The 8 106-tone RUs may be associated with the following 8 sets of pilot tone locations {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}, and the 5 26-tone RUs may be associated with the following 5 sets of pilot tone locations {(−386, −372), (−144, −130), (−10, 10), (130, 144), (372, 386)}. In an aspect, one or more wireless devices (e.g., the AP 202 or the STAs 206, 208, 210, 212) may be allocated one or more RUs.

In the fourth row, a number of RUs, specifically 5 RUs, are provided. The RUs may include 26-tone and 242-tone RUs. In the middle of the row, the 26-tone RU may be split into two half-RUs located around the 7 DC tones, and each half-RU may have 13 tones. At the ends of the row may be 12 edge or guard tones (on the left) and 11 edge tones (on the right). In this row, 4 RUs may have 242 usable tones and 1 RU may have 26 usable tones. The 4 RUs with 242 usable tones may have 234 data tones and 8 pilot tones. The RU with 26 usable tones may have 24 data tones and 2 pilot tones. The 4 242-tone RUs may be associated with the following 4 sets of pilot tone locations {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}, and the 26-tone RU may be associated with the following set of pilot tone locations {(−10, 10)}. In an aspect, one or more wireless devices (e.g., the AP 202 or the STAs 206, 208, 210, 212) may be allocated one or more RUs.

In the fifth row, a single user RU is provided. In this row, 5 DC tones may be located in the middle of the RU (e.g., at tone indices −2, −1, 0, 1, 2). In this row, the RU may have 996 usable tones of which 980 may be data tones and 16 may be pilot tones. The 996-tone RU may be associated with the following set of pilot tone locations {(−468, −400, −334, −266, −226, −158, −92, −24, 24, 92, 158, 226, 266, 334, 400, 468)}. In an aspect, the 996-tone RU may be allocated to one wireless device.

The 80 MHz symbol 600 may support 2 RUs with 484 tones. The 484-tone RU may have 484 usable tones of which 468 may be data tones and 16 may be pilot tones. The 2 484-tone RU may be associated with the following set of pilot tone locations {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In an aspect, one or more wireless devices may be allocated one or more 484-tone RUs.

As previously discussed, in an aspect, RUs may be allocated with an identical number of tones. For example, all RUs may be allocated 26-tones, and any wireless device allocated an RU may be given 26-tones. In this example, a wireless device may be allocated multiple RUs with 26-tones. In another aspect, RUs within a symbol may be allocated with a different number of tones, such as a combination of the RUs provided in FIGS. 6A-C.

In another configuration, a symbol (e.g., a data symbol) may alternatively have a bandwidth of 160 MHz. A 160 MHz data or LTF symbol may have a 4× symbol duration. In an aspect, the bandwidth of the symbol may be allocated into 26-tone, 52-tone, 106-tone, 242-tone, 484-tone, and/or 996-tone RUs or a single 2×996-tone RU. In one aspect, if the 160 MHz symbol is allocated into 26-tone RUs, there may be a total of 74 RUs. The 74 26-tone RUs may include a first number (or plurality) of pilot tone location sets and a second number of pilot tone locations sets. The first number of pilot tone location sets may be based on an initial number of pilot tone location sets adjusted by a first offset of −512, and the second number of pilot tone location sets may be based on the initial number of pilot tone location sets adjusted by an offset of 512. The initial number of pilot tone location sets may be {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}, which may correspond to the sets of pilot tones for the 26-RUs in an 80 MHz symbol. By adjusting the initial number of pilot tone location sets by an offset of −512, the first number of pilot tone location sets may be generated {(−1006, −992), (−980, −966), (−952, −938), (−926, −912), (−898, −884), (−872, −858), (−846, −832), (−818, −804), (−792, −778), (−764, −750), (−738, −724), (−710, −696), (−684, −670), (−656, −642), (−630, −616), (−604, −590), (−576, −562), (−550, −536), (−522, −502), (−488, −474), (−462, −448), (−434, −420), (−408, −394), (−382, −368), (−354, −340), (−328, −314), (−300, −286), (−274, −260), (−246, −232), (−220, −206), (−192, −178), (−166, −152), (−140, −126), (−112, −98), (−86, −72), (−58, −44), (−32, −18)}. Similarly, by adjusting the initial number of pilot tone location sets by an offset of 512, the second number of pilot tone location sets may be generated {(18, 32), (44, 58), (72, 86), (98, 112), (126, 140), (152, 166), (178, 192), (206, 220), (232, 246), (260, 274), (286, 300), (314, 328), (340, 354), (368, 382), (394, 408), (420, 434), (448, 462), (474, 488), (502, 522), (536, 550), (562, 576), (590, 604), (616, 630), (642, 656), (670, 684), (696, 710), (724, 738), (750, 764), (778, 792), (804, 818), (832, 846), (858, 872), (884, 898), (912, 926), (938, 952), (966, 980), (992, 1006)}. The 74 26-tone RUs may be associated with the union of the first and second number of pilot tone location sets.

In another aspect, if the 160 MHz symbol is allocated into 52-tone RUs, there may be a total of 32 52-tone RUs. The 32 52-tone RUs may include a first number of pilot tone location sets and a second number of pilot tone locations sets. The first number of pilot tone location sets may be based on an initial number of pilot tone location sets adjusted by a first offset of −512, and the second number of pilot tone location sets may be based on the initial number of pilot tone location sets adjusted by an offset of 512. The initial number of pilot tone location sets may be {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. The 32 52-tone RUs may be associated with the union of the first and second number of pilot tone location sets.

In another aspect, if the 160 MHz symbol is allocated into 106-tone RUs, there may be a total of 16 106-tone RUs. The 16 106-tone RUs may include a first number of pilot tone location sets and a second number of pilot tone locations sets. The first number of pilot tone location sets may be based on an initial number of pilot tone location sets adjusted by a first offset of −512, and the second number of pilot tone location sets may be based on the initial number of pilot tone location sets adjusted by an offset of 512. The initial number of pilot tone location sets may be {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. The 16 106-tone RUs may be associated with the union of the first and second number of pilot tone location sets.

In another aspect, if the 160 MHz symbol is allocated into 242-tone RUs, there may be a total of 8 242-tone RUs. The 8 242-tone RUs may include a first number of pilot tone location sets and a second number of pilot tone locations sets. The first number of pilot tone location sets may be based on an initial number of pilot tone location sets adjusted by a first offset of −512, and the second number of pilot tone location sets may be based on the initial number of pilot tone location sets adjusted by an offset of 512. The initial number of pilot tone location sets may be {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. The 8 242-tone RUs may be associated with the union of the first and second number of pilot tone location sets.

In another aspect, if the 160 MHz symbol is allocated into 484-tone RUs, there may be a total of 4 484-tone RUs. The 4 484-tone RUs may include a first number of pilot tone location sets and a second number of pilot tone locations sets. The first number of pilot tone location sets may be based on an initial number of pilot tone location sets adjusted by a first offset of −512, and the second number of pilot tone location sets may be based on the initial number of pilot tone location sets adjusted by an offset of 512. The initial number of pilot tone location sets may be {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. The 4 484-tone RUs may be associated with the union of the first and second number of pilot tone location sets.

In another aspect, if the 160 MHz symbol is allocated into 996-tone RUs, there may be a total of 2 996-tone RUs. The 2 996-tone RUs may include a first number of pilot tone location sets and a second number of pilot tone locations sets. The first number of pilot tone location sets may be based on an initial number of pilot tone location sets adjusted by a first offset of −512, and the second number of pilot tone location sets may be based on the initial number of pilot tone location sets adjusted by an offset of 512. The initial number of pilot tone location sets may be {(−468, −400, −334, −266, −226, −158, −92, −24, 24, 92, 158, 226, 266, 334, 400, 468)}. The 2 996-tone RUs may be associated with the union of the first and second number of pilot tone location sets.

In yet another aspect, if the symbol is allocated into a single 2×996-tone RU, then the RU may have pilot tone locations at tone indices {(−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980)}.

Figure 7:
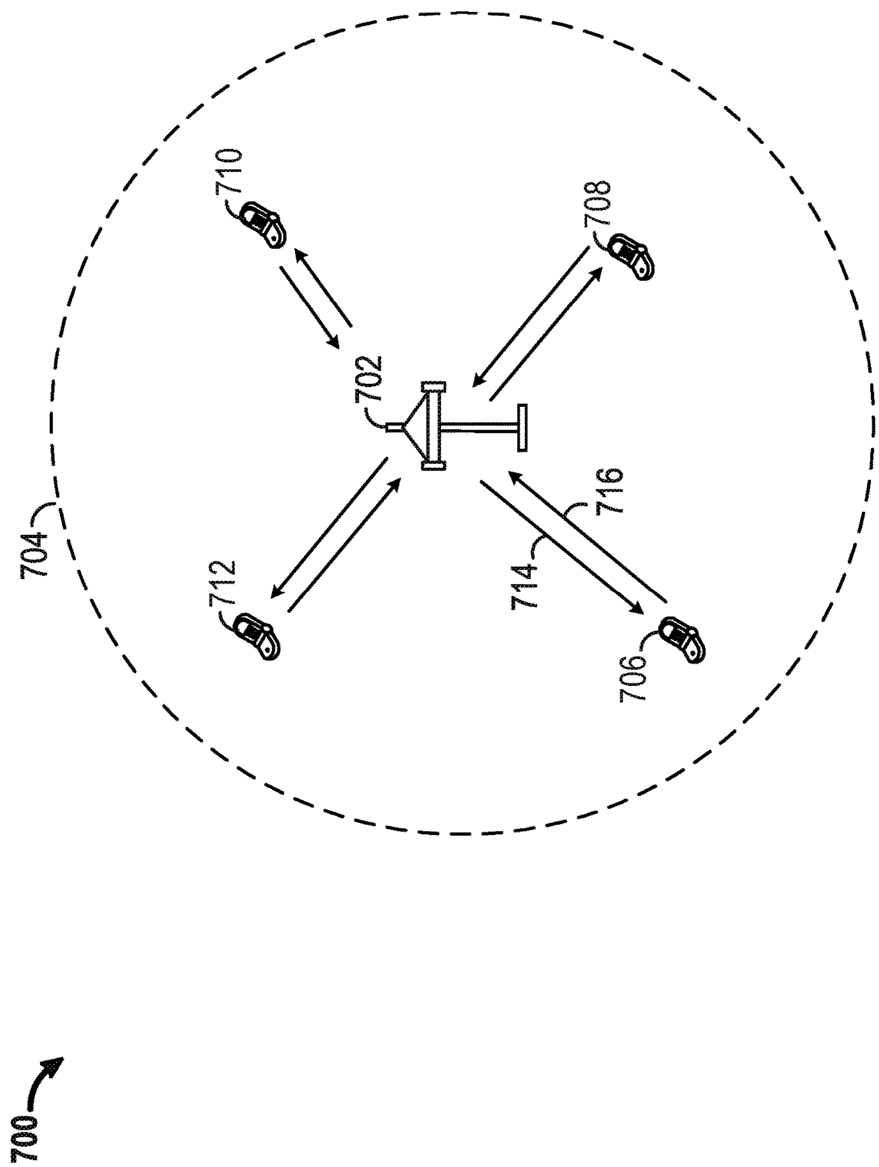
FIG. 7 is an exemplary diagram of a method for allocating resource units and determining pilot signals for use in a wireless network (e.g., a WLAN network).

FIG. 7 is an exemplary diagram 700 of a method for allocating resource units and determining pilot signals for use in a wireless network (e.g., a WLAN network). The diagram 700 illustrates an AP 702 broadcasting/transmitting within a service area 704. STAs 706, 708, 710, 712 are within the service area 704 of the AP 702 (although only four STAs are shown in FIG. 7, more or less STAs may be within the service area 704). To facilitate communication, the AP 702 may determine resource units that may be allocated to various wireless devices (e.g., the STAs 706, 708, 710, 712) including the AP 702. The AP 702 may determine the resource units by determining which communication bandwidth to use (e.g., 20 MHz, 40 MHz, 80 MHz, 160 MHz), based on which communication bandwidth(s) are available, and by determining a number of usable tones for the various resource units. In an aspect, the number of usable tones in a resource unit may be determined based on the amount of data to be transmitted (e.g., allocate resource units with more tones to accommodate larger data transmissions). In an aspect, the various resource units determined for allocation within a data symbol may be a non-uniform number of usable tones. That is, within a symbol, some resource units may have 26 tones, while other resource units may have 52 tones, 106 tones, or some other number of tones. For simplicity however, the examples below will assume a uniform set of resource units (e.g., all resource units have the same number of tones) within a symbol. In an aspect, the AP 702 may determine a total number of resource units based on a given communication bandwidth (or channel bandwidth) and a number of usable tones.

In an aspect, the AP 702 may allocate one or more resource units to the AP 702 for data transmission. In addition to transmitting data in the resource units, the AP 702 may generate a set of pilot signals to be transmitted with the data in the allocated resource units. In an aspect, the AP 702 may have several options for generating the pilot signals. In option 1, the generated pilot signals may depend on a number of tones in the resource unit. That is, the pilot sequence may be associated with a number of pilot tones within a resource unit. Resource units with the same size (e.g., same number of tones) may have the same pilot sequence regardless of the location of the resource unit within the bandwidth and regardless of the PPDU bandwidth. In option 2, the pilot sequence may depend on the communication bandwidth or PPDU bandwidth. The pilot sequence may be tied to a specific pilot location associated with a specific communication bandwidth. That is, a pilot sequence may be fixed for a fixed PPDU bandwidth. The pilot values may be fixed on each defined pilot in a PPDU bandwidth, independent of resource allocation. In an aspect, pilot signals generated according to option 2 may have a low PAPR (e.g., below a threshold). In option 3, the generated pilot signals in data symbols may be based on a same pilot sequence used in LTF symbols with a 4× symbol duration.

OPTION 1: RU Dependent Pilot Sequence

In option 1, a resource unit may have 26 usable tones, 52 usable tones, 106 usable tones, 242 usable tones, 484 usable tones, 996 usable tones, or 1992 usable tones. The following discussion will describe the method for providing pilot signals according to option 1.

Option 1: 26-Tone Resource Unit

In one configuration, the AP 702 may determine to use resource units with 26 usable tones. The AP 702 may allocate one or more resource units to the AP 702 and/or to one or more of the STAs 706, 708, 710, 712 to be used for data transmission. When the AP 702 utilizes at least one resource unit allocated for data transmission, the AP 702 may generate a set of pilot signals in the at least one resource unit. To generate the set of pilot signals, the AP 702 may determine the pilot tone locations associated with the at least one resource unit. Pilot tone locations may be preconfigured based on the communication bandwidth and the position of the resource unit (e.g., tone indices of where a resource unit starts and ends). Table 1 illustrates the pilot tone locations for various communication bandwidths (or PPDU bandwidths) for a 26-tone RU.

TABLE 1

| Pilot Tone Locations for 26-tone RU | |
|---|---|
| Bandwidth | $K_{R26i}$ |
| 20 MHz; i = 1:9 | (−116, −102), (−90, −76), (−62, −48), (−36, −22), (−10, 10), (22, 36), (48, 62), (76, 90), (102, 116) |
| 40 MHz; i = 1:18 | (−238, −224), (−212, −198), (−184, −170),(−158, −144), (−130, −116), (−104, −90), (−78, −64), (−50, −36), (−24, −10), (10, 24), (36, 50), (64, 78), (90, 104), (116, 130), (144, 158), (170, 184), (198, 212), (224, 238) |
| 80 MHz; i = 1:37 | (−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494) |
| 160 MHz; i = 1:74 | Pilot tone locations are based on a union of the 80 MHz pilot tone locations adjusted by −512 and the 80 MHz pilot tone locations adjusted by +512. |

Based on the above pilot tone locations, the AP 702 may determine a pilot sequence associated with the pilot tone locations. For a 26-tone RU, the pilot sequence may include 2 pilot signals over 2 pilot tone locations. The AP 702 may determine the pilot sequence based on a base pilot sequence shown in Table 2 below.

TABLE 2

| Base Pilot Sequence | | | | | | | |
|---|---|---|---|---|---|---|---|
| $\Psi_0$ | $\Psi_1$ | $\Psi_2$ | $\Psi_3$ | $\Psi_4$ | $\Psi_5$ | $\Psi_6$ | $\Psi_7$ |
| 1 | 1 | 1 | −1 | −1 | 1 | 1 | 1 |

Based on the base pilot sequence in Table 2, the AP 702 may determine a pilot sequence using the following pilot tone mapping equation:

$$P_n^{K_{R26_i}} = \{\Psi_{(n \bmod 2)+2}, \Psi_{((n+1) \bmod 2)+2}\} \quad \text{(Eq. 1)}$$

In Eq. 1, $\Psi_m$ is given by Table 2, n may correspond to a data symbol index (e.g., a HE data symbol index) starting at 0. For example, for n=0, the pilot sequence is {1, −1}. In this example, all 26-tone RUs in a first data symbol may have the pilot sequence {1, −1}. For n=1, the pilot sequence is {−1, 1}. In an aspect, the pilot sequence {1, −1} for the first data symbol may be referred to as an initial pilot sequence (e.g., an initial single stream pilot sequence), and the pilot sequence for each subsequent symbol represents a shifted pilot sequence from the initial pilot sequence {1, −1} of the first symbol. After determining the pilot sequence for one or more symbols, the pilot values corresponding to the pilot tone locations may be determined based on Eq. 2:

$$\text{Pilot value} = p_{n+z} * P_n^k \quad \text{(Eq. 2)}$$

Referring to Eq. 2, $p_n$ is a pilot polarity sequence, where $p_n$={1, 1, 1, 1, −1, −1, −1, 1, −1, −1, −1, −1, 1, 1, −1, 1, −1, −1, 1, 1, −1, 1, 1, −1, 1, 1, 1, 1, 1, 1, −1, 1, 1, 1, −1, 1, 1, −1, −1, 1, 1, 1, −1, 1, −1, −1, −1, 1, −1, 1, −1, −1, 1, −1, −1, 1, 1, 1, 1, 1, −1, −1, 1, 1, −1, −1, 1, −1, 1, −1, 1, 1, −1, −1, −1, 1, 1, −1, −1, −1, −1, 1, −1, −1, 1, −1, 1, 1, 1, 1, −1, 1, −1, 1, −1, 1, −1, −1, −1, −1, −1, 1, −1, 1, 1, −1, 1, −1, 1, 1, 1, −1, −1, 1, −1, −1, −1, 1, 1, 1, −1, −1, −1, −1, −1, −1, −1}. $P_n^k$ represents the pilot sequence for the kth tone, where k is in the set of $K_{R261_i}$, and i corresponds to the indices in Table 1. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted.

Option 1: 52-Tone Resource Unit

In another configuration, the AP 702 may determine to use resource units with 52 usable tones. The AP 702 may allocate one or more resource units to the AP 702 and/or to one or more of the STAs 706, 708, 710, 712 to be used for data transmission. When the AP 702 utilizes at least one resource unit allocated for data transmission, the AP 702 may generate a set of pilot signals in the at least one resource unit. To generate the set of pilot signals, the AP 702 may determine the pilot tone locations associated with the at least one resource unit. Pilot tone locations may be preconfigured based on the communication bandwidth and the position of the resource unit (e.g., tone indices of where a resource unit starts and ends). Table 3 illustrates the pilot tone locations for various communication bandwidths (or PDDU bandwidths) for a 52-tone RU.

TABLE 3

| Pilot Tone Locations for 52-tone RU | |
|---|---|
| Bandwidth | $K_{R52i}$ |
| 20 MHz; i = 1:4 | (−116, −102, −90, −76), (−62, −48, −36, −22), (22, 36, 48, 62), (76, 90, 102, 116) |
| 40 MHz; i = 1:8 | (−238, −224, −212, −198), (−184, −170, −158, −144), (−104, −90, −78, −64), (−50, −36, −24, −10), (10, 24, 36, 50), (64, 78, 90, 104), (144, 158, 170, 184), (198, 212, 224, 238) |
| 80 MHz; i = 1:16 | (−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494) |
| 160 MHz; i = 1:32 | Pilot tone locations are based on a union of the 80 MHz pilot tone locations adjusted by −512 and the 80 MHz pilot tone locations adjusted by +512. |

Based on the above pilot tone locations, the AP 702 may determine a pilot sequence associated with the pilot tone locations. For a 52-tone RU, the pilot sequence may include 4 pilot signals over 4 pilot tone locations. The AP 702 may determine the pilot sequence based on a base pilot sequence shown in Table 2 above.

Based on the base pilot sequence in Table 2, the AP 702 may determine a pilot sequence using the following pilot tone mapping equation (Eq. 3):

$$P_n^{K_{R52_i}} = \{\Psi_{n\ mod\ 4}, \Psi_{(n+1)mode\ 4}, \Psi_{(n+2)mod\ 4}, \Psi_{(n+3)mod\ 4}\} \quad \text{(Eq. 3)}$$

In Eq. 3, $\Psi_m$ is given by Table 2, n may correspond to a data symbol index (e.g., a HE data symbol index) starting at 0. For example, for n=0, the pilot sequence is {1, 1, 1, −1}. In this example, all 52-tone RUs in a first data symbol may have the pilot sequence {1, 1, 1, −1}. For n=1, the pilot sequence is {1, 1, −1, 1}. In an aspect, the pilot sequence {1, 1, −1, 1} for the first data symbol may be referred to as an initial pilot sequence, and the pilot sequence for each subsequent symbol represents a shifted pilot sequence from the initial pilot sequence {1, 1, 1, −1} of the first symbol. After determining the pilot sequence for one or more symbols, the pilot values corresponding to the pilot tone locations may be determined based on Eq. 2:

$$\text{Pilot value}=p_{n+z}*P_n^k$$

Referring to Eq. 2, $p_n$ is a pilot polarity sequence as discussed above where n corresponds to a symbol index (e.g., 0=first symbol, 1=second symbol, etc.), $P_n^k$ represents the pilot sequence for the kth tone, where k is in the set of $K_{R52_i}$, and i corresponds to the indices in Table 3. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted.

Option 1: 106-Tone Resource Unit

In another configuration, the AP 702 may determine to use resource units with 106 usable tones. The AP 702 may allocate one or more resource units to the AP 702 and/or to one or more of the STAs 706, 708, 710, 712 to be used for data transmission. When the AP 702 utilizes at least one resource unit allocated for data transmission, the AP 702 may generate a set of pilot signals in the at least one resource unit. To generate the set of pilot signals, the AP 702 may determine the pilot tone locations associated with the at least one resource unit. Pilot tone locations may be preconfigured based on the communication bandwidth and the position of the resource unit (e.g., tone indices of where a resource unit starts and ends). Table 4 illustrates the pilot tone locations for various communication bandwidths (or PDDU bandwidths) for a 106-tone RU.

TABLE 4

| Pilot Tone Locations for 106-tone RU | |
|---|---|
| Bandwidth | $K_{R106i}$ |
| 20 MHz; i = 1:2 | (−116, −90, −48, −22), (22, 48, 90, 116) |
| 40 MHz; i = 1:4 | (−238, −212, −170, −144), (−104, −78, −36, −10), (10, 36, 78, 104), (144, 170, 212, 238) |
| 80 MHz; i = 1:8 | (−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494) |
| 160 MHz: i = 1:16 | Pilot tone locations are based on a union of the 80 MHz pilot tone locations adjusted by −512 and the 80 MHz pilot tone locations adjusted by +512. |

Based on the above pilot tone locations, the AP 702 may determine a pilot sequence associated with the pilot tone locations. For a 106-tone RU, the pilot sequence may include 4 pilot signals over 4 pilot tone locations. The 106-tone RU may have the same number of pilot signals as the 52-tone RU to maximize spectral efficiency. The AP 702 may determine the pilot sequence based on a base pilot sequence shown in Table 2 above.

Based on the base pilot sequence in Table 2, the AP 702 may determine a pilot sequence using the following pilot tone mapping equation (Eq. 4):

$$P_n^{K_{R106_i}} = \{\Psi_{n\ mod\ 4}, \Psi_{(n+1)mode\ 4}, \Psi_{(n+2)mod\ 4}, \Psi_{(n+3)mod\ 4}\} \quad \text{(Eq. 4)}$$

In Eq. 4, $\Psi_m$ is given by Table 2, n may correspond to a data symbol index (e.g., a HE data symbol index) starting at 0. For example, for n=0, the pilot sequence is {1, 1, 1, −1}. In this example, all 106-tone RUs in a first data symbol may have the pilot sequence {1, 1, 1, −1}. For n=1, the pilot sequence is {1, 1, −1, 1}. In an aspect, the pilot sequence {1, 1, −1, 1} for the first data symbol may be referred to as an initial pilot sequence, and the pilot sequence for each subsequent symbol represents a shifted pilot sequence from the initial pilot sequence {1, 1, 1, −1} of the first symbol.

After determining the pilot sequence for one or more symbols, the pilot values corresponding to the pilot tone locations may be determined based on Eq. 2:

$$\text{Pilot value}=p_{n+z}P_n^{\,k}$$

Referring to Eq. 2, $p_n$ is a pilot polarity sequence as discussed above where n corresponds to a symbol index (e.g., 0=first symbol, 1=second symbol, etc.), $P_n^{\,k}$ represents the pilot sequence for the kth tone, where k is in the set of $K_{R106_i}$, and i corresponds to the indices in Table 4. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted.

Option 1: 242-Tone Resource Unit

In another configuration, the AP 702 may determine to use resource units with 242 usable tones. The AP 702 may allocate one or more resource units to the AP 702 and/or to one or more of the STAs 706, 708, 710, 712 to be used for data transmission. When the AP 702 utilizes at least one resource unit allocated for data transmission, the AP 702 may generate a set of pilot signals in the at least one resource unit. To generate the set of pilot signals, the AP 702 may determine the pilot tone locations associated with the at least one resource unit. Pilot tone locations may be preconfigured based on the communication bandwidth and the position of the resource unit (e.g., tone indices of where a resource unit starts and ends). Table 5 illustrates the pilot tone locations for various communication bandwidths (or PDDU bandwidths) for a 242-tone RU.

TABLE 5

Pilot Tone Locations for 242-tone RU

| Bandwidth | $K_{R242i}$ |
|---|---|
| 20 MHz; i = 1:1 | (−116, −90, −48, −22, 22, 48, 90, 116) |
| 40 MHz; i = 1:2 | (−238, −212, −170, −144, −104, −78, −36, −10), (10, 36, 78, 104, 144, 170, 212, 238) |
| 80 MHz; i = 1:4 | (−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494) |
| 160 MHz; i = 1:8 | Pilot tone locations are based on a union of the 80 MHz pilot tone locations adjusted by −512 and the 80 MHz pilot tone locations adjusted by +512. |

Based on the above pilot tone locations, the AP 702 may determine a pilot sequence associated with the pilot tone locations. For a 242-tone RU, the pilot sequence may include 8 pilot signals over 8 pilot tone locations. The AP 702 may determine the pilot sequence based on a base pilot sequence shown in Table 2 above.

Based on the base pilot sequence in Table 2, the AP 702 may determine a pilot sequence using the following pilot tone mapping equation (Eq. 5):

$$P_n^{K_{R242_i}} = \{\Psi_{n\ mod\ 8}, \Psi_{(n+1)mode\ 8}, \Psi_{(n+2)mod\ 8}, \Psi_{(n+3)mod\ 8}, \Psi_{(n+4)mod\ 8}, \Psi_{(n+5)mode\ 8}, \Psi_{(n+6)mod\ 8}, \Psi_{(n+7)mod\ 8}\} \quad \text{(Eq. 5)}$$

In Eq. 5, $\Psi_m$ is given by Table 2, n may correspond to a data symbol index (e.g., a HE data symbol index) starting at 0. For example, for n=0, the pilot sequence is {1, 1, 1, −1, −1, 1, 1, 1}. In this example, all 242-tone RUs in a first data symbol may have the pilot sequence {1, 1, 1, −1, −1, 1, 1, 1}. For n=1, the pilot sequence is {1, 1, −1, −1, 1, 1, 1, 1}. In an aspect, the pilot sequence {1, 1, 1, −1, −1, 1, 1, 1} for the first data symbol may be referred to as an initial pilot sequence, and the pilot sequence for each subsequent symbol represents a shifted pilot sequence from the initial pilot sequence {1, 1, 1, −1, −1, 1, 1, 1} of the first symbol. After determining the pilot sequence for one or more symbols, the pilot values corresponding to the pilot tone locations may be determined based on Eq. 2:

$$\text{Pilot value}=p_{n+z}{*}P_n^{\,k}$$

Referring to Eq. 2, $p_n$ is a pilot polarity sequence as discussed above where n corresponds to a symbol index (e.g., 0=first symbol, 1=second symbol, etc.), $P_n^{\,k}$ represents the pilot sequence for the kth tone, where k is in the set of $K_{R242_i}$, and i corresponds to the indices in Table 5. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted.

Option 1: 484-Tone Resource Unit

In another configuration, the AP 702 may determine to use resource units with 484 usable tones. The AP 702 may allocate one or more resource units to the AP 702 and/or to one or more of the STAs 706, 708, 710, 712 to be used for data transmission. When the AP 702 utilizes at least one resource unit allocated for data transmission, the AP 702 may generate a set of pilot signals in the at least one resource unit. To generate the set of pilot signals, the AP 702 may determine the pilot tone locations associated with the at least one resource unit. Pilot tone locations may be preconfigured based on the communication bandwidth and the position of the resource unit (e.g., tone indices of where a resource unit starts and ends). Table 6 illustrates the pilot tone locations for various communication bandwidths (or PDDU bandwidths) for a 484-tone RU.

TABLE 6

Pilot Tone Locations for 484-tone RU

| Bandwidth | $K_{R484i}$ |
|---|---|
| 20 MHz | N/A |
| 40 MHz; i = 1 | (−238, −212, −170, −144, −104, −78, −36, −10, 10, 36, 78, 104, 144, 170, 212, 238) |
| 80 MHz; i = 1:2 | (−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494) |
| 160 MHz; i = 1:4 | Pilot tone locations are based on a union of the 80 MHz pilot tone locations adjusted by −512 and the 80 MHz pilot tone locations adjusted by +512. |

Based on the above pilot tone locations, the AP 702 may determine a pilot sequence associated with the pilot tone locations. For a 484-tone RU, the pilot sequence may include 16 pilot signals over 16 pilot tone locations. The AP 702 may determine the pilot sequence based on a base pilot sequence shown in Table 2 above.

Based on the base pilot sequence in Table 2, the AP 702 may determine a pilot sequence using the following pilot tone mapping equation (Eq. 6):

$$P_n^{K_{R484_i}} = \{\Psi_{n\ mod\ 8}, \Psi_{(n+1)mode\ 8}, \Psi_{(n+2)mod\ 8}, \Psi_{(n+3)mod\ 8}, \Psi_{(n+4)mod\ 8}, \Psi_{(n+5)mode\ 8}, \Psi_{(n+6)mod\ 8}, \Psi_{(n+7)mod\ 8}, \Psi_{n\ mod\ 8}, \Psi_{(n+1)mode\ 8}, \Psi_{(n+2)mod\ 8}, \Psi_{(n+3)mod\ 8}\Psi_{(n+4)mod\ 8}, \Psi_{(n+5)mode\ 8}, \Psi_{(n+6)mod\ 8}, \Psi_{(n+7)mod\ 8}\} \quad \text{(Eq. 6)}$$

In Eq. 6, $\Psi_m$ is given by Table 2, n may correspond to a data symbol index (e.g., a HE data symbol index) starting at 0. For example, for n=0, the pilot sequence is {1, 1, 1, −1, −1, 1, 1, 1, 1, 1, 1, −1, −1, 1, 1, 1}. In this example, all 484-tone RUs in a first data symbol may have the pilot sequence {1, 1, 1, −1, −1, 1, 1, 1, 1, 1, 1, −1, −1, 1, 1, 1}. In an aspect, the pilot sequence {1, 1, 1, −1, −1, 1, 1, 1, 1, 1, 1, −1, −1, 1, 1, 1} for the first data symbol may be referred to as an initial pilot sequence, and the pilot sequence for each subsequent symbol represents a shifted pilot sequence from the initial pilot sequence {1, 1, 1, −1, −1, 1, 1, 1, 1, 1, 1, −1, −1, 1, 1, 1} of the first symbol. After determining the pilot sequence for one or more symbols, the pilot values corresponding to the pilot tone locations may be determined based on Eq. 2:

$$\text{Pilot value} = p_{n+z} * P_n^k$$

Referring to Eq. 2, $p_n$ is a pilot polarity sequence as discussed above where n corresponds to a symbol index (e.g., 0=first symbol, 1=second symbol, etc.), $P_n^k$ represents the pilot sequence for the kth tone, where k is in the set of $K_{R484_i}$, and i corresponds to the indices in Table 6. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted.

Option 1: 996-Tone Resource Unit

In another configuration, the AP 702 may determine to use resource units with 996 usable tones. The AP 702 may allocate one or more resource units to the AP 702 and/or to one or more of the STAs 706, 708, 710, 712 to be used for data transmission. When the AP 702 utilizes at least one resource unit allocated for data transmission, the AP 702 may generate a set of pilot signals in the at least one resource unit. To generate the set of pilot signals, the AP 702 may determine the pilot tone locations associated with the at least one resource unit. Pilot tone locations may be preconfigured based on the communication bandwidth and the position of the resource unit (e.g., tone indices of where a resource unit starts and ends). Table 7 illustrates the pilot tone locations for various communication bandwidths (or PDDU bandwidths) for a 996-tone RU.

TABLE 7

Pilot Tone Locations for 996-tone RU

| Bandwidth | $K_{R996i}$ |
|---|---|
| 20 MHz | N/A |
| 40 MHz | N/A |
| 80 MHz; i = 1 | (−468, −400, −334, −266, −226, −158, −92, −24, 24, 92, 158, 226, 266, 334, 400, 468) |
| 160 MHz; i = 1:2 | Pilot tone locations are based on a union of the 80 MHz pilot tone locations adjusted by −512 and the 80 MHz pilot tone locations adjusted by +512: (−980, −912, −846, −778, −738, −670, −604, −536, −488, −420, −354, −286, −246, −178, −112, −44), (44, 112, 178, 246, 286, 354, 420, 488, 536, 604, 670, 738, 778, 846, 912, 980) |

Based on the above pilot tone locations, the AP 702 may determine a pilot sequence associated with the pilot tone locations. For a 996-tone RU, the pilot sequence may include 16 pilot signals over 16 pilot tone locations. The 996-tone RU may have the same number of pilot signals as the 484-tone RU to maximize spectral efficiency. The AP 702 may determine the pilot sequence based on a base pilot sequence shown in Table 2 above.

Based on the base pilot sequence in Table 2, the AP 702 may determine a pilot sequence using the following pilot tone mapping equation (Eq. 7):

$$P_n^{K_{R996_i}} = \{\Psi_{n\ mod\ 8}, \Psi_{(n+1)mode\ 8}, \Psi_{(n+2)mod\ 8}, \Psi_{(n+3)mod\ 8}, \Psi_{(n+4)mod\ 8}, \Psi_{(n+5)mode\ 8}, \Psi_{(n+6)mod\ 8}, \Psi_{(n+7)mod\ 8}, \Psi_{n\ mod\ 8}, \Psi_{(n+1)mode\ 8}, \Psi_{(n+2)mod\ 8}, \Psi_{(n+3)mod\ 8}\}\Psi_{(n+4)mod\ 8}, \Psi_{(n+5)mode\ 8}, \Psi_{(n+6)mod\ 8}, \Psi_{(n+7)mod\ 8}\} \quad \text{(Eq. 7)}$$

In Eq. 7, $\Psi_m$ is given by Table 2, n may correspond to a data symbol index (e.g., a HE data symbol index) starting at 0. For example, for n=0, the pilot sequence is {1, 1, 1, −1, −1, 1, 1, 1, 1, 1, 1, −1, −1, 1, 1, 1}. In this example, all 996-tone RUs in a first data symbol may have the pilot sequence {1, 1, 1, −1, −1, 1, 1, 1, 1, 1, 1, −1, −1, 1, 1, 1}. In an aspect, the pilot sequence {1, 1, 1, −1, −1, 1, 1, 1, 1, 1, 1, −1, −1, 1, 1, 1} for the first data symbol may be referred to as an initial pilot sequence, and the pilot sequence for each subsequent symbol represents a shifted pilot sequence from the initial pilot sequence {1, 1, 1, −1, −1, 1, 1, 1, 1, 1, 1, −1, −1, 1, 1, 1} of the first symbol. After determining the pilot sequence for one or more symbols, the pilot values corresponding to the pilot tone locations may be determined based on Eq. 2:

$$\text{Pilot value} = p_{n+z} * P_n^k$$

Referring to Eq. 2, $p_n$ is a pilot polarity sequence as discussed above where n corresponds to a symbol index (e.g., 0=first symbol, 1=second symbol, etc.), $P_n^k$ represents the pilot sequence for the kth tone, where k is in the set of $K_{R996_i}$, and i corresponds to the indices in Table 7. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted.

Option 1: 2×996-Tone (1992-Tone) Resource Unit

In another configuration, the AP 702 may determine to use resource units with 1992 usable tones. The AP 702 may allocate one or more resource units to the AP 702 and/or to one or more of the STAs 706, 708, 710, 712 to be used for data transmission. When the AP 702 utilizes at least one resource unit allocated for data transmission, the AP 702 may generate a set of pilot signals in the at least one resource unit. To generate the set of pilot signals, the AP 702 may determine the pilot tone locations associated with the at least one resource unit. Pilot tone locations may be preconfigured based on the communication bandwidth and the position of the resource unit (e.g., tone indices of where a resource unit starts and ends). Table 8 illustrates the pilot tone locations for various communication bandwidths (or PDDU bandwidths) for a 2×996-tone RU.

TABLE 8

Pilot Tone Locations for 2x996-tone RU

| Bandwidth | $K_{R2x996i}$ |
|---|---|
| 20 MHz | N/A |
| 40 MHz | N/A |
| 80 MHz | N/A |
| 160 MHz; i = 1 | (−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980) |

Based on the above pilot tone locations, the AP 702 may determine a pilot sequence associated with the pilot tone locations. For a 2×996-tone RU, the pilot sequence may include 32 pilot signals over 32 pilot tone locations. The AP 702 may determine the pilot sequence based on a base pilot sequence shown in Table 2 above.

Based on the base pilot sequence in Table 2, the AP 702 may determine a pilot sequence using the following pilot tone mapping equation (Eq. 8):

$$P_n^{K_{R2x996_i}} = \{\Psi_{n\ mod\ 8}, \Psi_{(n+1)mode\ 8}, \Psi_{(n+2)mod\ 8}, \Psi_{(n+3)mod\ 8}, \Psi_{(n+4)mod\ 8}, \Psi_{(n+5)mode\ 8}, \Psi_{(n+6)mod\ 8}, \Psi_{(n+7)mod\ 8}, \Psi_{n\ mod\ 8}, \Psi_{(n+1)mode\ 8}, \Psi_{(n+2)mod\ 8}, \Psi_{(n+3)mod\ 8}\Psi_{(n+4)mod\ 8}, \Psi_{(n+5)mode\ 8}, \Psi_{(n+6)mod\ 8}, \Psi_{(n+7)mod\ 8}\Psi_{n\ mod\ 8}, \Psi_{(n+1)mode\ 8}, \Psi_{(n+2)mod\ 8}, \Psi_{(n+3)mod\ 8}, \Psi_{(n+4)mod\ 8}, \Psi_{(n+5)mode\ 8}, \Psi_{(n+6)mod\ 8}, \Psi_{(n+7)mod\ 8}, \Psi_{n\ mod\ 8}, \Psi_{(n+1)mode\ 8}, \Psi_{(n+2)mod\ 8}, \Psi_{(n+3)mod\ 8}, \Psi_{(n+4)mod\ 8}, \Psi_{(n+5)mode\ 8}, \Psi_{(n+6)mod\ 8}, \Psi_{(n+7)mod\ 8}\} \quad \text{(Eq. 8)}$$

In Eq. 8, $\Psi_m$ is given by Table 2, n may correspond to a data symbol index (e.g., a HE data symbol index) starting at 0. For example, for n=0, the pilot sequence is {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In this example, all 2×996-tone RUs in a first data symbol may have the pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In an aspect, the pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1} for the first data symbol may be referred to as an initial pilot sequence, and the pilot sequence for each subsequent symbol represents a shifted pilot sequence from the initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1} of the first symbol. After determining the pilot sequence for one or more symbols, the pilot values corresponding to the pilot tone locations may be determined based on Eq. 2:

$$\text{Pilot value} = p_{n+z} * P_n^k$$

Referring to Eq. 2, $p_n$ is a pilot polarity sequence as discussed above where n corresponds to a symbol index (e.g., 0=first symbol, 1=second symbol, etc.), $P_n^k$ represents the pilot sequence for the kth tone, where k is in the set of $K_{R2\times996_i}$, and i corresponds to the indices in Table 8. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted.

OPTION 2: Bandwidth Dependent Pilot Sequences

In option 2, a resource unit may have 26 usable tones, 52 usable tones, 106 usable tones, 242 usable tones, 484 usable tones, 996 usable tones, or 1992 usable tones. The pilot signals associated with the resource units of various sizes may depend on the PPDU or communication bandwidth.

To generate the pilot signals according option 2, a wireless device may utilize a base pilot sequence. To define the base pilot sequence, one may first define a pilot sequence for the largest resource unit in a given PPDU, while targeting a lowest peak-to-average-power ratio (PAPR) on a pilot tone. Pilot sequences for smaller resource units may be formed partly from inheriting all available pilot values in the largest resource unit, plus one or more interpolated pilot values on pilots punctured in larger resource units. This process targets minimal PAPR.

For example, in referring to a 20 MHz symbol in FIG. 4, assume the pilot sequence for the entire set of pilot tones is $P=\{p_i, i=1, \ldots, 18\}$. In other words, a 20 MHz symbol may have 18 pilot tones, where $p_i$ represents a base pilot value on a pilot tone, and i represents a nominal tone index. To define the base pilot sequence, one may first optimize the sequence for the largest resource unit—the 242-tone RU—for optimal $P_{242}=\{p_i, i=1, 3, 6, 8, 11, 13, 16, 18\}$, which corresponds to the nominal tone index locations in FIG. 4 with minimal PAPR. The resultant pilot sequence, $P_{242}$, may also be applicable to 106-tone RUs, with $P_{106,1}=\{p_i, i=1, 3, 6, 8\}$ and $P_{106,2}=\{p_i, i=11, 13, 16, 18\}$. Next, one may optimize the pilot sequences for 52-tone RUs for optimal $P_{52}=\{p_i, i=1, \ldots, 18\}$, where $p_i$, i=1, 3, 6, 8, 11, 13, 16, 18 are inherited from $P_{242}$. One may search over all possible combinations for $p_i$, i=2, 4, 5, 7, 9, 10, 12, 14, 15, 17 to get the optimal $P=P_{52}=\{pi, i=1, \ldots, 18\}$ with minimal PAPR. The resultant pilot sequence $P_{52}$ may also be applicable to 26-tone RUs. Similar optimization procedures may be performed for 40 MHz, 80 MHz, and 160 MHz bandwidths. By performing optimization procedures, optimal base pilot sequences for various bandwidths as listed in Table 9 may be obtained.

TABLE 9

| Optimized Pilot Sequences | |
|---|---|
| Bandwidth | Base Pilot Sequence |
| | 20 MHz |
| P = {$p_i$, i = 1, . . . , 18} | {1, 1, 1, −1, 1, 1, −1, −1, 1, 1, −1, 1, −1, 1, 1, 1, 1, −1} |
| P = {$p_i$, i = 1, . . . , 18} | {1, −1, −1, −1, −1, 1, −1, 1, −1, −1, 1, 1, −1, −1, 1, −1, −1, −1} |
| | 40 MHz |
| P = {$p_i$, i = 1, . . . , 36} | {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} |
| P = {$p_i$, i = 1, . . . , 36} | {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1} |
| | 80 MHz |
| P = {$p_i$, i = 1, . . . , 74} | {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} |
| P = {$p_i$, i = 1, . . . , 74} | {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1} |
| | 160 MHz |
| P = {$p_i$, i = 1, . . . , 148} | {−1, 1,1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1 −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} |
| P = {$p_i$, i = 1, . . . , 148} | {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1} |

As shown in Table 9, each bandwidth may have 2 base pilot sequences. The AP 702 (e.g., and/or the STAs 706, 708, 710, 712) may be preconfigured with at least one base pilot sequence for each bandwidth. Using a 20 MHz bandwidth as an example, assume the AP 702 chooses a 20 MHz bandwidth for communication. The AP 702 may determine a number of resource units as shown in FIG. 4 for communication based on the 20 MHz bandwidth. As previously described, within the 20 MHz symbol, some resources may have 26 tones, while other resource units may have 52 tones, 106 tones, or some other number of tones. Alternatively, all the resource units may have a uniform number of tones, such as 26 tones. Assume the AP 702 determines to use resource units with 26 usable tones at the 20 MHz bandwidth as shown in row 1 of FIG. 4. The AP 702 may allocate one or more resource units to the AP 702 and/or to one or more of the STAs 706, 708, 710, 712 to be used for data transmission. In this example, assume that the AP 702 allocates the first two 26-tone RUs to itself (e.g., $R_{26,1}$ and $R_{26,2}$). When the AP 702 utilizes the allocated RUs for data transmission, the AP 702 may generate a set of pilot signals in the 2 RUs. To generate the set of pilot signals, the AP 702 may determine pilot tone locations associated with the first and second RUs. Pilot tone locations may be preconfigured based on the communication bandwidth and the position of the resource unit within the symbol. Tables 1 and 3-8 above illustrate the different pilot tone locations at various bandwidths and resource unit sizes. In this example, the two 26-tone RUs in a 20 MHz bandwidth may have pilot tone locations at {(−116, −102), (−90, −76)}. Continuing with the 26-tone RU example, the AP 702 may determine a pilot sequence associated with the pilot tone locations. For a 26-tone RU, the pilot sequence may include 2 pilot signals over 2 pilot tone locations. The AP 702 may determine the pilot sequence based on one of the base pilot sequences for a 20 MHz symbol as shown in Table 9. In an aspect, the AP 702 may be preconfigured with a base pilot sequence for each of the bandwidths. For this example, assume that the determined base pilot sequence is P={$p_i$, i=1, . . . , 18}={1, 1, 1, −1, 1, 1, −1, −1, 1, 1, −1, 1, −1, 1, 1, 1, 1, −1}. After determining the base pilot sequence associated with the 20 MHz bandwidth, the AP 702 may determine an initial pilot sequence for each of the two RUs based on the base pilot sequence, the communication bandwidth, and the RU size. The first 26-tone RU in the first row of FIG. 4 may have nominal tone indices $P_{26,1}$={$p_i$, i=1, 2}, which corresponds to an initial pilot tone sequence $P_{26,1}$={$p_i$, i=1, 2}={1, 1}. The second 26-tone RU in FIG. 4 may have nominal tone indices $P_{26,1}$={$p_i$, i=3, 4}, which may correspond to an initial pilot sequence $P_{26,2}$={$p_i$, i=3, 4}={1, −1}. Similar to option 1, the initial pilot sequence may correspond to the first data symbol (n=0) of a PPDU. For each subsequent data symbol, the pilot sequence may be obtained by shifting the initial pilot sequence. For example, for n=1, the pilot sequence of the first RU {1, 1} may be determined by shifting the initial pilot sequence by 1. Similarly, for n=1, the pilot sequence of the second RU {−1, 1} may be obtained by shifting the initial pilot sequence by 1. After determining the pilot sequence, the pilot values corresponding to the pilot tone locations may be determined based on Eq. 2:

$$\text{Pilot value}=p_{n+z}{*}P_n^{\,k}$$

Referring to Eq. 2, $p_n$ is a pilot polarity sequence as discussed above where n corresponds to a symbol index (e.g., 0=first symbol, 1=second symbol, etc.), $P_n^k$ represents the pilot sequence for the kth tone, where k is in the set of $K_{R26_i}$. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted. Although this example illustrates the pilot signal generation process using option 2 for a 26-tone RU in a 20 MHz bandwidth, a similar process for other RU sizes in other bandwidths may also be used based on the respective base pilot sequences provided in Table 9.

OPTION 3: Using the Pilot Sequence in 4×LTF Symbols for Data Symbols

In option 3, a resource unit may have 26 usable tones, 52 usable tones, 106 usable tones, 242 usable tones, 484 usable tones, 996 usable tones, or 1992 usable tones. The pilot signals associated with the resource units of various sizes may depend on the PPDU or communication bandwidth and the pilot sequence used in a 4×LTF symbol.

To generate the pilot signals according option 3, a wireless device may utilize a base pilot sequence. The base pilot sequence may be based on the pilot sequences for LTF symbols in each of the corresponding bandwidths (e.g., 20 MHz, 40 MHz, and 80 MHz). Table 10 lists the base pilot sequences for various bandwidths using option 3.

TABLE 10

Base Pilot Sequences for Data Symbols

| Bandwidth | Base Pilot Sequence |
|---|---|
| | 20 MHz |
| $P = \{p_i, i = 1, \ldots, 18\}$ | {1, −1, 1, 1, −1, −1, −1, 1, 1, 1, 1, −1, −1, −1, −1, −1, 1, −1} |
| | 40 MHz |
| $P = \{p_i, i = 1, \ldots, 36\}$ | {−1, −1, −1, 1, 1, 1, −1, 1, 1, −1, −1, −1, −1, 1, −1, −1, 1, −1, 1, 1, 1, −1, −1, −1, 1, −1, −1, −1, −1, −1, −1, 1, −1, −1, 1, −1} |
| | 80 MHz |
| $P = \{p_i, i = 1, \ldots, 74\}$ | {−1, 1, −1, 1, 1, −1, −1, 1, 1, −1, 1, −1, 1, −1, 1, −1, −1, 1, 1, −1, 1, −1, −1, 1, 1, −1, 1, −1, 1, −1, 1, −1, 1, −1, −1, 1, −1, 1, −1, 1, −1, 1, −1, 1, 1, −1, 1, −1, 1, −1, 1, −1, −1, 1, 1, −1, 1, −1, 1, −1, 1, −1, −1, 1, 1, −1, 1, −1, 1, −1, −1, 1, 1, −1} |
| | 160 MHz |
| $P = \{p_i, i = 1, \ldots, 148\}$ | {−1, 1, −1, 1, 1, −1, −1, 1, 1, −1, 1, −1, 1, −1, −1, −1, 1, 1, −1, 1, −1, −1, 1, 1, −1, 1, −1, 1, −1, 1, −1, 1, −1, −1, 1, −1, 1, −1, 1, −1, 1, −1, 1, 1, −1, 1, −1, 1, −1, 1, −1, −1, 1, 1, −1, 1, −1, 1, −1, 1, −1, −1, 1, 1, −1, 1, −1, 1, −1, −1, 1, 1, −1, −1, 1, −1, 1, 1, −1, −1, 1, 1, −1, 1, −1, 1, −1, 1, −1, −1, 1, 1, −1, 1, −1, −1, 1, 1, −1, 1, −1, 1, −1, 1, −1, 1, −1, −1, 1, −1, 1, −1, 1, −1, 1, −1, 1, 1, −1, 1, −1, 1, −1, 1, −1, −1, 1, 1, −1, 1, −1, 1, −1, 1, −1, −1, 1, 1, −1, 1, −1, 1, −1, −1, 1, 1, −1} |

As shown in Table 10, each bandwidth may have a base pilot sequence. The AP 702 (e.g., and/or the STAs 706, 708, 710, 712) may be preconfigured a base pilot sequence for each bandwidth. Using a 20 MHz bandwidth as an example, assume the AP 702 chooses a 20 MHz bandwidth for communication. The AP 702 may determine a number of resource units as shown in FIG. 4 for communication based on the 20 MHz bandwidth. As previously described, within the 20 MHz symbol, some resources may have 26 tones, while other resource units may have 52 tones, 106 tones, or some other number of tones. Alternatively, all the resource units may have a uniform number of tones, such as 26 tones. Assume the AP 702 determines to use resource units with 26 usable tones at the 20 MHz bandwidth as shown in row 1 of FIG. 4. The AP 702 may allocate one or more resource units to the AP 702 and/or to one or more of the STAs 706, 708, 710, 712 to be used for data transmission. In this example, assume that the AP 702 allocates the first two 26-tone RUs to itself (e.g., $R_{26,1}$ and $R_{26,2}$). When the AP 702 utilizes the allocated RUs for data transmission, the AP 702 may generate a set of pilot signals in the 2 RUs. To generate the set of pilot signals, the AP 702 may determine pilot tone locations associated with the first and second RUs. Pilot tone locations may be preconfigured based on the communication bandwidth and the position of the resource unit within the symbol. Tables 1 and 3-8 above illustrate the different pilot tone locations at various bandwidths and resource unit sizes. In this example, the two 26-tone RUs in a 20 MHz bandwidth may have pilot tone locations at {(−116, −102), (−90, −76)}. Continuing with the 26-tone RU example, the AP 702 may determine a pilot sequence associated with the pilot tone locations. For a 26-tone RU, the pilot sequence may include 2 pilot signals over 2 pilot tone locations. The AP 702 may determine the pilot sequence based on one of the base pilot sequences for a 20 MHz symbol as shown in Table 9. In an aspect, the AP 702 may be preconfigured with a base pilot sequence for each of the bandwidths. For this example, assume that the determined base pilot sequence is $P=\{p_i, i=1, \ldots, 18\}$={1, −1, 1, 1, −1, −1, −1, 1, 1, 1, 1, −1, −1, −1, −1, −1, 1, −1}. After determining the base pilot sequence associated with the 20 MHz bandwidth, the AP 702 may determine an initial pilot sequence for each of the two RUs based on the base pilot sequence, the communication bandwidth, and the RU size. The first 26-tone RU in the first row of FIG. 4 may have nominal tone indices $P_{26,1}=\{p_i, i=1, 2\}$, which corresponds to an initial pilot tone sequence $P_{26,1}=\{p_i, i=1, 2\}=\{1, -1\}$. The second 26-tone RU in FIG. 4 may have nominal tone indices $P_{26,1}=\{p_i, i=3, 4\}$, which may correspond to an initial pilot sequence $P_{26,2}=\{p_i, i=3, 4\}=\{1, 1\}$. Similar to options 1 and 2, the initial pilot sequence may correspond to the first data symbol (n=0) of a PPDU. For each subsequent data symbol, the pilot sequence may be obtained by shifting the initial pilot sequence. For example, for n=1, the pilot sequence of the first RU {−1, 1} may be determined by shifting the initial pilot sequence by 1. Similarly, for n=1, the pilot sequence of the second RU {1, 1} may be obtained by shifting the initial pilot sequence by 1. After determining the pilot sequence, the pilot values corresponding to the pilot tone locations may be determined based on Eq. 2:

$$\text{Pilot value}=p_{n+z}*P_n^k$$

Referring to Eq. 2, $p_n$ is a pilot polarity sequence as discussed above where n corresponds to a symbol index (e.g., 0=first symbol, 1=second symbol, etc.), $P_n^k$ represents the pilot sequence for the kth tone, where k is in the set of $K_{R26_i}$. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations, which may be based on the communication bandwidth. Subsequently, the AP 702 may transmit the generated set of pilot signals in the corresponding resource unit along with the data to be transmitted. Although this example illustrates the pilot signal generation process using option 2 for a 26-tone RU in a 20 MHz bandwidth, a similar process for other RU sizes in other bandwidths may also be used based on the respective base pilot sequences provided in Table 10.

In the above description related to options 1-3, an initial pilot sequence was determined for each RU, and the pilot sequence was shifted from symbol to symbol based on the initial pilot sequence. For example, in options 1 and 2, for a 52-tone RU with an initial pilot sequence {1, 1, 1, −1}, the RU in the first data symbol with symbol index n=0 took the values {1, 1, 1, −1} of the initial pilot sequence for its 4 pilots, and the RU in the second data symbol with symbol index n=1 took the values {1, 1, −1, 1}, which represented a shifted initial pilot sequence. Similarly, in option 3, for a 52-tone RU with an initial pilot sequence {1, −1, 1, 1}, the RU in the first data symbol with symbol index n=0 took the values {1, −1, 1, 1}, and the RU in the second data symbol with symbol index n=1 took the values {−1, 1, 1, 1}. That is, all the pilot sequence shifting in options 1-3 for subsequent symbols was based on the initial pilot sequence of a single RU. In another aspect, the pilot sequence shifting may be based on the pilot sequence over the entire PPDU bandwidth, and the pilot sequence for the entire bandwidth may be shifted from symbol to symbol in options 2 and 3 (but not for option 1). Subsequently, the pilot sequence for a single RU may be determined based on the shifted pilot sequence of the entire PPDU bandwidth.

Using option 3 as an example, the AP 702 may generate the set of pilot signals by determining a base pilot sequence for the entire PPDU bandwidth. Referring to Table 10, if the PPDU bandwidth is 20 MHz, then the base pilot sequence for the entire PPDU bandwidth or communication bandwidth is {1, −1, 1, 1, −1, −1, −1, 1, 1, 1, 1, −1, −1, −1, −1, −1, 1, −1}. Assuming a 52-tone RU, for the first data symbol, n=0, the pilot sequence may be {1, −1, 1, 1}. To determine the pilot sequence for the second data symbol, n=1, the AP 702 may shift the base pilot sequence for the entire PPDU bandwidth to obtain {−1, 1, 1, −1, −1, −1, 1, 1, 1, 1, −1, −1, −1, −1, −1, 1, −1, 1}, which may represent a shifted base pilot sequence over the entire PPDU bandwidth. Upon shifting the base pilot sequence for the entire PPDU bandwidth, the AP 702 may determine the pilot sequence for the 52-tone RU in the second data symbol, which may be {−1, 1, 1, −1}. In this aspect, the pilot sequence for a particular RU at a particular symbol may be determined based on the shifted base pilot sequence of the entire PPDU bandwidth, the symbol index, and the pilot locations or number of usable tones associated with the particular RU. After determining the pilot sequence, the pilot values corresponding to the pilot tone locations may be determined based on Eq. 2:

$$\text{Pilot value}=p_{n+z}*P_n^k$$

Referring to Eq. 2, $p_n$ is a pilot polarity sequence as discussed above where n corresponds to a symbol index (e.g., 0=first symbol, 1=second symbol, etc.), $P_n^k$ represents the pilot sequence for the kth tone, where k is in the set of $K_{R52_i}$. In an aspect, z may be a number of SIG field symbols in a preamble of the frame to be transmitted. Having determined the pilot values and the pilot tone locations, the AP 702 may generate the set of pilot signals in one or more RUs within a symbol based on the pilot values at the pilot tone locations. Subsequently, the AP 702 may transmit the generated set of pilot signals in the corresponding resource unit along with the data to be transmitted. Although this example illustrates the pilot signal generation process using option 3 for a 52-tone RU in a 20 MHz bandwidth, a similar process may be used for option 2, for other RU sizes, and other communication bandwidths. Further, this procedure of shifting the base pilot sequence over the entire bandwidth is not limited to an AP. A STA may also perform this procedure.

To perform the global shift of the base pilot sequence over the entire PPDU bandwidth (as opposed to over a single RU), the AP 702 or the STA may need to know (e.g., be preconfigured with) the base pilot sequence over the entire bandwidth instead of just the pilot sequence for a particular RU. When STAs know the base pilot sequence over the entire bandwidth, STAs may utilize that pilot sequence information to enable common pilot functionalities. Common pilot usage may be illustrated by referring to FIG. 7. For downlink transmissions, because the AP 702 is the only transmitter, each of the STAs 706, 708, 710, 712 may receive the downlink transmission with the same frequency offset because the reference (e.g., the AP 702) is the same. In an example, if the STA 706 is assigned a single 26-tone RU, the STA 706 may use the pilot signals in the assigned 26-tone RU to determine the frequency offset from the AP 702. In addition, because the STA 706 knows the base pilot sequence for the entire PPDU bandwidth, the STA 706 may calculate the expected pilot signals in the RUs assigned to the STAs 708, 710 and/or 712 (e.g., by determining the respective pilot sequence, pilot values, pilot tone locations, etc.), and use the pilot signals from the RUs assigned to the STAs 708, 710, 712 and/or other STAs to improve phase offset/drift estimation. The use of pilot signals assigned to other users may be known as common pilot usage.

In another aspect, the AP may allocate one or more resource units to other STAs. For example, when the AP 702 allocates one or more resource units of a number of resource units in a symbol to STAs 706, 708, 710, 712, the AP 702 may transmit allocation information to the STAs 706, 708, 710, 712 in a trigger frame 714 (or any other kind of frame such as a management frame or a control frame or message). The allocation information may indicate which resource unit(s) have been allocated to each of the STAs 706, 708, 710, 712 to enable the STAs 706, 708, 710, 712 to transmit data on the resource unit(s) and generate pilot signals on the allocated resource units. In an aspect, the allocation information may include one or more sets of tone indices that indicate when one or more resource units begin and end. The allocation information may include a communication bandwidth (e.g., 20 MHz, 40 MHz, 80 MHz, 160 MHz). The allocation information may include data symbol information such as which symbols have been allocated to the STAs 706, 708, 710, 712. In an aspect, the STAs may be preconfigured the pilot sequence for entire bandwidths according to options 1, 2, or 3 and be able to generate the pilot signals based on the preconfigured pilot sequence.

Upon receiving the trigger frame 714, the STA 706, for example, may determine that the STA 706 has data to transmit. The STA 706 may generate a set of pilot signals to be transmitted on the one or more resource units allocated to the STA 706 for data transmission based on option 1, 2, or 3. The STA 706 may generate the set of pilot signals in a similar manner as the AP 702 generated the set of pilot signals. After generating the set of pilot signals, the STA 706 may transmit a frame 716 that may include the data and the pilot signals in the one or more allocated resource units.

In an aspect, the aforementioned discussion related to pilot signals may not include Gamma rotation.

Figure 8:
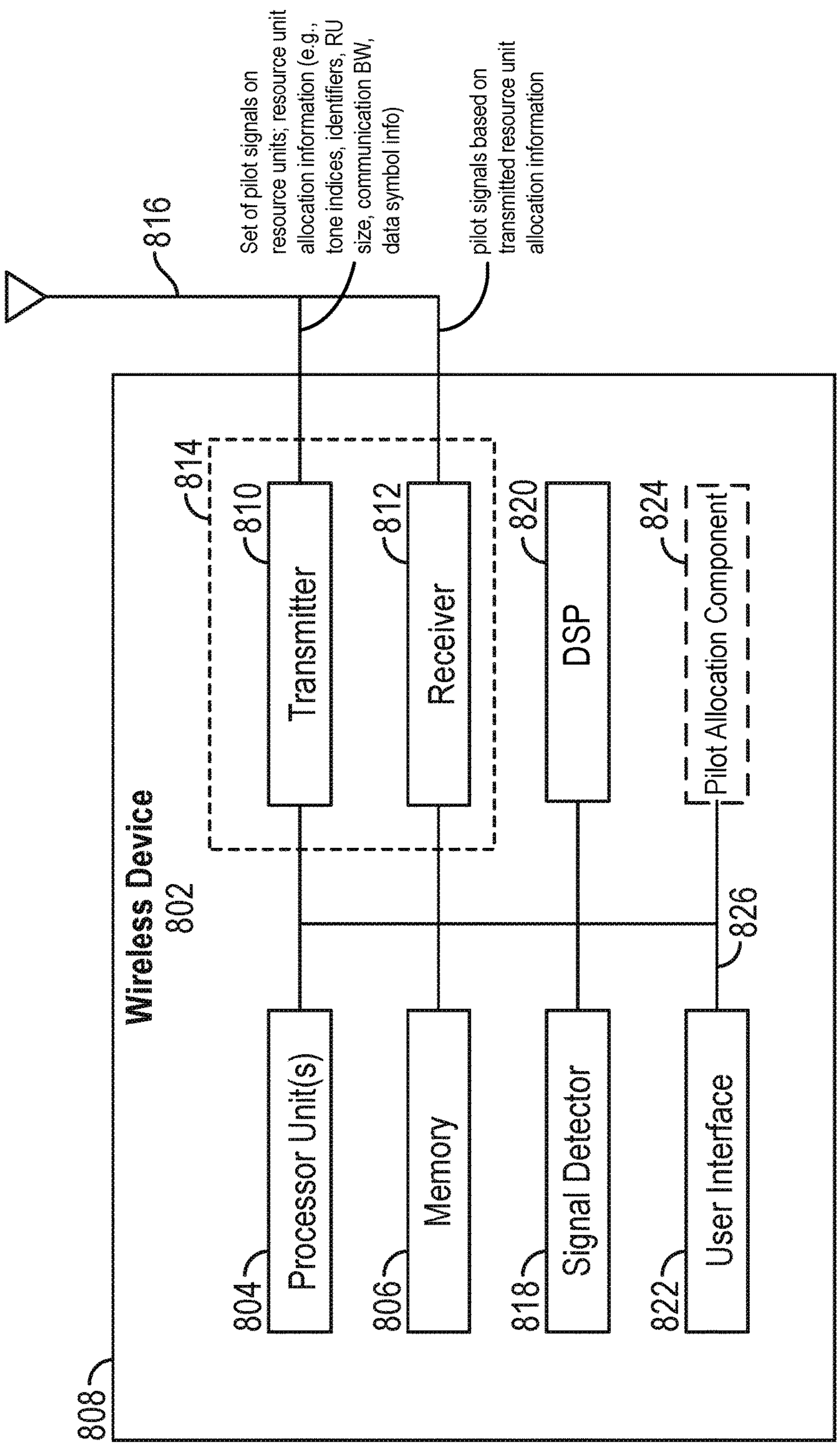
FIG. 8 is a functional block diagram of a wireless device that may be employed within the wireless communication system of FIG. 1 for allocating resource units.

FIG. 8 is a functional block diagram of a wireless device 802 that may be employed within the wireless communication system 100 of FIG. 1 for allocating resource units. The wireless device 802 is an example of a device that may be configured to implement the various methods described herein. For example, the wireless device 802 may comprise the AP 104 or the AP 202.

The wireless device 802 may include a processor 804 which controls operation of the wireless device 802. The processor 804 may also be referred to as a central processing unit (CPU). Memory 806, which may include both read-only memory (ROM) and random access memory (RAM), may provide instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable (by the processor 804, for example) to implement the methods described herein.

The processor 804 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), application specific integrated circuits (ASICs), controllers, state machines, gated logic, discrete hardware components, dedicated hardware finite state machines, or any other suitable entities that can perform calculations or other manipulations of information. In an aspect, the techniques, methods, etc., may be implemented in a modem processor, also referred to as a baseband processor.

The processing system may include an interface configured to provide information for transmission by the transmitter 810 and/or the transceiver 814. The interface may also be configured to receive information from the receiver 812 and/or the transceiver 814. In an aspect, the interface may be an interface of the processor 804.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 802 may also include a housing 808, and the wireless device 802 may include a transmitter 810 and/or a receiver 812 to allow transmission and reception of data between the wireless device 802 and a remote device. The transmitter 810 and the receiver 812 may be combined into a transceiver 814. An antenna 816 may be attached to the housing 808 and electrically coupled to the transceiver 814. The wireless device 802 may also include (not shown) multiple transmitters, multiple receivers, multiple transceivers, and/or multiple antennas.

The wireless device 802 may also include a signal detector 818 that may be used to detect and quantify the level of signals received by the transceiver 814 or the receiver 812. The signal detector 818 may detect such signals as total energy, energy per subcarrier per symbol, power spectral density, and other signals. The wireless device 802 may also include a DSP 820 for use in processing signals. The DSP 820 may be configured to generate a packet for transmission. In some aspects, the packet may comprise a PPDU.

The wireless device 802 may further comprise a user interface 822 in some aspects. The user interface 822 may comprise a keypad, a microphone, a speaker, and/or a display. The user interface 822 may include any element or component that conveys information to a user of the wireless device 802 and/or receives input from the user.

When the wireless device 802 is implemented as an AP (e.g., AP 104, AP 202, the AP 702), the wireless device 802 may also comprise a pilot allocation component 824. The pilot allocation component 824 may be configured to determine a plurality of resource units for communication. The pilot allocation component 824 may be configured to generate a set of pilot signals in at least one resource unit of the plurality of resource units. The pilot allocation component 824 may be configured to transmit the generated set of pilot signals in the at least one resource unit of the plurality of resource units. In one configuration, the pilot allocation component 824 may be configured to determine the plurality of resource units for communication by determining a communication bandwidth and by determining a number of usable tones per resource unit based on the determined communication bandwidth. In another configuration, the pilot allocation component 824 may be configured to generate the set of pilot signals in the at least one resource unit by determining pilot tone locations associated with the at least one resource unit, by determining a pilot sequence associated with the determined pilot tone locations, and by determining pilot values for the determined pilot tone locations based on the determined pilot sequence and a pilot polarity sequence. In an aspect, the pilot sequence is determined by shifting an initial pilot sequence based on a data symbol index. In another aspect, the at least one resource unit of the plurality of resource units has 26 usable tones and 2 pilot tone locations, and the pilot sequence is determined based on an initial pilot sequence $\{1, -1\}$. In another aspect, the at least one resource unit of the plurality of resource units has 52 usable tones or 106 usable tones and has 4 pilot tone locations, and the pilot sequence is determined based on an initial pilot sequence {1, 1, 1, −1}. In another aspect, the at least one resource unit of the plurality of resource units has 242 usable tones and has 8 pilot tone locations, and the pilot sequence is determined based on an initial pilot sequence {1, 1, 1, −1, −1, 1, 1, 1}. In another aspect, the at least one resource unit of the plurality of resource units has 484 usable tones or 996 usable tones and has 16 pilot tone locations, and the pilot sequence is determined based on an initial pilot sequence {1, 1, 1, −1, −1, 1, 1, 1, 1, 1, 1, −1, −1, 1, 1, 1}. In another aspect, the at least one resource unit of the plurality of resource units has 1992 usable tones and 32 pilot tone locations, and the pilot sequence is determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another configuration, the pilot allocation component 824 may be configured to generate the set of pilot signals is based on a number of symbols in a SIG field of a preamble. In an aspect, each resource unit of the plurality of resource units has 26 usable tones, a communication bandwidth associated with the plurality of resource units is 20 MHz, and the plurality of resource units is associated with a plurality of pilot tone location sets {(−116, −102), (−90, −76), (−62, −48), (−36, −22), (−10, 10), (22, 36), (48, 62), (76, 90), (102, 116)}. In another aspect, each resource unit of the plurality of resource units has 26 usable tones, a communication bandwidth associated with the plurality of resource units is 40 MHz, and the plurality of resource units is associated with a plurality of pilot tone location sets {(−238, −224), (−212, −198), (−184, −170), (−158, −144), (−130, −116), (−104, −90), (−78, −64), (−50, −36), (−24, −10), (10, 24), (36, 50), (64, 78), (90, 104), (116, 130), (144, 158), (170, 184), (198, 212), (224, 238)}. In another aspect, each resource unit of the plurality of resource units has 26 usable tones, a communication bandwidth associated with the plurality of resource units is 80 MHz, and the plurality of resource units is associated with a plurality of pilot tone location sets {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units has 26 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units has 52 usable tones, a communication bandwidth associated with the plurality of resource units is 20 MHz, and the plurality of resource units is associated with a plurality of pilot tone location sets {(−116, −102, −90, −76), (−62, −48, −36, −22), (22, 36, 48, 62), (76, 90, 102, 116)}. In another aspect, each resource unit of the plurality of resource units has 52 usable tones, a communication bandwidth associated with the plurality of resource units is 40 MHz, and the plurality of resource units is associated with a plurality of pilot tone location sets {(−238, −224, −212, −198), (−184, −170, −158, −144), (−104, −90, −78, −64), (−50, −36, −24, −10), (10, 24, 36, 50), (64, 78, 90, 104), (144, 158, 170, 184), (198, 212, 224, 238)}. In another aspect, each resource unit of the plurality of resource units has 52 usable tones, a communication bandwidth associated with the plurality of resource units is 80 MHz, and the plurality of resource units is associated with a plurality of pilot tone location sets {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units has 52 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units has 106 usable tones, a communication bandwidth associated with the plurality of resource units is 20 MHz, and the plurality of resource units is associated with a plurality of pilot tone location sets {(−116, −90, −48, −22), (22, 48, 90, 116)}. In another aspect, each resource unit of the plurality of resource units has 106 usable tones, a communication bandwidth associated with the plurality of resource units is 40 MHz, and the plurality of resource units is associated with a plurality of pilot tone location sets {(−238, −212, −170, −144), (−104, −78, −36, −10), (10, 36, 78, 104), (144, 170, 212, 238)}. In another aspect, each resource unit of the plurality of resource units has 106 usable tones, a communication bandwidth associated with the plurality of resource units is 80 MHz, and the plurality of resource units is associated with a plurality of pilot tone location sets {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units has 106 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units has 242 usable tones, a communication bandwidth associated with the plurality of resource units is 20 MHz, and the plurality of resource units includes a resource unit associated with a pilot tone location set {(−116, −90, −48, −22, 22, 48, 90, 116)}. In another aspect, each resource unit of the plurality of resource units has 242 usable tones, a communication bandwidth associated with the plurality of resource units is 40 MHz, and the plurality of resource units is associated with a plurality of pilot tone location sets {(−238, −212, −170, −144, −104, −78, −36, −10), (10, 36, 78, 104, 144, 170, 212, 238)}. In another aspect, each resource unit of the plurality of resource units has 242 usable tones, a communication bandwidth associated with the plurality of resource units is 80 MHz, and the plurality of resource units is associated with a plurality of pilot tone location sets {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units has 242 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units has 484 usable tones, a communication bandwidth associated with the plurality of resource units is 40 MHz, and the plurality of resource units includes a resource unit associated with a pilot tone location set {(−238, −212, −170, −144, −104, −78, −36, −10, 10, 36, 78, 104, 144, 170, 212, 238)}. In another aspect, each resource unit of the plurality of resource units has 484 usable tones, a communication bandwidth associated with the plurality of resource units is 80 MHz, and the plurality of resource units is associated with a plurality of pilot tone location sets {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units has 484 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units has 996 usable tones, a communication bandwidth associated with the plurality of resource units is 80 MHz, and the plurality of resource units includes a resource unit associated with a pilot tone location set {(−468, −400, −334, −266, −226, −158, −92, −24, 24, 92, 158, 226, 266, 334, 400, 468)}. In another aspect, each resource unit of the plurality of resource units has 996 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−468, −400, −334, −266, −226, −158, −92, −24, 24, 92, 158, 226, 266, 334, 400, 468)}. In another aspect, each resource unit of the plurality of resource units has 1992 usable tones, a communication bandwidth associated with the plurality of resource units is 160 MHz, and the plurality of resource units includes a resource unit associated with a pilot tone location set {(−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980)}. In another configuration, the pilot allocation component 824 may be configured to allocate one or more resource units of the plurality of resource units to at least one wireless device. In this configuration, the pilot allocation component 824 may be configured to transmit allocation information associated with the allocated one or more resource units to the at least one wireless device. In an aspect, the allocation information may include at least one of a set of tone indices, an identifier, a resource unit size that indicates a number of usable tones per resource unit, a communication bandwidth, or data symbol information. In another aspect, each resource unit of the plurality of resource units has 26 usable tones, 52 usable tones, 106 usable tones, 242 usable tones, 484 usable tones, 996 usable tones, or 1992 usable tones. In another configuration, the pilot allocation component 824 may be configured to determine the pilot sequence by determining a communication bandwidth, by determining a base pilot sequence associated with the determined communication bandwidth, by determining a number of usable tones in the at least one resource unit, and by determining an initial pilot sequence based on the communication bandwidth, the determined base pilot sequence, and the determined number of usable tones. In another configuration, the generated set of pilot signals in the at least one resource unit is based on the communication bandwidth, the determined pilot tone locations, and the determined pilot values. In another aspect, the communication bandwidth is 20 MHz, and the determined base pilot sequence is a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth is 40 MHz, and the determined base pilot sequence is a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth is 80 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth is 160 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1 −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence is determined based on a set of nominal tone indices associated with the at least one resource unit. In another aspect, the pilot sequence is determined by shifting the determined initial pilot sequence based on a data symbol index.

The various components of the wireless device 802 may be coupled together by a bus system 826. The bus system 826 may include a data bus, for example, as well as a power bus, a control signal bus, and a status signal bus in addition to the data bus. Components of the wireless device 802 may be coupled together or accept or provide inputs to each other using some other mechanism.

Although a number of separate components are illustrated in FIG. 8, one or more of the components may be combined or commonly implemented. For example, the processor 804 may be used to implement not only the functionality described above with respect to the processor 804, but also to implement the functionality described above with respect to the signal detector 818, the DSP 820, the user interface 822, and/or the pilot allocation component 824. Further, each of the components illustrated in FIG. 8 may be implemented using a plurality of separate elements.

Figure 9:
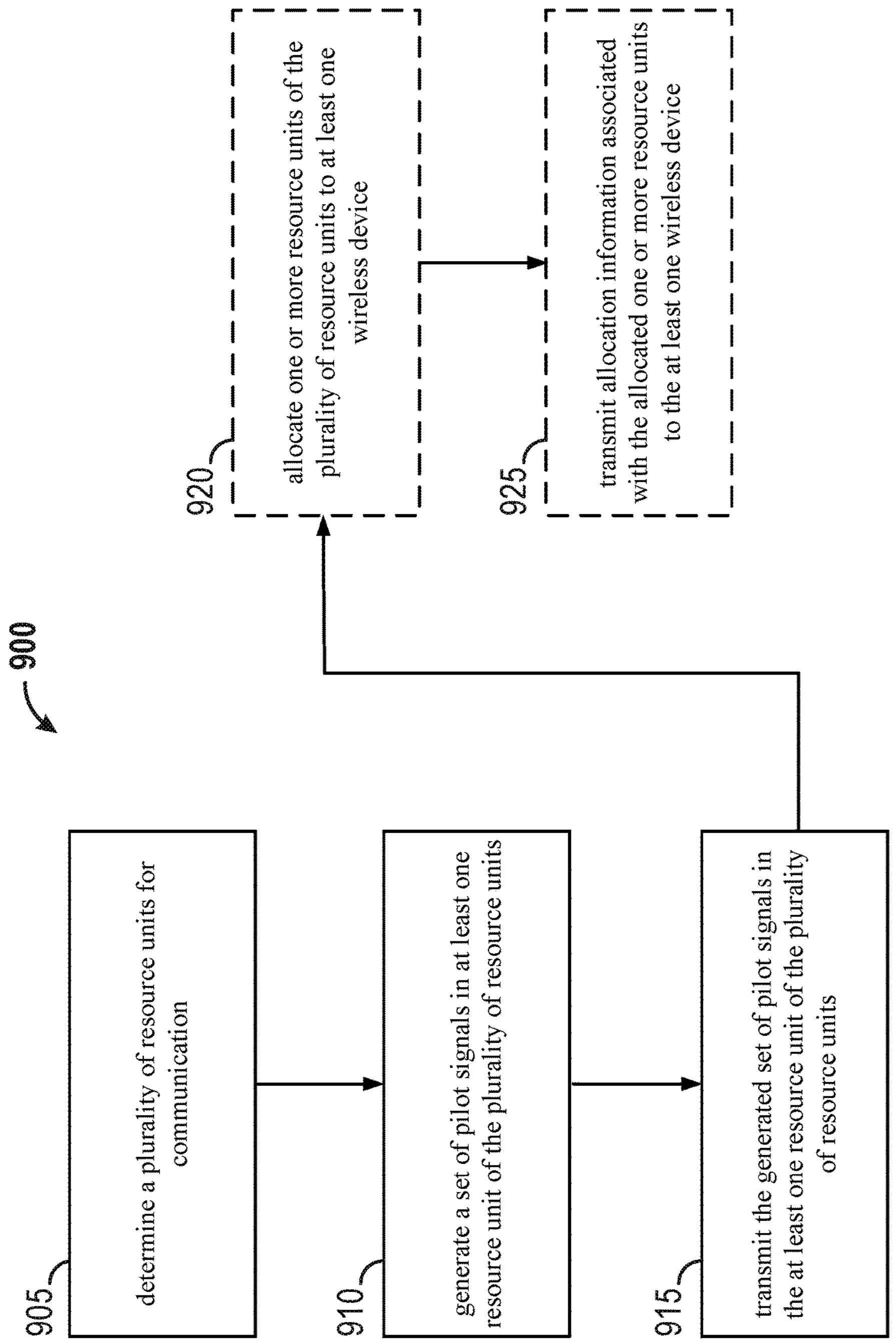
FIG. 9 is a flowchart of an exemplary method of allocating resource units in a symbol and generating pilot signals for data transmission.

FIG. 9 is a flowchart of an exemplary method 900 of allocating resource units in a symbol and generating pilot signals for data transmission. The method 900 may be performed using an apparatus (e.g., the AP 104, the AP 202, the AP 702, or the wireless device 802, for example). Although the method 900 is described below with respect to the elements of wireless device 802 of FIG. 8, other components may be used to implement one or more of the steps described herein.

At block 905, the apparatus may determine a plurality of resource units for communication. In one configuration, the apparatus may determine the plurality of resource units by determining a communication bandwidth and by determining a number of usable tones per resource unit based on the determined communication bandwidth. In one example, referring to FIG. 7, the AP 702 may determine the resource units within one or more symbols for wireless communication. The AP 702 may determine that the communication bandwidth is 20 MHz. The AP 702 may determine to have 26 usable tones per resource unit. In this example, the AP 702 may determine that the total number of resource units in a symbol may be 9. In another example, the AP 702 may determine that the communication bandwidth is 20 MHz and that the number of usable tones per resource unit may be 26 or 52 usable tones. In this example, there may be 5 26-tone RUs and 2 52-tone RUs. In an aspect, as previously discussed, the AP 702 may be compliant with a future IEEE standard, such as the IEEE 802.11ax standard. The AP 702 may determine the plurality of resource units for communication based on the IEEE 802.11ax standard.

At block 910, the apparatus may generate a set of pilot signals in at least one resource unit of the plurality of resource units. The at least one resource unit may be allocated to the apparatus for data transmission. In one configuration, the apparatus may generate the set of pilot signals in the at least one resource unit by determining pilot tone locations associated with the at least one resource unit, by determining a pilot sequence associated with the determined pilot tone locations, and by determining pilot values for the determined pilot tone locations based on the determined pilot sequence and a pilot polarity sequence. For example, referring to FIG. 7, the AP 702 may be assigned a 26-tone RU for data transmission among 9 26-tone RUs. The AP 702 may determine that the pilot tone locations associated with the RU is −116, −102 based on preconfigured information. The AP 702 may determine the pilot sequence associated with the determined pilot tone locations. In an aspect, the AP 702 may generate the set of pilot signals based on a future IEEE standard, such as an IEEE 802.11ax standard.

In option 1, using Eq. 1 and the base pilot sequence in Table 2, assuming n=0, the AP 702 may determine that the pilot sequence is {1, −1}. Since n=0, the pilot sequence {1, −1} also corresponds to the initial pilot sequence. Next, the AP 702 may determine pilot values for the determined pilot tone locations (−116, −102) based on the determined pilot sequence {1, −1} and the pilot polarity sequence. Assuming z=4, then $p_{n+z}$=−1. The pilot values may be determined based on the equation, $p_{n+z}*P_n^k$, which yields a generated set of pilot signals equal to {−1, 1}.

In option 2, having determined the pilot tone locations associated with the first 26-tone RU, the AP 702 may determine the base pilot sequence P={$p_i$, i=1, . . . , 18}={1, 1, 1, −1, 1, 1, −1, −1, 1, 1, −1, 1, −1, 1, 1, 1, 1, −1} associated with a 20 MHz bandwidth. The AP 702 may determine that 26 usable tones are assigned to the resource unit. The AP 702 may determine the initial pilot sequence $P_{26,1}$={$p_i$, i=1, 2}={1, 1} based on the communication bandwidth, the determined base pilot sequence, and the determined number of usable tones. Assuming z=4, then $p_{n+z}$=−1. The pilot values may be determined based on the equation, $p_{n+z}*P_n^k$. The AP 702 may multiply the pilot sequence {1, 1} by a value associated with the pilot polarity sequence which yields the generated set of pilot signals {−1, −1}.

In option 3, having determined the pilot tone locations associated with the first 26-tone RU, the AP 702 may determine the base pilot sequence P={$p_i$, i=1, . . . , 18}={1, −1, 1, 1, −1, −1, −1, 1, 1, 1, 1, −1, −1, −1, −1, −1, 1, −1} associated with a 20 MHz bandwidth. The AP 702 may determine that 26 usable tones are assigned to the resource unit. The AP 702 may determine the initial pilot sequence $P_{26,1}$={$p_i$, i=1, 2}={1, −1} based on the communication bandwidth, the determined base pilot sequence, and the determined number of usable tones. Assuming z=4, then $p_{n+z}$=−1. The pilot values may be determined based on the equation, $p_{n+z}*P_n^k$. The AP 702 may multiply the pilot sequence {1, −1} by a value associated with the pilot polarity sequence which yields the generated set of pilot signals {−1, 1}.

At block 915, the apparatus may transmit the generated set of pilot signals in the at least one resource unit of the plurality of resource units. For example, referring to FIG. 7, in option 1, the AP 702 may transmit the generated set of pilot signals {−1, 1} at pilot tone locations (−116, −102) in the first 26-tone RU. Similarly, in option 2, the AP 702 may transmit the generated set of pilot signals {−1, −1} at pilot tone locations (−116, −102) in the first 26-tone RU. In option 3, the AP 702 may transmit the generated set of pilot signals {−1, 1} at pilot tone locations (−116, −102)

At block 920, the apparatus may allocate one or more resource units of the plurality of resource units to at least one wireless device. For example, referring to FIG. 7, the AP 702 may allocate 2 RUs of 9 26-tone RUs in a 20 MHz symbol to the STA 706 and 3 26-tone RUs to the STA 708.

At block 925, the apparatus may transmit allocation information associated with the allocated one or more resource units to the at least one wireless device. For example, referring to FIG. 7, the AP 702 may transmit allocation information associated with the 2 26-tone RUs allocated to the STA 706 and with the 3 26-tone RUs allocated to the STA 708 to the STAs 706, 708. The allocation information may include a set of tone indices associated with each of the allocated 26-tone RUs, an identifier, an RU size that indicates the RUs have 26 usable tones, an indication that the RUs are associated with a 20 MHz, and/or data symbol information associated with the assigned RUs.

Figure 10:
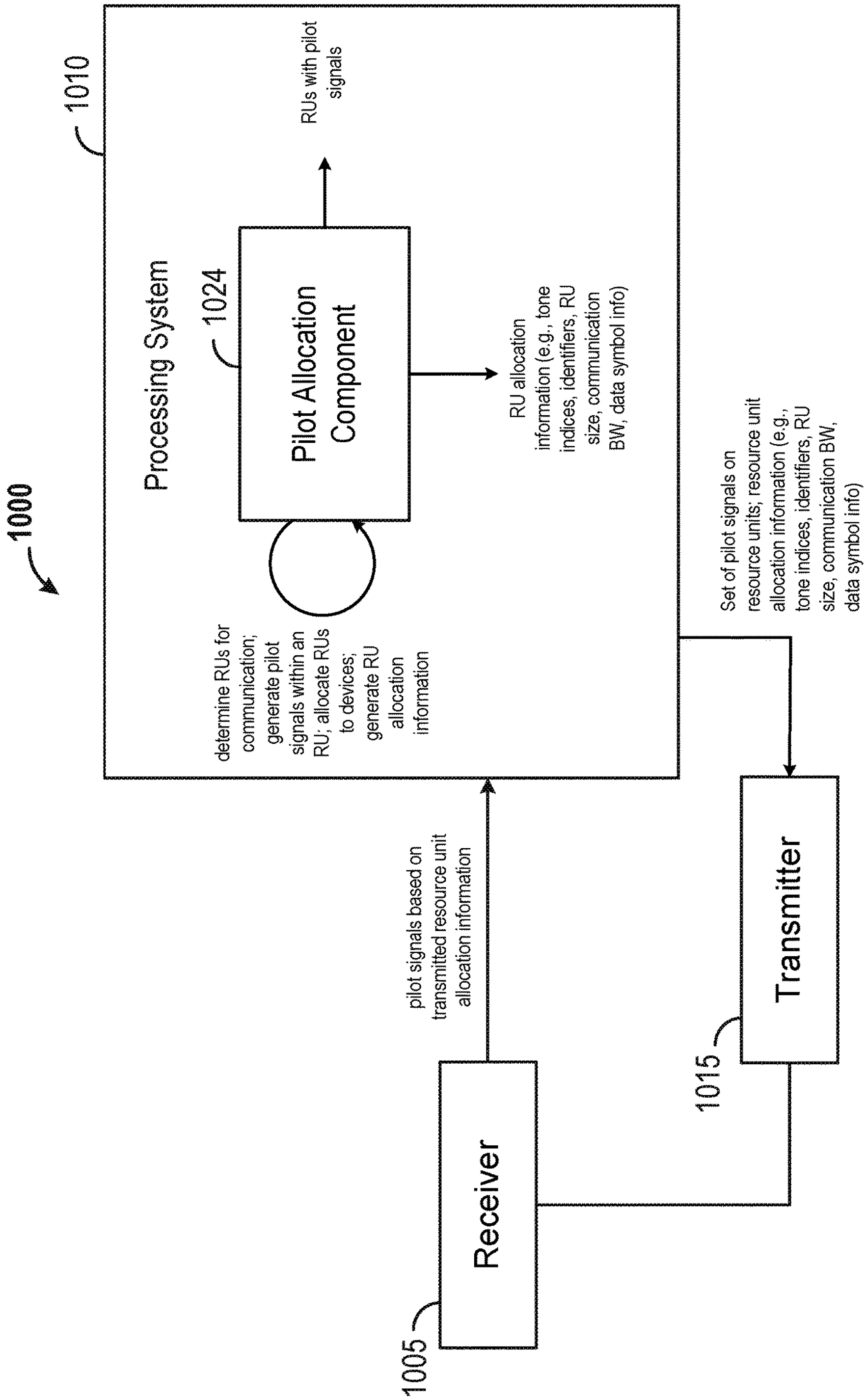
FIG. 10 is a functional block diagram of an exemplary wireless communication device for allocating resource units.

FIG. 10 is a functional block diagram of an exemplary wireless communication device 1000 for allocating resource units. The wireless communication device 1000 may include a receiver 1005, a processing system 1010, and a transmitter 1015. The processing system 1010 may include a pilot allocation component 1024. The processing system 1010 and/or the pilot allocation component 1024 may be configured to determine a plurality of resource units for communication. The processing system 1010 and/or the pilot allocation component 1024 may be configured to generate a set of pilot signals in at least one resource unit of the plurality of resource units. The processing system 1010, the transmitter 1015, and/or the pilot allocation component 1024 may be configured to transmit the generated set of pilot signals in the at least one resource unit of the plurality of resource units. In one configuration, the processing system 1010 and/or the pilot allocation component 1024 may be configured to determine the plurality of resource units for communication by determining a communication bandwidth and by determining a number of usable tones per resource unit based on the determined communication bandwidth. In another configuration, the processing system 1010 and/or the pilot allocation component 1024 may be configured to generate the set of pilot signals in the at least one resource unit by determining pilot tone locations associated with the at least one resource unit, by determining a pilot sequence associated with the determined pilot tone locations, and by determining pilot values for the determined pilot tone locations based on the determined pilot sequence and a pilot polarity sequence. In an aspect, the pilot sequence is determined by shifting an initial pilot sequence based on a data symbol index. In another aspect, the at least one resource unit of the plurality of resource units has 26 usable tones and 2 pilot tone locations, and the pilot sequence is determined based on an initial pilot sequence {1, −1}. In another aspect, the at least one resource unit of the plurality of resource units has 52 usable tones or 106 usable tones and has 4 pilot tone locations, and the pilot sequence is determined based on an initial pilot sequence {1, 1, 1, −1}. In another aspect, the at least one resource unit of the plurality of resource units has 242 usable tones and has 8 pilot tone locations, and the pilot sequence is determined based on an initial pilot sequence {1, 1, 1, −1, −1, 1, 1, 1}. In another aspect, the at least one resource unit of the plurality of resource units has 484 usable tones or 996 usable tones and has 16 pilot tone locations, and the pilot sequence is determined based on an initial pilot sequence {1, 1, 1, −1, −1, 1, 1, 1, 1, 1, 1, −1, −1, 1, 1, 1}. In another aspect, the at least one resource unit of the plurality of resource units has 1992 usable tones and 32 pilot tone locations, and the pilot sequence is determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another configuration, the processing system 1010 and/or the pilot allocation component 1024 may be configured to generate the set of pilot signals is based on a number of symbols in a SIG field of a preamble. In an aspect, each resource unit of the plurality of resource units has 26 usable tones, a communication bandwidth associated with the plurality of resource units is 20 MHz, and the plurality of resource units is associated with a plurality of pilot tone location sets {(−116, −102), (−90, −76), (−62, −48), (−36, −22), (−10, 10), (22, 36), (48, 62), (76, 90), (102, 116)}. In another aspect, each resource unit of the plurality of resource units has 26 usable tones, a communication bandwidth associated with the plurality of resource units is 40 MHz, and the plurality of resource units is associated with a plurality of pilot tone location sets {(−238, −224), (−212, −198), (−184, −170), (−158, −144), (−130, −116), (−104, −90), (−78, −64), (−50, −36), (−24, −10), (10, 24), (36, 50), (64, 78), (90, 104), (116, 130), (144, 158), (170, 184), (198, 212), (224, 238)}. In another aspect, each resource unit of the plurality of resource units has 26 usable tones, a communication bandwidth associated with the plurality of resource units is 80 MHz, and the plurality of resource units is associated with a plurality of pilot tone location sets {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units has 26 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units has 52 usable tones, a communication bandwidth associated with the plurality of resource units is 20 MHz, and the plurality of resource units is associated with a plurality of pilot tone location sets {(−116, −102, −90, −76), (−62, −48, −36, −22), (22, 36, 48, 62), (76, 90, 102, 116)}. In another aspect, each resource unit of the plurality of resource units has 52 usable tones, a communication bandwidth associated with the plurality of resource units is 40 MHz, and the plurality of resource units is associated with a plurality of pilot tone location sets {(−238, −224, −212, −198), (−184, −170, −158, −144), (−104, −90, −78, −64), (−50, −36, −24, −10), (10, 24, 36, 50), (64, 78, 90, 104), (144, 158, 170, 184), (198, 212, 224, 238)}. In another aspect, each resource unit of the plurality of resource units has 52 usable tones, a communication bandwidth associated with the plurality of resource units is 80 MHz, and the plurality of resource units is associated with a plurality of pilot tone location sets {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units has 52 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units has 106 usable tones, a communication bandwidth associated with the plurality of resource units is 20 MHz, and the plurality of resource units is associated with a plurality of pilot tone location sets {(−116, −90, −48, −22), (22, 48, 90, 116)}. In another aspect, each resource unit of the plurality of resource units has 106 usable tones, a communication bandwidth associated with the plurality of resource units is 40 MHz, and the plurality of resource units is associated with a plurality of pilot tone location sets {(−238, −212, −170, −144), (−104, −78, −36, −10), (10, 36, 78, 104), (144, 170, 212, 238)}. In another aspect, each resource unit of the plurality of resource units has 106 usable tones, a communication bandwidth associated with the plurality of resource units is 80 MHz, and the plurality of resource units is associated with a plurality of pilot tone location sets {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units has 106 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units has 242 usable tones, a communication bandwidth associated with the plurality of resource units is 20 MHz, and the plurality of resource units includes a resource unit associated with a pilot tone location set {(−116, −90, −48, −22, 22, 48, 90, 116)}. In another aspect, each resource unit of the plurality of resource units has 242 usable tones, a communication bandwidth associated with the plurality of resource units is 40 MHz, and the plurality of resource units is associated with a plurality of pilot tone location sets {(−238, −212, −170, −144, −104, −78, −36, −10), (10, 36, 78, 104, 144, 170, 212, 238)}. In another aspect, each resource unit of the plurality of resource units has 242 usable tones, a communication bandwidth associated with the plurality of resource units is 80 MHz, and the plurality of resource units is associated with a plurality of pilot tone location sets {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units has 242 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units has 484 usable tones, a communication bandwidth associated with the plurality of resource units is 40 MHz, and the plurality of resource units includes a resource unit associated with a pilot tone location set {(−238, −212, −170, −144, −104, −78, −36, −10, 10, 36, 78, 104, 144, 170, 212, 238)}. In another aspect, each resource unit of the plurality of resource units has 484 usable tones, a communication bandwidth associated with the plurality of resource units is 80 MHz, and the plurality of resource units is associated with a plurality of pilot tone location sets {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units has 484 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units has 996 usable tones, a communication bandwidth associated with the plurality of resource units is 80 MHz, and the plurality of resource units includes a resource unit associated with a pilot tone location set {(−468, −400, −334, −266, −226, −158, −92, −24, 24, 92, 158, 226, 266, 334, 400, 468)}. In another aspect, each resource unit of the plurality of resource units has 996 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−468, −400, −334, −266, −226, −158, −92, −24, 24, 92, 158, 226, 266, 334, 400, 468)}. In another aspect, each resource unit of the plurality of resource units has 1992 usable tones, a communication bandwidth associated with the plurality of resource units is 160 MHz, and the plurality of resource units includes a resource unit associated with a pilot tone location set {(−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980)}. In another configuration, the processing system 1010 and/or the pilot allocation component 1024 may be configured to allocate one or more resource units of the plurality of resource units to at least one wireless device. In this configuration, the processing system 1010, the pilot allocation component 1024, and/or the transmitter 1015 may be configured to transmit allocation information associated with the allocated one or more resource units to the at least one wireless device. In an aspect, the allocation information may include at least one of a set of tone indices, an identifier, a resource unit size that indicates a number of usable tones per resource unit, a communication bandwidth, or data symbol information. In another aspect, each resource unit of the plurality of resource units has 26 usable tones, 52 usable tones, 106 usable tones, 242 usable tones, 484 usable tones, 996 usable tones, or 1992 usable tones. In another configuration, the processing system 1010 and/or the pilot allocation component 1024 may be configured to determine the pilot sequence by determining a communication bandwidth, by determining a base pilot sequence associated with the determined communication bandwidth, by determining a number of usable tones in the at least one resource unit, and by determining an initial pilot sequence based on the communication bandwidth, the determined base pilot sequence, and the determined number of usable tones. In another configuration, the generated set of pilot signals in the at least one resource unit is based on the communication bandwidth, the determined pilot tone locations, and the determined pilot values. In another aspect, the communication bandwidth is 20 MHz, and the determined base pilot sequence is a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth is 40 MHz, and the determined base pilot sequence is a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth is 80 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth is 160 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence is determined based on a set of nominal tone indices associated with the at least one resource unit. In another aspect, the pilot sequence is determined by shifting the determined initial pilot sequence based on a data symbol index.

The receiver 1005, the processing system 1010, the pilot allocation component 1024, and/or the transmitter 1015 may be configured to perform one or more functions discussed above with respect to blocks 905, 910, 915, 920, and 925 of FIG. 9. The receiver 1005 may correspond to the receiver 812. The processing system 1010 may correspond to the processor 804. The transmitter 1015 may correspond to the transmitter 810. The pilot allocation component 1024 may correspond to the pilot allocation component 124 and/or the pilot allocation component 824.

In one configuration, the wireless communication device 1000 may include means for determining a plurality of resource units for communication. The wireless communication device 1000 may include means for generating a set of pilot signals in at least one resource unit of the plurality of resource units. The wireless communication device 1000 may include means for transmitting the generated set of pilot signals in the at least one resource unit of the plurality of resource units. In one aspect, the means for determining the plurality of resource units for communication may be configured to determine a communication bandwidth and to determine a number of usable tones per resource unit based on the determined communication bandwidth. In another configuration, the means for generating the set of pilot signals in the at least one resource unit may be configured to determine pilot tone locations associated with the at least one resource unit, to determine a pilot sequence associated with the determined pilot tone locations, and to determine pilot values for the determined pilot tone locations based on the determined pilot sequence and a pilot polarity sequence. In an aspect, the pilot sequence is determined by shifting an initial pilot sequence based on a data symbol index. In another aspect, the at least one resource unit of the plurality of resource units has 26 usable tones and 2 pilot tone locations, and the pilot sequence is determined based on an initial pilot sequence {1, −1}. In another aspect, the at least one resource unit of the plurality of resource units has 52 usable tones or 106 usable tones and has 4 pilot tone locations, and the pilot sequence is determined based on an initial pilot sequence {1, 1, 1, −1}. In another aspect, the at least one resource unit of the plurality of resource units has 242 usable tones and has 8 pilot tone locations, and the pilot sequence is determined based on an initial pilot sequence {1, 1, 1, −1, −1, 1, 1, 1}. In another aspect, the at least one resource unit of the plurality of resource units has 484 usable tones or 996 usable tones and has 16 pilot tone locations, and the pilot sequence is determined based on an initial pilot sequence {1, 1, 1, −1, −1, 1, 1, 1, 1, 1, 1, −1, −1, 1, 1, 1}. In another aspect, the at least one resource unit of the plurality of resource units has 1992 usable tones and 32 pilot tone locations, and the pilot sequence is determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another configuration, the set of pilot signals is generated based on a number of symbols in a SIG field of a preamble. In an aspect, each resource unit of the plurality of resource units has 26 usable tones, a communication bandwidth associated with the plurality of resource units is 20 MHz, and the plurality of resource units is associated with a plurality of pilot tone location sets {(−116, −102), (−90, −76), (−62, −48), (−36, −22), (−10, 10), (22, 36), (48, 62), (76, 90), (102, 116)}. In another aspect, each resource unit of the plurality of resource units has 26 usable tones, a communication bandwidth associated with the plurality of resource units is 40 MHz, and the plurality of resource units is associated with a plurality of pilot tone location sets {(−238, −224), (−212, −198), (−184, −170), (−158, −144), (−130, −116), (−104, −90), (−78, −64), (−50, −36), (−24, −10), (10, 24), (36, 50), (64, 78), (90, 104), (116, 130), (144, 158), (170, 184), (198, 212), (224, 238)}. In another aspect, each resource unit of the plurality of resource units has 26 usable tones, a communication bandwidth associated with the plurality of resource units is 80 MHz, and the plurality of resource units is associated with a plurality of pilot tone location sets {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units has 26 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −480), (−468, −454), (−440, −426), (−414, −400), (−386, −372), (−360, −346), (−334, −320), (−306, −292), (−280, −266), (−252, −238), (−226, −212), (−198, −184), (−172, −158), (−144, −130), (−118, −104), (−92, −78), (−64, −50), (−38, −24), (−10, 10), (24, 38), (50, 64), (78, 92), (104, 118), (130, 144), (158, 172), (184, 198), (212, 226), (238, 252), (266, 280), (292, 306), (320, 334), (346, 360), (372, 386), (400, 414), (426, 440), (454, 468), (480, 494)}. In another aspect, each resource unit of the plurality of resource units has 52 usable tones, a communication bandwidth associated with the plurality of resource units is 20 MHz, and the plurality of resource units is associated with a plurality of pilot tone location sets {(−116, −102, −90, −76), (−62, −48, −36, −22), (22, 36, 48, 62), (76, 90, 102, 116)}. In another aspect, each resource unit of the plurality of resource units has 52 usable tones, a communication bandwidth associated with the plurality of resource units is 40 MHz, and the plurality of resource units is associated with a plurality of pilot tone location sets {(−238, −224, −212, −198), (−184, −170, −158, −144), (−104, −90, −78, −64), (−50, −36, −24, −10), (10, 24, 36, 50), (64, 78, 90, 104), (144, 158, 170, 184), (198, 212, 224, 238)}. In another aspect, each resource unit of the plurality of resource units has 52 usable tones, a communication bandwidth associated with the plurality of resource units is 80 MHz, and the plurality of resource units is associated with a plurality of pilot tone location sets {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units has 52 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −480, −468, −454), (−440, −426, −414, −400), (−360, −346, −334, −320), (−306, −292, −280, −266), (−252, −238, −226, −212), (−198, −184, −172, −158), (−118, −104, −92, −78), (−64, −50, −38, −24), (24, 38, 50, 64), (78, 92, 104, 118), (158, 172, 184, 198), (212, 226, 238, 252), (266, 280, 292, 306), (320, 334, 346, 360), (400, 414, 426, 440), (454, 468, 480, 494)}. In another aspect, each resource unit of the plurality of resource units has 106 usable tones, a communication bandwidth associated with the plurality of resource units is 20 MHz, and the plurality of resource units is associated with a plurality of pilot tone location sets {(−116, −90, −48, −22), (22, 48, 90, 116)}. In another aspect, each resource unit of the plurality of resource units has 106 usable tones, a communication bandwidth associated with the plurality of resource units is 40 MHz, and the plurality of resource units is associated with a plurality of pilot tone location sets {(−238, −212, −170, −144), (−104, −78, −36, −10) (10, 36, 78, 104), (144, 170, 212, 238)}. In another aspect, each resource unit of the plurality of resource units has 106 usable tones, a communication bandwidth associated with the plurality of resource units is 80 MHz, and the plurality of resource units is associated with a plurality of pilot tone location sets {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units has 106 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400), (−360, −334, −292, −266), (−252, −226, −184, −158), (−118, −92, −50, −24), (24, 50, 92, 118), (158, 184, 226, 252), (266, 292, 334, 360), (400, 426, 468, 494)}. In another aspect, each resource unit of the plurality of resource units has 242 usable tones, a communication bandwidth associated with the plurality of resource units is 20 MHz, and the plurality of resource units includes a resource unit associated with a pilot tone location set {(−116, −90, −48, −22, 22, 48, 90, 116)}. In another aspect, each resource unit of the plurality of resource units has 242 usable tones, a communication bandwidth associated with the plurality of resource units is 40 MHz, and the plurality of resource units is associated with a plurality of pilot tone location sets {(−238, −212, −170, −144, −104, −78, −36, −10), (10, 36, 78, 104, 144, 170, 212, 238)}. In another aspect, each resource unit of the plurality of resource units has 242 usable tones, a communication bandwidth associated with the plurality of resource units is 80 MHz, and the plurality of resource units is associated with a plurality of pilot tone location sets {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units has 242 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400, −360, −334, −292, −266), (−252, −226, −184, −158, −118, −92, −50, −24), (24, 50, 92, 118, 158, 184, 226, 252), (266, 292, 334, 360, 400, 426, 468, 494)}. In another aspect, each resource unit of the plurality of resource units has 484 usable tones, a communication bandwidth associated with the plurality of resource units is 40 MHz, and the plurality of resource units includes a resource unit associated with a pilot tone location set {(−238, −212, −170, −144, −104, −78, −36, −10, 10, 36, 78, 104, 144, 170, 212, 238)}. In another aspect, each resource unit of the plurality of resource units has 484 usable tones, a communication bandwidth associated with the plurality of resource units is 80 MHz, and the plurality of resource units is associated with a plurality of pilot tone location sets {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units has 484 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−494, −468, −426, −400, −360, −334, −292, −266, −252, −226, −184, −158, −118, −92, −50, −24), (24, 50, 92, 118, 158, 184, 226, 252, 266, 292, 334, 360, 400, 426, 468, 494)}. In another aspect, each resource unit of the plurality of resource units has 996 usable tones, a communication bandwidth associated with the plurality of resource units is 80 MHz, and the plurality of resource units includes a resource unit associated with a pilot tone location set {(−468, −400, −334, −266, −226, −158, −92, −24, 24, 92, 158, 226, 266, 334, 400, 468)}. In another aspect, each resource unit of the plurality of resource units has 996 usable tones, a communication bandwidth associated with the plurality of resource units is 160 MHz, the plurality resource units is associated with a first plurality of pilot tone location sets and a second plurality of pilot tone location sets, the first plurality of pilot tone location sets is based on an initial plurality of pilot tone location sets adjusted by a first offset of −512 and the second plurality of pilot tone sets is based on the initial plurality of pilot tone location sets adjusted by a second offset of 512, and the initial plurality of pilot tone location sets is {(−468, −400, −334, −266, −226, −158, −92, −24, 24, 92, 158, 226, 266, 334, 400, 468)}. In another aspect, each resource unit of the plurality of resource units has 1992 usable tones, a communication bandwidth associated with the plurality of resource units is 160 MHz, and the plurality of resource units includes a resource unit associated with a pilot tone location set {(−980, −912, −846, −778, −738, −670, −604, −536, −488, −420, −354, −286, −246, −178, −112, −44, 44, 112, 178, 246, 286, 354, 420, 488, 536, 604, 670, 738, 778, 846, 912, 980)}. In another aspect, the wireless communication device 1000 may include means for allocating one or more resource units of the plurality of resource units to at least one wireless device. In this aspect, the wireless communication device 1000 may include means for transmitting allocation information associated with the allocated one or more resource units to the at least one wireless device. In an aspect, the allocation information may include at least one of a set of tone indices, an identifier, a resource unit size that indicates a number of usable tones per resource unit, a communication bandwidth, or data symbol information. In another aspect, each resource unit of the plurality of resource units has 26 usable tones, 52 usable tones, 106 usable tones, 242 usable tones, 484 usable tones, 996 usable tones, or 1992 usable tones. In another aspect, the means for determining the pilot sequence may be configured to determine a communication bandwidth, to determine a base pilot sequence associated with the determined communication bandwidth, to determine a number of usable tones in the at least one resource unit, and to determine an initial pilot sequence based on the communication bandwidth, the determined base pilot sequence, and the determined number of usable tones. In another configuration, the generated set of pilot signals in the at least one resource unit is based on the communication bandwidth, the determined pilot tone locations, and the determined pilot values. In another aspect, the communication bandwidth is 20 MHz, and the determined base pilot sequence is a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth is 40 MHz, and the determined base pilot sequence is a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth is 80 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth is 160 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence is determined based on a set of nominal tone indices associated with the at least one resource unit. In another aspect, the pilot sequence is determined by shifting the determined initial pilot sequence based on a data symbol index.

For example, means for determining a plurality of resource units may include the processing system 1010 and/or the pilot allocation component 1024. Means for generating a set of pilot signals may include the processing system 1010 and/or the pilot allocation component 1024. Means for transmitting the generated pilot signals may include the transmitter 1015, the processing system 1010, and/or the pilot allocation component 1024. Means for allocating may include the processing system 1010 and/or the pilot allocation component 1024. Means for transmitting the allocation information may include the transmitter 1015, the processing system 1010, and/or the pilot allocation component 1024

Figure 11:
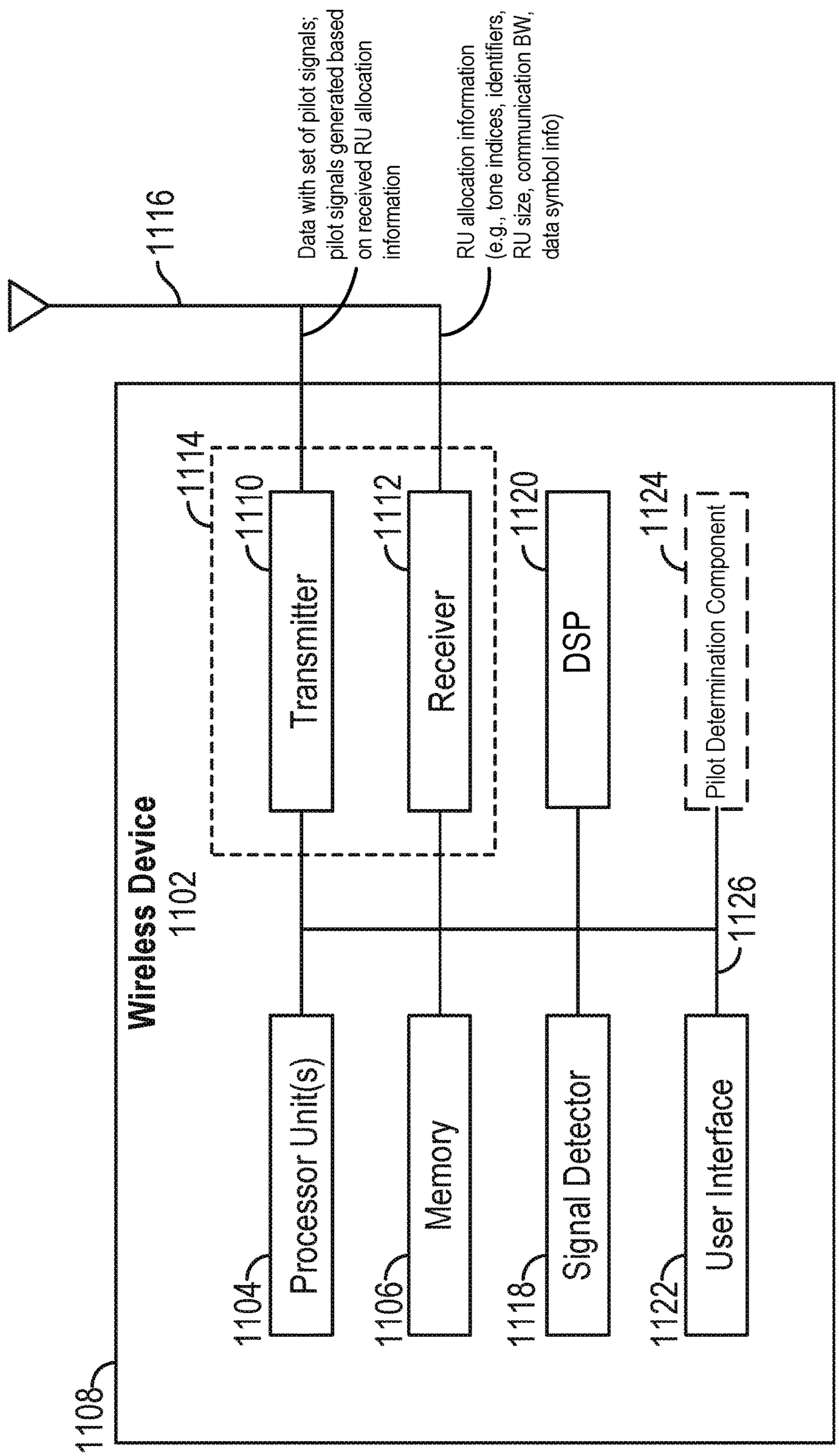
FIG. 11 is a functional block diagram of a wireless device that may be employed within the wireless communication system of FIG. 1 for generating pilot signals.

FIG. 11 is a functional block diagram of a wireless device 1102 that may be employed within the wireless communication system 100 of FIG. 1 for generating pilot signals. The wireless device 1102 is an example of a device that may be configured to implement the various methods described herein. For example, the wireless device 1102 may comprise the STA 114 or the STAs 706, 708, 710, 712.

The wireless device 1102 may include a processor 1104 which controls operation of the wireless device 1102. The processor 1104 may also be referred to as a CPU. Memory 1106, which may include both ROM and RAM, may provide instructions and data to the processor 1104. A portion of the memory 1106 may also include NVRAM. The processor 1104 typically performs logical and arithmetic operations based on program instructions stored within the memory 1106. The instructions in the memory 1106 may be executable (by the processor 1104, for example) to implement the methods described herein.

The processor 1104 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may include an interface configured to provide information for transmission by the transmitter 1110 and/or the transceiver 1114. The interface may also be configured to receive information from the receiver 1112 and/or the transceiver 1114. In an aspect, the interface may be an interface of the processor 1104.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1102 may also include a housing 1108, and the wireless device 1102 may include a transmitter 1110 and/or a receiver 1112 to allow transmission and reception of data between the wireless device 1102 and a remote device. The transmitter 1110 and the receiver 1112 may be combined into a transceiver 1114. An antenna 1116 may be attached to the housing 1108 and electrically coupled to the transceiver 1114. The wireless device 1102 may also include multiple transmitters, multiple receivers, multiple transceivers, and/or multiple antennas.

The wireless device 1102 may also include a signal detector 1118 that may be used to detect and quantify the level of signals received by the transceiver 1114 or the receiver 1112. The signal detector 1118 may detect such signals as total energy, energy per subcarrier per symbol, power spectral density, and other signals. The wireless device 1102 may also include a DSP 1120 for use in processing signals. The DSP 1120 may be configured to generate a packet for transmission. In some aspects, the packet may comprise a PPDU.

The wireless device 1102 may further comprise a user interface 1122 in some aspects. The user interface 1122 may comprise a keypad, a microphone, a speaker, and/or a display. The user interface 1122 may include any element or component that conveys information to a user of the wireless device 1102 and/or receives input from the user.

When the wireless device 1102 is implemented as an STA (e.g., STA 114, STA 706), the wireless device 1102 may also comprise a pilot determination component 1124. The pilot determination component 1124 may be configured to receive a message indicating one or more resource units allocated to the wireless device 1002 for communication. The pilot determination component 1124 may be configured to generate a set of pilot signals for the one or more resource units. The pilot determination component 1124 may be configured to transmit data and the generated set of pilot signals in the one or more resource units. In an aspect, the message includes allocation information that includes at least one of a set of tone indices, an identifier, a resource unit size that indicates a number of usable tones per resource unit, a communication bandwidth, or data symbol information. In one configuration, the pilot determination component 1124 may be configured to generate the set of pilot signals by determining pilot tone locations associated with the one or more resource units, by determining a pilot sequence associated with the determined pilot tone locations, and by determining pilot values for the determined pilot tone locations based on the determined pilot sequence and a pilot polarity sequence. In an aspect, the pilot sequence is determined by shifting an initial pilot sequence based on a data symbol index. In another aspect, each resource unit of the one or more resource units has 26 usable tones and 2 pilot tone locations, and the pilot sequence is determined based on an initial pilot sequence {1, −1}. In another aspect, each resource unit of the one or more resource units has 52 usable tones or 106 usable tones and has 4 pilot tone locations, and the pilot sequence is determined based on an initial pilot sequence {1, 1, 1, −1}. In another aspect, each resource unit of the one or more resource units has 242 usable tones and has 8 pilot tone locations, and the pilot sequence is determined based on an initial pilot sequence {1, 1, 1, −1, −1, 1, 1, 1}. In another aspect, each resource unit of the one or more resource units has 484 usable tones or 996 usable tones and has 16 pilot tone locations, and the pilot sequence is determined based on an initial pilot sequence {1, 1, 1, −1, −1, 1, 1, 1, 1, 1, 1, −1, −1, 1, 1, 1}. In another aspect, each resource unit of the one or more resource units has 1992 usable tones and 32 pilot tone locations, and the pilot sequence is determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another aspect, the pilot determination component 1124 may be configured to generate the set of pilot signals based on a number of symbols in a SIG field of a preamble. In another configuration, the pilot determination component 1124 may be configured to determine the pilot sequence by determining a communication bandwidth, by determining a base pilot sequence associated with the determined communication bandwidth, by determining a number of usable tones in the at least one resource unit, and by determining an initial pilot sequence based on the communication bandwidth, the determined base pilot sequence, and the determined number of usable tones. In another aspect, the generated set of pilot signals in the at least one resource unit is based on the communication bandwidth, the determined pilot tone locations, and the determined pilot values. In another aspect, the communication bandwidth is 20 MHz, and the determined base pilot sequence is a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth is 40 MHz, and the determined base pilot sequence is a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth is 80 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth is 160 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence is determined based on a set of nominal tone indices associated with the at least one resource unit. In another aspect, the pilot sequence is determined by shifting the determined initial pilot sequence based on a data symbol index.

The various components of the wireless device 1102 may be coupled together by a bus system 1126. The bus system 1126 may include a data bus, for example, as well as a power bus, a control signal bus, and a status signal bus in addition to the data bus. Components of the wireless device 1102 may be coupled together or accept or provide inputs to each other using some other mechanism.

Although a number of separate components are illustrated in FIG. 11, one or more of the components may be combined or commonly implemented. For example, the processor 1104 may be used to implement not only the functionality described above with respect to the processor 1104, but also to implement the functionality described above with respect to the signal detector 1118, the DSP 1120, the user interface 1122, and/or the pilot determination component 1124. Further, each of the components illustrated in FIG. 11 may be implemented using a plurality of separate elements.

Figure 12:
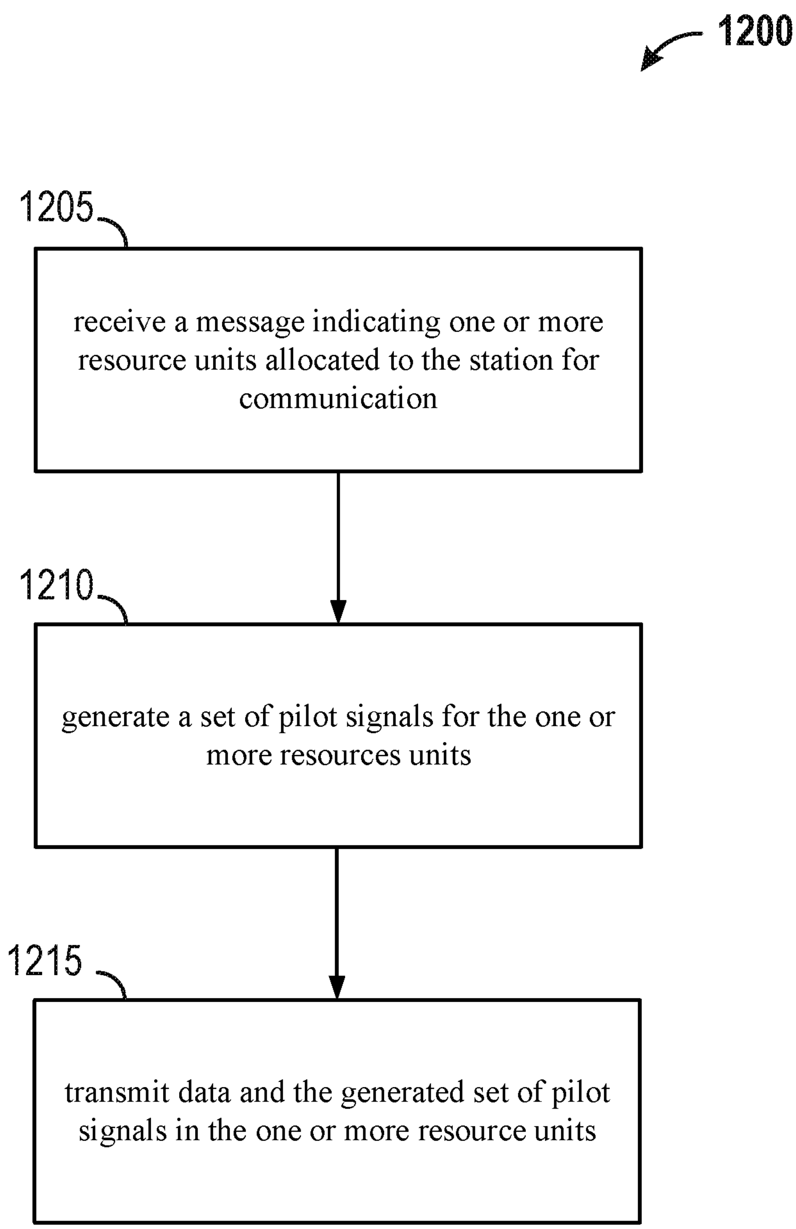
FIG. 12 is a flowchart of an example method for determining pilot signals to be used for data transmission.

FIG. 12 is a flowchart of an example method 1200 for determining pilot signals to be used for data transmission. The method 1200 may be performed using an apparatus (e.g., the STA 114, the STA 706, or the wireless device 1102, for example). Although the method 1200 is described below with respect to the elements of wireless device 1102 of FIG. 11, other components may be used to implement one or more of the steps described herein.

At block 1205, the apparatus may receive a message indicating one or more resource units allocated to the apparatus for communication. For example, referring to FIG. 7, the STA 706 may receive the trigger frame 714 from the AP 702, and the trigger frame 714 may indicate that a 52-tone RU is allocated to the STA 706 for wireless communication. In an aspect, as previously discussed, the STA 706 may be compliant with a future IEEE standard, such as the IEEE 802.11ax standard.

At block 1210, the apparatus may generate a set of pilot signals for the one or more resources units. In an aspect, the apparatus may generate the set of pilot signals by determining pilot tone locations associated with one or more resource units, by determining the pilot sequence associated with the determined pilot locations, and by determining pilot values for the determined pilot locations based on the determined pilot sequence and a pilot polarity sequence. For example, referring to FIG. 7, the STA 706 may generate a set of pilot signals for the 52-tone RU. In option 1, to generate the set of pilot signals for the 52-tone RU, the STA 706 may determine that the pilot tone locations associated with the 52-tone RU are (−116, −102, −90, −76). The STA 706 may determine the pilot sequence associated with the determined pilot tone locations. Using Eq. 3, assuming n=2, the STA 706 may determine that the pilot sequence is {1, −1, 1, 1}. Assuming z=4, then $p_{n+z}=-1$. Accordingly, based on the pilot values, $p_{n+z}*P_n^k$, the generated set of pilot signals is equal to {−1, 1, −1, −1}. In option 2, to generate the set of pilot signals for the 52-tone RU, the STA 706 may determine that the pilot tone locations associated with the 52-tone RU are (−116, −102, −90, −76). The STA 706 may determine the pilot sequence associated with the determined pilot tone locations. The STA 706 may determine that the base pilot sequence associated with a 20 MHz bandwidth is P={$p_i$, i=1, . . . , 18}={1, 1, 1, −1, 1, 1, −1, −1, 1, 1, −1, 1, −1, 1, 1, 1, 1, −1}. The STA 706 may determine the initial pilot sequence $P_{52,1}$={$p_i$, i=1, 2, 3, 4}={1, 1, 1, −1} based on the communication bandwidth, the determined base pilot sequence, and the determined number of usable tones. Assuming z=4, then $p_{n+z}=-1$. The pilot values may be determined based on the equation, $p_{n+z}*P_n^k$. The STA 706 may multiply the pilot sequence {1, 1, 1, −1} by a value associated with the pilot polarity sequence which yields the generated set of pilot signals {−1, −1, −1, 1}. In option 3, to generate the set of pilot signals for the 52-tone RU, the STA 706 may determine that the pilot tone locations associated with the 52-tone RU are (−116, −102, −90, −76). The STA 706 may determine the pilot sequence associated with the determined pilot tone locations. The STA 706 may determine that the base pilot sequence associated with a 20 MHz bandwidth is P={$p_i$, i=1, . . . , 18}={1, −1, 1, 1, −1, −1, −1, 1, 1, 1, 1, −1, −1, −1, −1, −1, 1, −1}. The STA 706 may determine the initial pilot sequence $P_{52,1}$={$p_i$, i=1, 2, 3, 4}={1, −1, 1, 1} based on the communication bandwidth, the determined base pilot sequence, and the determined number of usable tones. Assuming z=4, then $p_{n+z}=-1$. The pilot values may be determined based on the equation, $p_{n+z}*P_n^k$. The STA 706 may multiply the pilot sequence {1, −1, 1, 1} by a value associated with the pilot polarity sequence which yields the generated set of pilot signals {−1, 1, −1, −1}. In the foregoing description, the STA 706 generates the set of pilot signals according to a future IEEE 802.11 standard, such as the IEEE 802.11ax standard.

At block 1215, the apparatus may transmit data and the generated set of pilot signals in the one or more resource units. For example, referring to FIG. 7, the STA 706 may transmit the frame 716, and the frame 716 may include a symbol with the a 52-tone RU that includes data and the set of pilot signals generated according to option 1 or 2.

Figure 13:
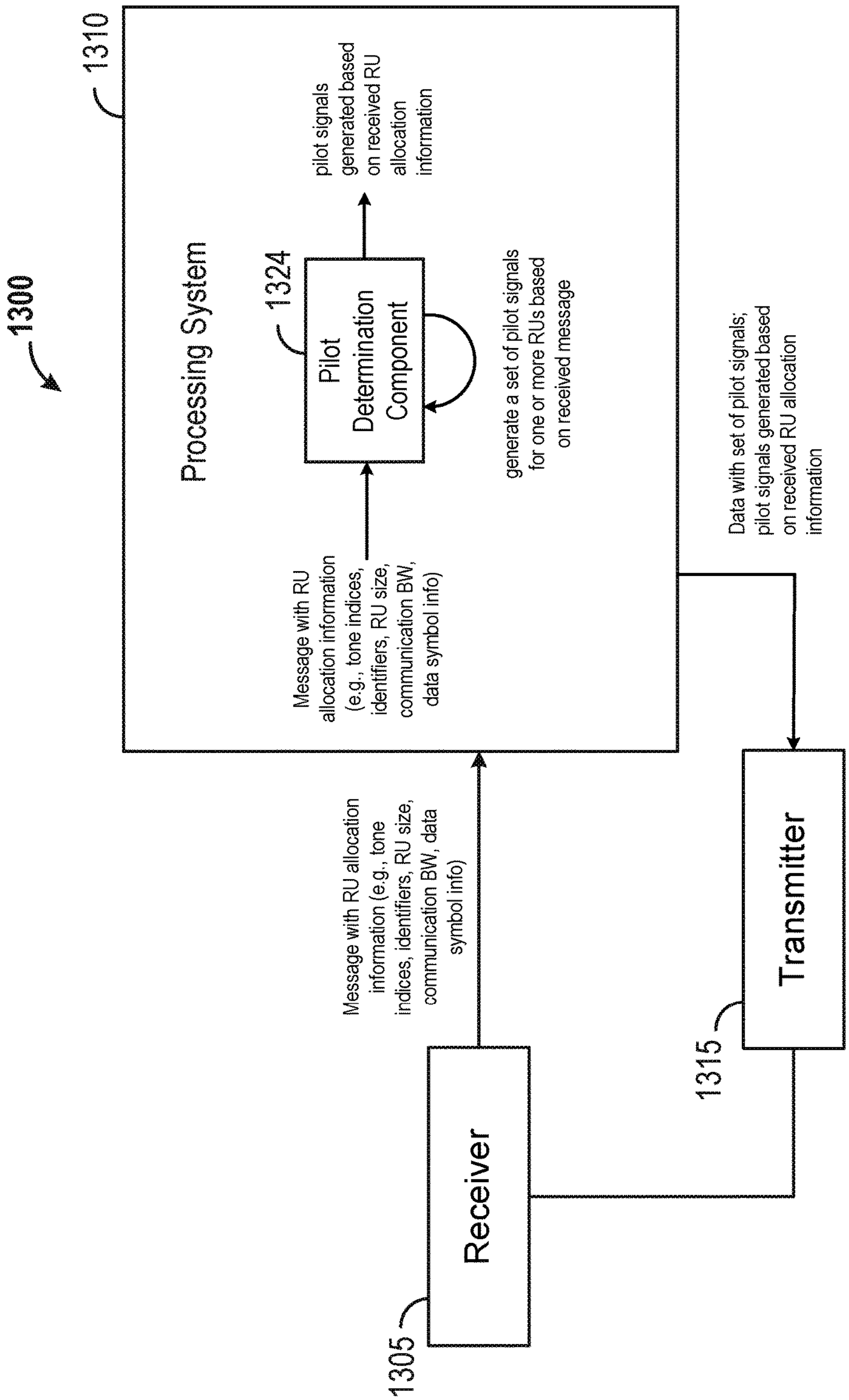
FIG. 13 is a functional block diagram of an exemplary wireless communication device for determining pilot signals to be used for data transmission.

FIG. 13 is a functional block diagram of an exemplary wireless communication device 1300 for determining pilot signals to be used for data transmission. The wireless communication device 1300 may include a receiver 1305, a processing system 1310, and a transmitter 1315. The processing system 1310 may include a pilot determination component 1324. The receiver 1305, the pilot determination component 1324, and/or the processing system 1310 may be configured to receive a message indicating one or more resource units allocated to the wireless communication device 1300 for communication. The pilot determination component 1324 and/or the processing system 1310 may be configured to generate a set of pilot signals for the one or more resource units. The transmitter 1315, the pilot determination component 1324, and/or the processing system 1310 may be configured to transmit data and the generated set of pilot signals in the one or more resource units. In an aspect, the message includes allocation information that includes at least one of a set of tone indices, an identifier, a resource unit size that indicates a number of usable tones per resource unit, a communication bandwidth, or data symbol information. In one configuration, the pilot determination component 1324 and/or the processing system 1310 may be configured to generate the set of pilot signals by determining pilot tone locations associated with the one or more resource units, by determining a pilot sequence associated with the determined pilot tone locations, and by determining pilot values for the determined pilot tone locations based on the determined pilot sequence and a pilot polarity sequence. In an aspect, the pilot sequence is determined by shifting an initial pilot sequence based on a data symbol index. In another aspect, each resource unit of the one or more resource units has 26 usable tones and 2 pilot tone locations, and the pilot sequence is determined based on an initial pilot sequence {1, −1}. In another aspect, each resource unit of the one or more resource units has 52 usable tones or 106 usable tones and has 4 pilot tone locations, and the pilot sequence is determined based on an initial pilot sequence {1, 1, 1, −1}. In another aspect, each resource unit of the one or more resource units has 242 usable tones and has 8 pilot tone locations, and the pilot sequence is determined based on an initial pilot sequence {1, 1, 1, −1, −1, 1, 1, 1}. In another aspect, each resource unit of the one or more resource units has 484 usable tones or 996 usable tones and has 16 pilot tone locations, and the pilot sequence is determined based on an initial pilot sequence {1, 1, 1, −1, −1, 1, 1, 1, 1, 1, 1, −1, −1, 1, 1, 1}. In another aspect, each resource unit of the one or more resource units has 1992 usable tones and 32 pilot tone locations, and the pilot sequence is determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another aspect, the pilot determination component 1324 and/or the processing system 1310 may be configured to generate the set of pilot signals based on a number of symbols in a SIG field of a preamble. In another configuration, the pilot determination component 1324 and/or the processing system 1310 may be configured to determine the pilot sequence by determining a communication bandwidth, by determining a base pilot sequence associated with the determined communication bandwidth, by determining a number of usable tones in the at least one resource unit, and by determining an initial pilot sequence based on the communication bandwidth, the determined base pilot sequence, and the determined number of usable tones. In another aspect, the generated set of pilot signals in the at least one resource unit is based on the communication bandwidth, the determined pilot tone locations, and the determined pilot values. In another aspect, the communication bandwidth is 20 MHz, and the determined base pilot sequence is a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth is 40 MHz, and the determined base pilot sequence is a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth is 80 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth is 160 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence is determined based on a set of nominal tone indices associated with the at least one resource unit. In another aspect, the pilot sequence is determined by shifting the determined initial pilot sequence based on a data symbol index.

The receiver 1305, the processing system 1310, the pilot determination component 1324, and/or the transmitter 1315 may be configured to perform one or more functions discussed above with respect to blocks 1205, 1210, and 1215 of FIG. 12. The receiver 1305 may correspond to the receiver 1112. The processing system 1310 may correspond to the processor 1104. The transmitter 1315 may correspond to the transmitter 1110. The pilot determination component 1324 may correspond to the pilot determination component 126 and/or the pilot determination component 1124.

In one configuration, the wireless communication device 1300 may include means for receiving a message indicating one or more resource units allocated to the wireless communication device 1300 for communication. The wireless communication device 1300 may include means for generating a set of pilot signals for the one or more resource units. The wireless communication device 1300 may include means for transmitting data and the generated set of pilot signals in the one or more resource units. In an aspect, the message includes allocation information that includes at least one of a set of tone indices, an identifier, a resource unit size that indicates a number of usable tones per resource unit, a communication bandwidth, or data symbol information. In one configuration, the means for generating the set of pilot signals may be configured to determine pilot tone locations associated with the one or more resource units, to determine a pilot sequence associated with the determined pilot tone locations, and to determine pilot values for the determined pilot tone locations based on the determined pilot sequence and a pilot polarity sequence. In an aspect, the pilot sequence is determined by shifting an initial pilot sequence based on a data symbol index. In another aspect, each resource unit of the one or more resource units has 26 usable tones and 2 pilot tone locations, and the pilot sequence is determined based on an initial pilot sequence {1, −1}. In another aspect, each resource unit of the one or more resource units has 52 usable tones or 106 usable tones and has 4 pilot tone locations, and the pilot sequence is determined based on an initial pilot sequence {1, 1, 1, −1}. In another aspect, each resource unit of the one or more resource units has 242 usable tones and has 8 pilot tone locations, and the pilot sequence is determined based on an initial pilot sequence {1, 1, 1, −1, −1, 1, 1, 1}. In another aspect, each resource unit of the one or more resource units has 484 usable tones or 996 usable tones and has 16 pilot tone locations, and the pilot sequence is determined based on an initial pilot sequence {1, 1, 1, −1, −1, 1, 1, 1, 1, 1, 1, −1, −1, 1, 1, 1}. In another aspect, each resource unit of the one or more resource units has 1992 usable tones and 32 pilot tone locations, and the pilot sequence is determined based on an initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}. In another aspect, the set of pilot signals is generated based on a number of symbols in a SIG field of a preamble. In another configuration, the means for determining the pilot sequence may be configured to determine a communication bandwidth, to determine a base pilot sequence associated with the determined communication bandwidth, to determine a number of usable tones in the at least one resource unit, and to determine an initial pilot sequence based on the communication bandwidth, the determined base pilot sequence, and the determined number of usable tones. In another aspect, the generated set of pilot signals in the at least one resource unit is based on the communication bandwidth, the determined pilot tone locations, and the determined pilot values. In another aspect, the communication bandwidth is 20 MHz, and the determined base pilot sequence is a first base pilot sequence {1, 1, 1, −1, 1, 1, −1, −1, 1, 1, −1, 1, −1, 1, 1, 1, 1, −1} or a second base pilot sequence {1, −1, −1, −1, −1, 1, −1, 1, −1, −1, 1, 1, −1, −1, 1, −1, −1, −1}. In another aspect, the communication bandwidth is 40 MHz, and the determined base pilot sequence is a first base pilot sequence {1, −1, 1, −1, −1, 1, −1, 1, −1, 1, −1, −1, −1, 1, −1, 1, 1, 1, 1, −1, −1, −1, −1, −1, −1, 1, −1, −1, −1, −1, 1, 1, −1, −1, 1, 1} or a second base pilot sequence {1, 1, −1, −1, 1, 1, −1, −1, −1, −1, 1, −1, −1, −1, −1, −1, −1, 1, 1, 1, 1, −1, 1, −1, −1, −1, 1, −1, 1, −1, 1, −1, −1, 1, −1, 1}. In another aspect, the communication bandwidth is 80 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the communication bandwidth is 160 MHz, and the determined base pilot sequence is a first base pilot sequence {−1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1, −1, 1, 1, 1, −1, −1, 1, 1, −1, −1, 1, −1, 1, −1, 1, 1, −1, 1, −1, 1, 1, 1, 1, 1, −1, −1, 1, 1, 1, 1, 1, −1, 1, −1, −1, −1, 1, −1, 1, −1, 1, −1, −1, −1, −1, −1, 1, −1, −1, 1, 1, −1, 1, 1, −1, −1, 1, −1, 1, 1, −1, 1, −1, 1, −1, −1, −1, −1, 1, 1, −1, −1, −1, 1} or a second base pilot sequence {−1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1, −1, 1, 1, 1, 1, −1, −1, 1, 1, 1, −1, −1, −1, 1, 1, −1, 1, −1, 1, 1, −1, −1, 1, −1, −1, 1, 1, −1, 1, 1, 1, 1, 1, −1, 1, −1, 1, −1, 1, 1, 1, 1, −1, −1, −1, −1, −1, −1, 1, −1, −1, −1, −1, −1, 1, 1, −1, 1, −1, −1, −1, −1, 1, −1, 1, 1, −1, −1, 1, −1, 1, −1, −1, 1}. In another aspect, the initial pilot sequence is determined based on a set of nominal tone indices associated with the at least one resource unit. In another aspect, the pilot sequence is determined by shifting the determined initial pilot sequence based on a data symbol index.

For example, means for receiving a message may include the receiver 1305, the processing system 1310, and/or the pilot determination component 1324. Means for generating a set of pilot signals may include the processing system 1310 and/or the pilot determination component 1324. Means for transmitting data may include the transmitter 1315, the processing system 1310, and/or the pilot determination component 1324.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication for an access point, comprising:

determining a first plurality of resource units for communication of a first data symbol;

determining a second plurality of resource units for communication of a second data symbol, wherein the second data symbol is subsequent to the first data symbol;

generating a first set of pilot signals in at least one resource unit of the first plurality of resource units, wherein generating the first set of pilot signals in the at least one resource unit of the first plurality of resource units comprises: determining pilot tone locations associated with the at least one resource unit of the first plurality of resource units, and determining an initial pilot sequence associated with the determined pilot tone locations;

generating a second set of pilot signals in at least one resource unit of the second plurality of resource units, wherein generating the second set of pilot signals in the at least one resource unit of the second plurality of resource units comprises: determining a second pilot sequence by shifting the initial pilot sequence; and transmitting the generated first set of pilot signals in the at least one resource unit of the first plurality of resource units and the generated second set of pilot signals in the at least one resource unit of the second plurality of resource units.

2. The method of claim 1, wherein determining the first plurality of resource units for communication comprises:

determining a communication bandwidth; and determining a number of usable tones per resource unit based on the determined communication bandwidth.

3. The method of claim 1, wherein generating the first set of pilot signals in the at least one resource unit of the first plurality of resource units further comprises:

determining pilot values for the determined pilot tone locations based on the determined initial pilot sequence and a pilot polarity sequence.

4. The method of claim 1, wherein shifting the initial pilot sequence comprises shifting the initial pilot sequence based on a data symbol index.

5. The method of claim 1, wherein the at least one resource unit of the second plurality of resource units has 26 usable tones and 2 pilot tone locations, and the second pilot sequence is determined based on the initial pilot sequence {1, −1}.

6. The method of claim 1, wherein the at least one resource unit of the first plurality of resource units has 52 usable tones or 106 usable tones and has 4 pilot tone locations, and the second pilot sequence is determined based on the initial pilot sequence {1, 1, 1, −1}.

7. The method of claim 1, wherein the at least one resource unit of the first plurality of resource units has 242 usable tones and has 8 pilot tone locations, and the second pilot sequence is determined based on the initial pilot sequence {1, 1, 1, −1, −1, 1, 1, 1}.

8. The method of claim 1, wherein the at least one resource unit of the first plurality of resource units has 484 usable tones or 996 usable tones and has 16 pilot tone locations, and the second pilot sequence is determined based on the initial pilot sequence {1, 1, 1, −1, −1, 1, 1, 1, 1, 1, 1, −1, −1, 1, 1, 1}.

9. The method of claim 1, wherein the at least one resource unit of the first plurality of resource units has 1992 usable tones and 32 pilot tone locations, and the second pilot sequence is determined based on the initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}.

10. The method of claim 1, wherein the generated first set of pilot signals is based on a number of symbols in a signal (SIG) field of a preamble.

11. An apparatus for wireless communication, comprising:

a memory; and at least one processor coupled to the memory, wherein the at least one processor is configured to:

determine a first plurality of resource units for communication of a first data symbol;

determine a second plurality of resource units for communication of a second data symbol, wherein the second data symbol is subsequent to the first data symbol;

generate a first set of pilot signals in at least one resource unit of the first plurality of resource units, wherein to generate the first set of pilot signals in the at least one resource unit of the first plurality of resource units, the at least one processor is configured to: determine pilot tone locations associated with the at least one resource unit of the first plurality of resource units, and determine an initial pilot sequence associated with the determined pilot tone locations;

generate a second set of pilot signals in at least one resource unit of the second plurality of resource units, wherein to generate the second set of pilot signals in the at least one resource unit of the second plurality of resource units, the at least one processor is configured to: determine a second pilot sequence by shifting the initial pilot sequence; and transmit the generated first set of pilot signals in the at least one resource unit of the first plurality of resource units and the generated second set of pilot signals in the at least one resource unit of the second plurality of resource units.

12. The apparatus of claim 11, wherein to determine the first plurality of resource units for communication, the at least one processor is configured to:

determine a communication bandwidth; and determine a number of usable tones per resource unit based on the determined communication bandwidth.

13. The apparatus of claim 11, wherein to generate the first set of pilot signals in the at least one resource unit, the at least one processor is configured to:

determine pilot values for the determined pilot tone locations based on the determined initial pilot sequence and a pilot polarity sequence.

14. The apparatus of claim 11, wherein shifting the initial pilot sequence comprises shifting the initial pilot sequence based on a data symbol index.

15. The apparatus of claim 11, wherein the at least one resource unit of the second plurality of resource units has 26 usable tones and 2 pilot tone locations, and the second pilot sequence is determined based on the initial pilot sequence {1, −1}.

16. The apparatus of claim 11, wherein the at least one resource unit of the first plurality of resource units has 52 usable tones or 106 usable tones and has 4 pilot tone locations, and the second pilot sequence is determined based on the initial pilot sequence {1, 1, 1, −1}.

17. The apparatus of claim 11, wherein the at least one resource unit of the first plurality of resource units has 242 usable tones and has 8 pilot tone locations, and the second pilot sequence is determined based on the initial pilot sequence {1, 1, 1, −1, −1, 1, 1, 1}.

18. The apparatus of claim 11, wherein the at least one resource unit of the first plurality of resource units has 484 usable tones or 996 usable tones and has 16 pilot tone locations, and the second pilot sequence is determined based on the initial pilot sequence {1, 1, 1, −1, −1, 1, 1, 1, 1, 1, 1, −1, −1, 1, 1, 1}.

19. The apparatus of claim 11, wherein the at least one resource unit of the first plurality of resource units has 1992 usable tones and 32 pilot tone locations, and the second pilot sequence is determined based on the initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}.

20. The apparatus of claim 11, wherein the first set of pilot signals is generated based on a number of symbols in a signal (SIG) field of a preamble.

21. A method of wireless communication for a station, comprising:

receiving a message indicating a plurality of resource units allocated to the station for communication;

generating, based on the received message, a first set of pilot signals for a first one or more resource units of the plurality of resource units, wherein generating the first set of pilot signals comprises: determining pilot tone locations associated with the first one or more resource units of the plurality of resource units, and determining an initial pilot sequence associated with the determined pilot tone locations;

generating, based on the received message, a second set of pilot signals for a second one or more resource units of the plurality of resource units, wherein generating the second set of pilot signals comprises: determining a second pilot sequence by shifting the initial pilot sequence; and transmitting data and the generated first set of pilot signals in the first one or more resource units and the generated second set of pilot signals in the second one or more resource units.

22. The method of claim 21, wherein the message includes allocation information comprising at least one of: a set of tone indices, an identifier, a resource unit size that indicates a number of usable tones per resource unit, a communication bandwidth, or data symbol information.

23. The method of claim 21, wherein generating the first set of pilot signals comprises:

determining pilot values for the determined pilot tone locations based on the determined initial pilot sequence and a pilot polarity sequence.

24. The method of claim 21, wherein shifting the initial pilot sequence comprises shifting the initial pilot sequence based on a data symbol index.

25. The method of claim 21, wherein each resource unit of the second one or more resource units has 26 usable tones and 2 pilot tone locations, and the second pilot sequence is determined based on the initial pilot sequence {1, −1}.

26. The method of claim 21, wherein each resource unit of the second one or more resource units has 52 usable tones or 106 usable tones and has 4 pilot tone locations, and the second pilot sequence is determined based on the initial pilot sequence {1, 1, 1, −1}.

27. The method of claim 21, wherein each resource unit of the second one or more resource units has 242 usable tones and has 8 pilot tone locations, and the second pilot sequence is determined based on the initial pilot sequence {1, 1, 1, −1, −1, 1, 1, 1}.

28. The method of claim 21, wherein each resource unit of the second one or more resource units has 484 usable tones or 996 usable tones and has 16 pilot tone locations, and the second pilot sequence is determined based on the initial pilot sequence {1, 1, 1, −1, −1, 1, 1, 1, 1, 1, 1, −1, −1, 1, 1, 1}.

29. The method of claim 21, wherein each resource unit of the second one or more resource units has 1992 usable tones and 32 pilot tone locations, and the second pilot sequence is determined based on the initial pilot sequence {1, 1, 1, −1, −1, 1, 1, 1, 1, 1, 1, −1, −1, 1, 1, 1, 1, 1, 1, −1, −1, 1, 1, 1, 1, 1, 1, −1, −1, 1, 1, 1}.

30. The method of claim 21, wherein the generated first set of pilot signals is based on a number of symbols in a signal (SIG) field of a preamble.

31. An apparatus for wireless communication, the apparatus being a station and comprising:

a memory; and at least one processor coupled to the memory, wherein the at least one processor is configured to:

receive a message indicating a plurality of resource units allocated to the station for communication;

generate, based on the received message, a first set of pilot signals for a first one or more resource units of the plurality of resource units, wherein to generate the first set of pilot signals, the at least one processor is configured to: determine pilot tone locations associated with the first one or more resource units of the plurality of resource units, and determine an initial pilot sequence associated with the determined pilot tone locations;

generate, based on the received message, a second set of pilot signals for a second one or more resource units of the plurality of resource units, wherein to generate the second set of pilot signals, the at least one processor is configured to: determine a second pilot sequence by shifting the initial pilot sequence; and transmit data and the generated first set of pilot signals in the first one or more resource units and the generated second set of pilot signals in the second one or more resource units.

32. The apparatus of claim 31, wherein the message includes allocation information comprising at least one of: a set of tone indices, an identifier, a resource unit size that indicates a number of usable tones per resource unit, a communication bandwidth, or data symbol information.

33. The apparatus of claim 31, wherein the at least one processor is configured to generate the first set of pilot signals by:

determining pilot values for the determined pilot tone locations based on the determined initial pilot sequence and a pilot polarity sequence.

34. The apparatus of claim 31, wherein shifting the initial pilot sequence comprises shifting the initial pilot sequence based on a data symbol index.

35. The apparatus of claim 31, wherein each resource unit of the second one or more resource units has 26 usable tones and 2 pilot tone locations, and the second pilot sequence is determined based on the initial pilot sequence {1, −1}.

36. The apparatus of claim 31, wherein each resource unit of the second one or more resource units has 52 usable tones or 106 usable tones and has 4 pilot tone locations, and the second pilot sequence is determined based on the initial pilot sequence {1, 1, 1, −1}.

37. The apparatus of claim 31, wherein each resource unit of the second one or more resource units has 242 usable tones and has 8 pilot tone locations, and the second pilot sequence is determined based on the initial pilot sequence {1, 1, 1, −1, −1, 1, 1, 1}.

38. The apparatus of claim 31, wherein each resource unit of the second one or more resource units has 484 usable tones or 996 usable tones and has 16 pilot tone locations, and the second pilot sequence is determined based on the initial pilot sequence {1, 1, 1, −1, −1, 1, 1, 1, 1, 1, −1, −1, 1, 1, 1}.

39. The apparatus of claim 31, wherein each resource unit of the second one or more resource units has 1992 usable tones and 32 pilot tone locations, and the second pilot sequence is determined based on the initial pilot sequence {1, 1, 1, −1, −1, 1, 1, 1, 1, 1, −1, −1, 1, 1, 1, 1, 1, 1, −1, −1, 1, 1, 1, 1, 1, 1, −1, −1, 1, 1, 1}.

40. The apparatus of claim 31, wherein the generating the first set of pilot signals is based on a number of symbols in a signal (SIG) field of a preamble.

41. A non-transitory computer-readable medium having code stored thereon that, when executed, causes a station to:

receive a message indicating a plurality of resource units allocated to the station for communication;

generate, based on the received message, a first set of pilot signals for a first one or more resource units of the plurality of resource units, wherein the code that causes the station to generate the first set of pilot signals includes code, that when executed, causes the station to: determine pilot tone locations associated with the first one or more resource units of the plurality of resource units, and determine an initial pilot sequence associated with the determined pilot tone locations;

generate, based on the received message, a second set of pilot signals for a second one or more resource units of the plurality of resource units, wherein the code that causes the station to generate the second set of pilot signals includes code, that when executed, causes the station to: determine a second pilot sequence by shifting the initial pilot sequence; and transmit data and the generated first set of pilot signals in the first one or more resource units and the generated second set of pilot signals in the second one or more resource units.

* * * * *